US006127973A

United States Patent [19]

Choi et al.

[11] Patent Number: 6,127,973

[45] Date of Patent: Oct. 3, 2000

[54] SIGNAL PROCESSING APPARATUS AND METHOD FOR REDUCING THE EFFECTS OF INTERFERENCE AND NOISE IN WIRELESS COMMUNICATION SYSTEMS

[75] Inventors: Seung Won Choi, Seoul; Dong Un Yun, Kang-Won Do, both of Rep. of Korea

[73] Assignee: Korea Telecom Freetel Co., Ltd., Seoul, Rep. of Korea

[21] Appl. No.: 08/844,255

[22] Filed: Apr. 18, 1997

[30] Foreign Application Priority Data

Apr. 18, 1996 [KR] Rep. of Korea ...................... 96-12171

[51] Int. Cl.$^{7}$ ................................ G01S 3/16; G01S 3/28

[52] U.S. Cl. ........................... 342/378; 342/383; 342/384

[58] Field of Search .................................... 342/378, 383, 342/384, 457

[56] References Cited

U.S. PATENT DOCUMENTS

| | | | |
|---|---|---|---|
| 3,763,490 | 10/1973 | Hadley et al. . | |
| 4,931,977 | 6/1990 | Klemes | 342/378 |
| 5,175,558 | 12/1992 | Dupree | 342/378 |
| 5,299,148 | 3/1994 | Gardner et al. . | |
| 5,525,997 | 6/1996 | Kwon . | |
| 5,546,090 | 8/1996 | Roy, III et al. . | |
| 5,634,199 | 5/1997 | Gerlach et al. . | |
| 5,752,173 | 5/1998 | Tsujimoto . | |
| 5,771,439 | 6/1998 | Kennedy, Jr. et al. . | |
| 5,808,913 | 9/1998 | Choi et al. . | |
| 5,818,385 | 10/1998 | Bartholomew . | |
| 5,854,612 | 12/1998 | Kamiya et al. . | |

OTHER PUBLICATIONS

Nicolau et al., Chapter 9, "The LMS Algorithm; Gradient–Based Algorithms," pp. 135–153; and Chapter 15, "Some Applications of Adaptive Arrays, " pp. 259–273, *Elsevier* (1989).

Fu et al., "Conjugate Gradient Eigenstructure Tracking for Adaptive Spectral Estimation," *IEEE Transactions on Signal Processing*, vol. 43, No. 5, pp. 1151–1157 (May 1995).

*Primary Examiner*—Theodore M. Blum

*Attorney, Agent, or Firm*—Merchant & Gould P.C.

[57] ABSTRACT

A signal processing apparatus for minimizing interference and for reducing effects of noise by controlling beam patterns of a telecommunication system having an array antenna, comprising: a means for computing a residue vector, by using a signal vector provided from said array antenna at each snapshot, a final array output signal of said telecommunication system at the last previous snapshot and a value of a gain vector of the present snapshot, and for outputting said residue vector; a means for synthesizing a scalar value, which is needed to generate a search direction vector, from said residue vector; a means for producing said search direction vector, by using said residue vector and said scalar value; a means for producing an adaptive gain, by using said signal vector, said search direction vector, said final array output signal of said telecommunication system at the last previous snapshot and the value of said gain vector of the present snapshot; and a means for updating said gain vector, by using said search direction vector and said adaptive gain at the present snapshot.

106 Claims, 25 Drawing Sheets

SIGNAL PROCESSING APPARATUS AND METHOD FOR REDUCING THE EFFECTS OF INTERFERENCE AND NOISE IN WIRELESS COMMUNICATION SYSTEMS

FIELD OF THE INVENTION

This invention relates to a signal processing technique for wireless communication systems, and more particularly to a signal processing apparatus and method for reducing the effect of interference and noise by controlling beam patterns in real-time, at a telecommunication system.

BACKGROUND OF THE INVENTION

In general, an original signal transmitted by a certain transmitter (hereinafter, simply called "wanted signal") is always received at a receiving set together with other plural interfering signals. Since the level of distortion in a telecommunication system is determined by the ratio between the power of the wanted signal and total power of all the interfering signals, even if the level of the wanted signal is much higher than each of the interfering signals, the distortion of the communication system can pose a serious problem when the total power of all the interfering signals proportionally increased according to the number of the interfering signal is rather high.

In conventional telecommunication systems, interfering signals make it very difficult to extract the information from the wanted signal.

Although an array antenna system has been considered as a countermeasure to improve the problems caused by the interfering signals, no practical method of synthesizing the array antenna system in an actual telecommunication systems has yet been suggested. The problems of applying conventional array antenna systems, which is based on the method of Eigen-Decomposition, is mainly due to its complexity and operating speed which is too large for the real-time processing in telecommunications systems.

The conventional technique about the array antenna system was introduced in the following references:

[1] M. Kaveh and A. J. Barabell, "The Statistical Performance of the MUSIC and Minimun-Norm Algorithms for Resolving Plane Waves in Noise," IEEE Trans., Acoust., speech and signal process., vol. ASSP-34, pp. 331–341, April 1986.

[2] T. Denidni and G. Y. Delisle, "A Nonlinear Algorithm for Output Power Maximization of an Indoor Adaptive Phased Array," IEEE Electromagnetic Compatibility, vol. 37, no. 2, pp. 201–209, May, 1995.

The problems in the conventional method of designing array antenna systems are, first, it requires some knowledge about the location of the wanted signal apriori, and second, it requires so many computations that the real-time processing cannot be performed. Especially when the arrival angle of the wanted signal or the total number of signal sources is unknown, the required amount of computation becomes even larger, which makes it impossible to apply the conventional method of synthesizing the array antenna system to the practical signal environment, such as mobile communications.

SUMMARY OF THE INVENTION

To solve the above mentioned problems, it is an object of the present invention to provide a signal processing apparatus and method for enhancing the communication quality and increasing the communication capacity by reducing the interfering signals and noises with the nice beam pattern.

And, the inventive signal processing apparatus and method introduce a simplified computational technique for generating a nice beam pattern having its maximum gain along the direction of the wanted signal and maintaining the gain toward the direction of the interfering signals in as a low level as possible.

To accomplish the object of the present invention, there is disclosed a signal processing apparatus for minimizing interference and for reducing effects of noise by controlling beam patterns of a telecommunication system having an array antenna, comprising: a means for computing a residue vector, by using a signal vector provided from said array antenna at each snapshot, a final array output signal of said telecommunication system at the last previous snapshot and a value of a gain vector of the present snapshot, and for outputting said residue vector; a means for synthesizing a scalar value, which is needed to generate a search direction vector, from said residue vector; a means for producing said search direction vector, by using said residue vector and said scalar value; a means for producing an adaptive gain, by using said signal vector, said search direction vector, said final array output signal of said telecommunication system at the last previous snapshot and the value of said gain vector of the present snapshot; and a means for updating said gain vector, by using said search direction vector and said adaptive gain at the present snapshot.

Also, in another aspect of the present invention, there is disclosed a signal processing apparatus for minimizing interference and for reducing effects of noise by controlling beam patterns of a telecommunication system having an array antenna, comprising: an autocorrelation generating means that produces an autocorrelation matrix from a signal vector provided from said array antenna at each snapshot; a maximum eigenvalue synthesizing means that estimates the maximum eigenvalue of said autocorrelation matrix at each snapshot; a residue vector synthesizing means that produces a residue vector, by using said autocorrelation matrix generated at each snapshot, said maximum eigenvalue and a value of a gain vector of the present snapshot; a scalar synthesizing means that produces a scalar value, which is needed to generate a search direction vector, from said residue vector; a search direction vector synthesizing means that produces said search direction vector, by using said residue vector and said scalar value; an adaptive gain synthesizing means that produces an adaptive gain, by using said autocorrelation matrix, said search direction vector, said maximum eigenvalue at the present snapshot, and the value of said gain vector at the present snapshot; and a gain vector updating means that updates said gain vector by using said search direction vector and said adaptive gain at each present snapshot.

Also, in another aspect of the present invention, there is disclosed a signal processing apparatus for minimizing interference and reducing effects of noises by controlling beam patterns of a telecommunication system having an array antenna, comprising: a matrix operation approximation means for receiving a signal vector provided from said array antenna at each snapshot, and for generating a gamma vector and a zeta vector by approximating, at each snapshot, a first and a second matrix-oriented operations including autocorrelation matrix operations with the corresponding vector operations; a means for estimating the maximum eigenvalue of said autocorrelation matrix supplied from said matrix operation approximation means; a means for generating a residue vector, by utilizing said gamma vector, said maximum eigenvalue and said gain vector of the present snapshot; a means for generating a scalar quantity by utilizing said residue vector; a means for generating a search direction vector, by utilizing said residue vector and said scalar quantity; a means for generating an adaptive gain at each snapshot, by utilizing said zeta vector, said search direction vector, said maximum eigenvalue and said gain vector at the present snapshot; and a means for updating said gain vector by utilizing said search direction vector and said adaptive gain at each snapshot.

Also, in another aspect of the present invention, there is disclosed a signal processing apparatus for minimizing interference and reducing effects of noises by controlling beam patterns of a telecommunication system having an array antenna, comprising: a residue vector synthesizing means for generating a residue vector, by utilizing received signals provided from said array antenna at each snapshot, a final array output signal of said telecommunication system of the last previous snapshot and a phase delay vector during the last previous snapshot, and for outputting said residue vector; a scalar synthesizing means connected to an output of said residue vector synthesizing means, for synthesizing a scalar value from said residue vector; a search direction vector synthesizing means respectively connected to another output of said residue vector synthesizing means and an output of said scalar synthesizing means, for producing a search direction vector by using said residue vector and said scalar value; an adaptive gain synthesizing means for generating a value of adaptive gain, by utilizing said received signals provided from said antenna elements at the present snapshot, a final array output signal of said telecommunication system at the last previous snapshot, said search direction vector provided from said search direction vector synthesizing means at the present snapshot and said phase delay vector during the last previous snapshot, and for outputting the value of said adaptive gain; and a means for updating said phase delay vector, by utilizing said search direction vector and said adaptive gain of the present snapshot.

Also, in another aspect of the present invention, there is disclosed a signal processing method for minimizing interference and reducing effects of noises by controlling beam patterns of a telecommunication system having an array antenna, comprising the steps of: (a) synthesizing a residue vector by using a signal vector provided from said array antenna at each snapshot, a final array output signal of said telecommunication system at the last previous snapshot and a value of a gain vector of the present snapshot; (b) synthesizing a scalar value, which is needed to generate a search direction vector, from said residue vector; (c) producing a search direction vector by using said residue vector and said scalar value; (d) producing an adaptive gain by using said signal vector, said search direction vector, said final array output signal of said telecommunication system at the last previous snapshot and the value of gain vector of the present snapshot; and (e) updating said gain vector by using said search direction vector and said adaptive gain at the present snapshot.

Also, in another aspect of the present invention, there is disclosed a signal processing method for minimizing interference and reducing effects of noises by controlling beam patterns of a telecommunication system having an array antenna, comprising the steps of: (a) generating an autocorrelation matrix from a signal vector provided from said array antenna at each snapshot; (b) synthesizing a maximum eigenvalue of the autocorrelation matrix at each snapshot; (c) synthesizing a residue vector from the autocorrelation matrix generated at each snapshot, the maximum eigenvalue, and a present value of a gain vector; (d) synthesizing a scalar value, which is needed to generate a search direction vector, from said residue vector; (e) synthesizing a search direction vector from said residue vector and said scalar value; (f) synthesizing an adaptive gain from said autocorrelation matrix, said search direction vector, said maximum eigenvalue, and the present value of said gain vector; and (g) updating said gain vector from said search direction vector and adaptive gain at each present snapshot.

Also, in another aspect of the present invention, there is disclosed a signal processing method for minimizing interference and reducing effects of noises by controlling beam patterns of a telecommunication system having an array antenna, comprising the steps of: (a) generating a gamma vector and a zeta vector by approximating an autocorrelation matrix operations with a corresponding vector operations by utilizing a signal vector provided from said array antenna at each snapshot; (b) estimating a maximum eigenvalue of autocorrelation matrix by utilizing a gain vector at present snapshot and said gamma vector; (c) generating a residue vector by utilizing said gamma vector, said maximum eigenvalue of autocorrelation matrix, and said gain vector of the present snapshot; (d) generating a scalar quantity by utilizing said residue vector; (e) generating a search direction vector by utilizing said residue vector and said scalar quantity; (f) generating an adaptive gain at each snapshot by utilizing said zeta vector, said search direction vector, said maximum eigenvalue of autocorrelation matrix, and said gain vector at the present snapshot; and (g) updating said gain vector by utilizing said search direction vector and said adaptive gain at each snapshot.

Also, in another aspect of the present invention, there is disclosed a signal processing method for minimizing interference and reducing effects of noises by controlling beam patterns of a telecommunication system having an array antenna, comprising the steps of: (a) synthesizing a residue vector, by utilizing received signals provided from said array antenna at each snapshot, a final array output signal of said telecommunication system at the last previous snapshot and a phase delay vector during the last previous snapshot; (b) synthesizing a scalar value from said residue vector; (c) synthesizing a search direction vector by using said residue vector and said scalar value; (d) synthesizing a value of adaptive gain, by utilizing the received signals of present snapshot provided from the antenna elements, said final array output signal of said telecommunication system at the last previous snapshot, said search direction vector of the present snapshot and said phase delay vector during the last previous snapshot; and (e) updating said phase delay vector by utilizing said search direction vector and said adaptive gain of the present snapshot.

BRIEF DESCRIPTION OF THE DRAWINGS

The novel features believed characteristic of the invention, as well as other features and advantages thereof, will best be understood by reference to the following detailed description of a particular embodiment, read in connection with the accompanying drawings, wherein.

DETAILED DESCRIPTION OF THE PREFERRED EMBODIMENT

Figure 1:
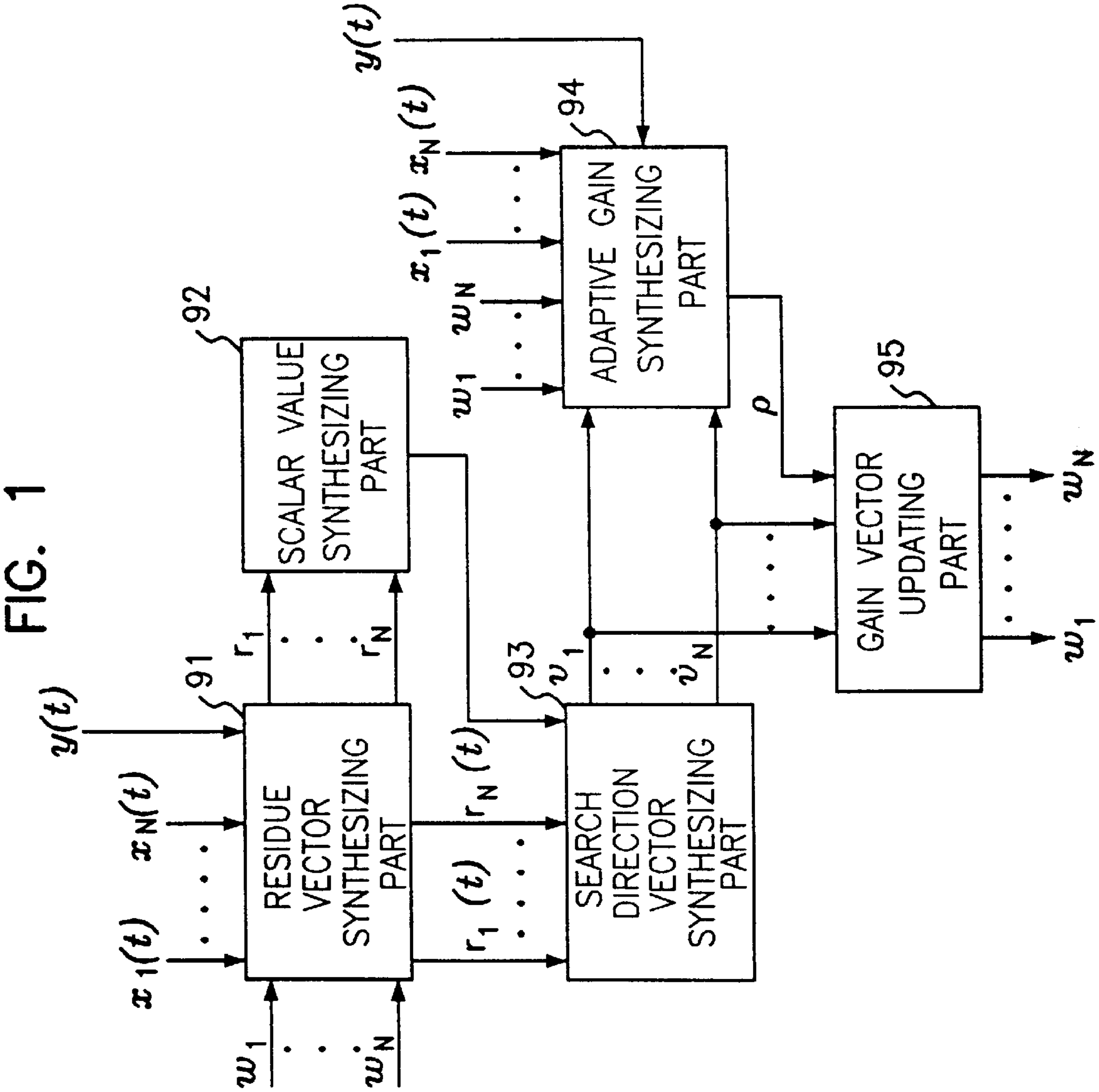
FIG. 1 is a block diagram of the signal processing apparatus according to an embodiment of the present invention.

A preferred embodiment of the present invention will be explained below with reference to the accompanying drawings.

The signal processing apparatus that is proposed in this invention generates a beam pattern having its maximum gain along the direction of the wanted signal maintaining the gain to the other directions in as low a level as possible by utilizing two different approaches.

The first approach is to optimize the value of the complex gain that is to be multiplied to each signal received at each antenna element, and the other approach is to optimize the value of the phase delay that is to be added to each signal received at each antenna element. The specific explanations about each approach is given separately in this manuscript because the applying means of each approach is different, although the two approaches are theoretically equivalent.

In other words, this invention determines the complex gain vector "w" in such a way that the desired beam pattern be formed, thus, as a result, the output of the array antenna system, i.e., the Euclidean inner product of the signals induced at the antenna elements and the complex gain vector, should be as close to the wanted value as possible.

If the magnitude of every element of the complex gain vector is normalized to 1, to multiply the signal received at each antenna element by the corresponding element of the complex gain vector w is equivalent to adding the phase delay to the signal by the amount of the phase term of each corresponding element of the complex gain vector. Therefore, to multiply the signal vector by the gain vector is to add the phase of the signal vector by the amount of the phase term of the gain vector.

The same effect can also be obtained by appending the time delay to the signal received at the i_th antenna element by the amount of $\phi_i$ divided by $2\pi f_c$, where $\phi_i$ and $f_c$ denote the phase delay to be added to the signal received at the i_th antenna element and the carrier frequency, respectively.

For a linear array system having a uniform spacing of $$\frac{\lambda_c}{2}$$

between adjacent antenna elements, where the $\lambda_c$ denotes the wavelength at the carrier frequency, the signal induced at the m_th antenna element can be represented after the frequency down conversion as follows:

$$x_m(t) = \sum_{k=1}^{M} S_k(t) e^{j(m-1)\pi \sin\theta_k} + n_m(t) \tag{1}$$

where $\theta_k$ denotes the incident angle of the k_th signal and $S_k(t)$ is the k_th transmitted signal observed at the receiving end.

The subscript m in equation (1) represents the antenna element. The reference antenna element is assigned to be m=1 and the other antenna elements are assigned the next numbers, i.e., m=2, 3, . . . , in the order of the magnitude of the phase of the signal induced at each antenna element.

In eq. (1), one of the M signals is the wanted signal. For example, when the $S_1(t)$ is the wanted signal, the $S_1(t)$ must be received at the antenna array system while all the other M−1 signals, i.e., $S_2(t)$, $S_3(t)$, . . . , $S_M(t)$, are interfering signals to be rejected together with the noise $n_m(t)$ for a good signal reception.

Although the eq. (1) is valid for the linear array with the uniform half-wavelength spacing, the technique provided in this invention can be generally applied to non-uniform spacing or non-linear array systems as well.

For non-uniform spacing arrays, if the distance of the m_th antenna element from the reference antenna element is $d_m$, then there exists a phase difference in the signal induced at the m_th antenna element by $$2\pi\frac{d_m}{\lambda_c}\sin\theta_k$$

compared to the phase of the signal at the reference antenna element. Thus, the signal induced at the m_th antenna element for non-uniform and/or non-linear array systems can be written as follows:

$$x_m(t) = \sum_{k=1}^{M} S_k(t) e^{j2\pi \frac{d_m}{\lambda_c} \sin\theta_k} + n_m(t).$$

In this invention, in order to make the phase delay to be appended to each antenna element be a positive quantity, the reference antenna element is defined as the antenna element at which the induced signal has the latest phase in the receiving array. In the transmitting array system, therefore, the antenna element at which the induced signal has the earliest phase is the reference antenna element.

Defining the reference antenna element in the way explained above, the array antenna system can easily be designed by appending the zero phase delay to the signal at the reference antenna element and the proper positive amount of the phase delay to the signal at the other antenna elements.

For an array antenna system consisting of N antenna elements, the array receives the N-by-1 signal vector at every snapshot. The autocorrelation matrix of the received signals can be written as shown in eq. (2).

The term "snapshot" in this document denotes the time period during which the new gain vector (or, phase delay vector) is computed upon receiving the new signal vector. In this invention, the array antenna system that adapts to the new signal vector can be designed at each snapshot by determining the proper gain vector (or, phase delay vector) for each new signal vector received at every snapshot.

$$\underline{R}_x(J) = \frac{1}{J} \sum_{l=1}^{J} \underline{x}(t + lT_s) \underline{x}^H (t + lT_s) \tag{2}$$

where the underlined quantities denote the vector or matrix, $T_S$ is the snapshot period and superscript H is the Hermitian operator. The N-by-1 signal vector x(t), of which the number of elements is N consists of the received signal $x_m(t)$ for m=1, 2, . . . , N, which is explained in eq. (1) as follows:

$$x(t)=[x_1(t)\ x_2(t)\ \dots\ x_N(t)]^T \tag{3}$$

where superscript T denotes the transpose operator.

However, eq. (2) is valid only when the arrival angles of all the signal components remain unchanged. In a time-varying environment where each signal source moves during the communication, as in the mobile communication environment, the autocorrelation matrix cannot be obtained by eq. (2) because the arrival angle of the signal source changes at every snapshot.

Therefore, in time-varying signal environments, it is recommended that the autocorrelation matrix be computed in an iterative manner as follows:

$$R_x(J+1)=fR_x(J)+x((J+1)T_S)x^H((J+1)T_S) \tag{4}$$

where $R_x(J+1)$ and $R_x(J)$ denote the autocorrelation matrix at the J+1st and J_th snapshot, respectively, and f denotes the forgetting factor in the range between 0 and 1.

Since communication environments, especially mobile communications, are generally time-varying environments, the autocorrelation matrix in this invention is computed by eq. (4) rather than eq. (2).

From various computer simulations, it is recommended to set the value for the forgetting factor, f, in the range between 0.8 and 0.99 for optimal performances in land mobile communications.

Now, the design of the optimal array antenna system will be explained in more detail by taking the practical examples of the actual applications.

The eigenvalues $\{\lambda_i\}$ of the autocorrelation matrix, determined by eq. (2) or (4), can be sorted by the magnitude as $\lambda_1 \geqq \lambda_2 \geqq \dots \geqq \lambda_N$. The largest eigenvalue $\lambda_1$ is determined by the signal components, not the noise components, regardless of the number of signal sources or antenna elements.

Therefore, the eigenvector corresponding to the largest eigenvalue $\lambda_1$ exists in the signal subspace as follows:

$$\underline{e} = \sum_{i=1}^{M} \gamma_i \underline{a}(\theta_i) \tag{5}$$

where the complex quantity $\gamma_i$ is a constant determined by the magnitudes and distribution of the wanted and interfering signals, and the vector a(θi) is the steering vector of the i_th signal component in the following form:

$$a(\theta i)=[1 e^{j\pi sin\theta_i} \dots e^{j(N-1)\pi sin\theta_i}] \tag{6}$$

Now, suppose the magnitude of the wanted signal is sufficiently larger than each of the interfering signals such that the condition shown in (7) is satisfied.

$$|S_1(t)| >> |S_i(t)| \text{ for } i \neq 1 \tag{7}$$

In a signal environment in which condition (7) is satisfied, the eigenvector $\lambda_1$ corresponding to the largest eigenvalue can be approximated as:

$$e_1=\gamma_1 a(\theta_1). \tag{8}$$

This means that the steering vector, $a(\theta_1)$, of the wanted signal is almost the same as the eigenvector corresponding to the largest eigenvalue except that the complex-valued constant, $\gamma_1$, is multiplied.

Therefore, under the condition that the wanted signal is sufficiently larger than each of interfering signals, the maximum gain of the array antenna system will approximately point to the direction of the source of the wanted signal if the gain vector to be appended to the antenna elements of the array system is determined by the eigenvector corresponding to the largest eigenvalue of the autocorrelation matrix of the signals impinging upon the array system.

In conclusion of the above discussions, this invention suggests that the gain vector can be determined by the following equation:

$$\underline{w} = \frac{1}{\sqrt{N}} \underline{e}_1. \tag{9}$$

Now, the practical way of computing the optimal weight vector is presented.

As mentioned previously, under a particular signal environment where the wanted signal is sufficiently larger than each of interfering signals, the array antenna system having the desired beam pattern, which provides the maximum gain along the direction of the wanted signal source, can be obtained by taking the weight vector w with the normalized eigenvector $e_1$ corresponding to the largest eigenvalue $\lambda_1$ of the autocorrelation matrix.

However, to obtain the autocorrelation matrix itself requires a lot of computations, as shown in eqs. (2) and (4).

Moreover, it is not a simple task to compute the eigenvector corresponding to the largest eigenvalue of the matrix. What makes the problem even more complicated is that the arrival angle of each signal changes at every snapshot in mobile communications such that the eigenvector to be obtained varies at every snapshot.

Considering the above-mentioned difficulties, this invention introduces a method of computing the weight vector w with the approximated value for the eigenvector $e_1$ by utilizing the conjugate gradient method, of which the original version has been developed previously in the following textbook.

[3] M. R. Hestenes, *Conjugate Direction Methods in Optimization,* Springer-Verlag, 1980.

The weight vector w is computed by updating the solution of the previous snapshot through the iterative means as follows:

$$w(k+1)=w(k)+\rho(k)v(k) \tag{10}$$

where the independent variable k is the time index representing the snapshot, ρ(k) and v(k) are the adaptive gain and search direction vector, respectively. Note that the gain vector w(k+1) shown in equation (10) should be normalized at each snapshot to make the magnitude of the gain vector be 1.

From equation (10), it is observable that the solution to be computed at the present snapshot be obtained by updating the solution of the previous snapshot in the direction indicated by v(k) by the amount indicated by ρ(k).

In order to compute the solution for the gain vector in the iterative manner mentioned above, however, the answers for the following two questions must be given:

First, how do we set the initial value of the gain vector w(0) in the beginning?

Second, how do we set the adaptive gain ρ(k) and the search direction vector v(k) at each snapshot?

In this invention, the initial value of the gain vector w(0) is determined from the received signal vector x(0) as follows:

$$\underline{\omega}(0)=\frac{\underline{x}(0)}{x_1(0)} \tag{11}$$

where $x_1(0)$, i.e., the first element of the signal vector x(0), is the signal induced at the reference antenna element at the very first snapshot.

The reason why the vector w(0) is determined by the equation (11) is that the received signal vector itself x(0) must be a good approximation for the eigenvector because the rank of the matrix at the initial snapshot is 1 such that the number of the distinct nonzero eigenvalue is only 1, which must correspond to the signal received at the very first snapshot.

The technique introduced in this invention designs the array antenna system by updating the weight vector in the manner shown in equation (10) utilizing the adaptive gain and search direction vector through the procedure provided in this invention with the initial value, as shown in equation (11).

In order to apply the CGM (conjugate gradient method) in the design of the array antenna system, consider the cost function defined with the Rayleigh quotient given as follows:

$$f(\underline{\omega})=\frac{\underline{\omega}^H(k)\underline{R}_x(k)\underline{\omega}(k)}{\underline{\omega}^H(k)\underline{\omega}(k)} \text{ with a constraint } |\underline{\omega}(k)|^2=1 \tag{12}$$

As can be easily proved mathematically, the maximum or minimum of functional (12) converges to the maximum or minimum eigenvalue of the matrix $R_x(k)$, respectively, and the value for the vector w(k) is the eigenvector corresponding to the converged eigenvalue. Since gain vector w of the array antenna system must be determined with the eigenvector corresponding to the largest eigenvalue, as explained previously, in order to form the beam pattern providing the maximum gain along the direction of the wanted signal source, the adaptive gain and the search direction vector that maximize functional (12) are provided in this invention.

The adaptive gain ρ(k) that maximizes or minimizes the functional shown in equation (12) can be obtained by solving the following equation with respect to ρ(k) at every snapshot:

$$\frac{\partial f(\underline{w}(k+1))}{\partial \rho(k)}=0. \tag{13}$$

The solution for equation (13) can be obtained as follows:

$$\rho(k)=\frac{\left[-B\pm\sqrt{B^2-4AC}\right]}{2A} \tag{14}$$

where, $$A=b(k)Re[c(k)-d(k)Re[a(k)],$$

$$B=b(k)-\lambda(k)d(k),$$

$$C=Re[a(k)-\lambda(k)Re[c(k)],$$

$$\lambda(k)=w^H(k)R_x(k)w(k),$$

$$a(k)=w^H(k)R_x(k)v(k),$$

$$b(k)=v^H(k)Rx(k)v(k),$$

$$c(k)=w^H(k)v(k)$$

$$d(k)=v^H(k)v(k). \tag{15}$$

with Re[*] being the real part of the complex quantity "*".

Since the positive and negative sign in equation (14) cause the functional to be minimized and maximized, respectively, the negative sign is selected in this invention for maximizing the functional.

As shown in the constraint of the equation (12), the weight vector w(k) must be normalized at every snapshot.

In the meantime, starting from the initial value of v(0)=λ(0) w(0)−Rx(0) w(0), the search direction vector v(k) is updated as follows:

$$v(k+1)=r(k+1)+\beta(k)v(k). \tag{16}$$

The residue vector r(k+1) and the scalar β(k) are respectively determined as:

$$r(k+1)=\lambda(k+1)w(k+1)-R_x(k+1)w(k+1), \tag{17}$$

$$\beta(k) = -\frac{\|r(k+1)\|^2}{\|r(k)\|^2}. \tag{18}$$

The entire procedure of computing the weight vector provided in this invention can be summarized as follows:

<step 1> Set the initial value for the weight vector and autocorrelation matrix utilizing the received signal as $w(0)=x(0)/x_1(0)$ and $Rx(0)=x(0)x^H(0)$, respectively.

<step 2> Update the autocorrelation matrix by substituting the new signal vector x(k) to equation (4), compute the adaptive gain by equations (14) and (15), and update the weight vector w, as shown in equation (10), utilizing the search direction vector obtained in equation (18).

<step 3> Repeat <step 2> as the new signal vector is received at each snapshot.

According to the procedure provided in this invention, since the entire procedure has been tremendously simplified mainly due to the fact that the suggested method does not require any information regarding the directions of the wanted and interfering signals, the signal reception and transmission can be performed based on the real-time processing in most practical signal environments including time-varying environments, such as mobile communications.

As shown in equation (14) and (18), the total amount of computation required to obtain the optimal weight vector by the proposed technique in this invention is only $O(3N^2+12N)$ at each snapshot, which makes it possible that the standard DSP (digital signal processor) can implement the proposed method without any technical problems in the signal environments of land mobile communications where the speed of each subscriber does not exceed 150 km/h.

Although the weight vector providing the desired beam pattern can be obtained with the computational load of $O(3N^2+12N)$ by utilizing the CGM as described above, the entire procedure is still quite complex mainly because the matrix must be updated at each snapshot, as shown in equation (4).

Therefore, in order to simplify the entire procedure even more, we suggest a particular value for the forgetting factor in updating the autocorrelation matrix required in the CGM.

Suppose the forgetting factor is fixed at 0 in equation (4). It particularly means that, as an effort to reduce the complexity of the procedure of the CGM, the autocorrelation matrix is to be determined by the signal vector of the present snapshot only.

Since the signal vectors of the previous snapshots cannot be considered when the arrival angles at each snapshot change too much anyway, to set the forgetting factor to 0 can be applied in general signal environments.

First of all, the computation of the autocorrelation matrix can be simplified as $$R_x(J) \approx x(J)x^H(J) \tag{19}$$

Substituting the above equation into equation (15), all the computational procedures having the complexity of order $O(N^2)$ are simplified as $$\lambda(k)=|y(kT_S)|^2,$$
$$a(k)=y(kT_S)x^H(kT_S)v(k),$$
$$b(k)=|v^H(k)x(kT_S)|^2. \tag{20}$$

where $y(kT_S)$ is the output of the array antenna system at the k_th snapshot defined as $y(kT_S)=w^H(k)x(kT_S)$.

As shown in equation (20), if the forgetting factor is fixed at zero, then, since the matrix is determined by the signal vector of the present snapshot only, the procedure of computing the optimal weight vector is considerably simplified and, moreover, the computation of the matrix at each snapshot is not needed at all, which means the calculation of equation (4) vanishes out of the entire procedure.

From the numerical results obtained in the computer simulations, the proposed method, which accounts for the last previous signal vectors as well as for the present signal vector for computing the autocorrelation matrix at each snapshot, provides about 12 dB improvement in SIR (signal-to-interference ratio), whereas the noise power is reduced by the number of antenna elements, i.e., the SNR (signal-to-noise ratio) is increased by the factor of N.

On the other hand, the other method, which uses only the instantaneous signal vector at each snapshot, provides almost the same amount of improvement according to the noises while about 9 dB improvement is obtained in terms of the SIR (signal-to-interference ratio).

Consequently, the simplified version of the proposed method, which uses the signal vector at the present snapshot, only causes a degradation in SIR performance by about 3 dB compared to the original version of the proposed method which uses the signal vectors of the previous snapshots as well as the current signal vector in computing the autocorrelation matrix. However, since the complexity of the entire procedure is tremendously reduced, a simplified version would cause a much easier implementation and cost reduction.

Designing the array antenna system utilizing a simplified method, all the operations requiring the computational load of $O(N^2)$ disappear and the total computational load of the entire procedure becomes about O(11N).

Although the simplified version that employs the instantaneous signal vector can only be thought as being successful in terms of the simplification of the entire system, as mentioned above, the performance of the simplified system is inferior to the original version of the proposed method which adopts a proper forgetting factor for treating the previous signal vectors together with the current one. In computer simulations, it has been found that the performance of the simplified system in terms of the BER (bit error rate) is about 10 times worse, compared to the original version, although the SIR performance is not much worse as mentioned previously.

As the need for properly compromising the two versions taking advantages from each version arises, this invention presents another version of the original technique of which the complexity is a little more complicated but the performances, especially the BER performance, is a lot better compared to the simplified version.

The terms in the procedure of the proposed technique that increase the complexity of the system are related to the matrix operations, i.e., $R_x(k)\cdot w(k)$ and $R_y(k)\cdot V(k)$.

Thus, if these two terms are simplified properly, the complexity of the entire procedure can considerably be reduced without approximating the autocorrelation matrix with the instantaneous signal vector.

Letting the above two terms be denoted as $\gamma(k)=R_x(k)w(k)$ and $\zeta(k)=R_x(k)v(k)$, these two terms can be simplified as follows:

During the first snapshot, the $\gamma(0)$ and $\zeta(0)$ can respectively be written as $$\gamma(0)=x(0)\cdot x^H(0)\cdot w(0)=x(0)\cdot v^*(0),$$
$$\zeta(0)=x(0)\cdot x^H(0)\cdot v(0).$$

From the second snapshot, these two terms are updated as $$\begin{aligned}\underline{\gamma}(k+1) &= \underline{R}_x(k+1)\cdot\underline{w}(k+1) \\ &= [f\underline{R}_x(k)+\underline{x}(k+1)\underline{x}^H(k+1)]\underline{w}(k+1) \\ &= f\underline{R}_x(k)\underline{w}(k+1)+\underline{x}(k+1)y^*(k+1) \\ &= f\underline{R}_x(k)[\underline{w}(k)+\rho(k)\underline{v}(k)]+y^*(k+1)\cdot\underline{x}(k+1) \\ &= f\underline{\gamma}(k)+f\rho(k)\underline{\zeta}(k)+y^*(k+1)\cdot\underline{x}(k+1)\end{aligned} \tag{21}$$

$$\begin{aligned}\underline{\zeta}(k+1) &= \underline{R}_x(k+1)\cdot\underline{v}_x(k+1) \\ &= [f\underline{R}_x(k)+\underline{x}(k)\cdot\underline{x}^H(k)]\underline{v}(k+1) \\ &= f\underline{R}_x(k)\underline{v}(k+1)+\underline{x}(k)\cdot\underline{x}^H(k)\cdot\underline{v}(k+1) \\ &= f\underline{R}_x(k)[\underline{\gamma}(k+1)+\beta(k)\underline{v}(k)]+ \\ &\quad \underline{x}(k)\cdot\underline{x}^H(k)\cdot\underline{v}(k+1) \\ &= f\underline{R}_x(k)\underline{\gamma}(k+1)+f\cdot\beta(k)\underline{R}(k)\underline{v}(k)+ \\ &\quad \underline{x}(k)\cdot\underline{x}^H(k)\cdot\underline{v}(k+1)\end{aligned} \tag{22}$$

Assuming the residue vector r(k+1) is obtained correctly, since $R_x(k)\gamma(k+1)\approx 0$, the equation(22) can be approximated as $$\approx f\cdot\beta(k)\cdot\zeta(k)+x(k)\cdot x^H(k)\cdot v(k+1). \tag{23}$$

Therefore, the two matrix-related terms, which mainly affect the complexity of the entire procedure, can finally be simplified into the vector operations as follows:

$$\begin{aligned}\underline{\gamma}(k+1) &= \underline{R}_x(k+1)\underline{w}(k+1) \\ &= f\cdot\underline{\gamma}(k)+f\rho(k)\cdot\underline{\zeta}(k)+y^*(k+1)\underline{x}(k+1)\end{aligned} \tag{24}$$

$$\begin{aligned}\underline{\zeta}(k+1) &= \underline{R}_x(k+1)\underline{w}(k+1) \\ &\approx f\cdot\beta(k)\cdot\underline{\zeta}(k)+\underline{x}(k)\cdot\underline{x}^H(k)\cdot\underline{v}(k+1).\end{aligned} \tag{25}$$

According to the above equations (24) and (25), the entire computational load of the proposed technique is about 0(15N). This is a little more complicated compared to the simplified version, which takes only the instantaneous signal vector at each snapshot, but it is much simpler compared to the original version of the proposed method which requires the computational load of about $0(3N^2+12N)$.

From computer simulations considering various signal environments, the compromised version utilizing the procedure of equations (24) and (25) shows almost the same level of performance improvement in SIR and BER compared to the original version.

The noise immunity of the compromised version is the same as the other two versions, i.e., the noise power reduces by about 1/N.

In this document, the vector computed in accordance with the equation (24) and equation (25) are called "gamma vector" and "zeta vector", respectively.

In order to implement the total system, which encounters both receiving and transmitting modes, the optimal weight vector computed during the receiving mode can be applied to obtain the optimal parameters for the transmitting mode.

As mentioned previously, when the proposed signal processing apparatus, which provides the desired beam pattern, is adopted at the cell-site antenna system, we can achieve not only an increase of the channel capacity and an enhancement of the communication quality but also a considerable extension of the battery's life with each subscriber in the cell.

An extension of the battery's life with each subscriber can be achieved because the cell-site antenna system adopting the proposed beamforming technique provides much better communication efficiency compared to the conventional cell-site antenna system by forming the main lobe along the direction of the wanted signal source.

Therefore, it is possible to perform an acceptable communication even with much less transmitting power at each subscriber's end. To reduce the transmitting power at each subscriber directly causes the life extension of the battery at each of the subscribers.

Now, an explaination of the proposed apparatus and method in more detail by taking practical examples will follow:

EMBODIED EXAMPLE 1

In this embodied example, a signal processing apparatus is introduced which computes the gain vector in real-time in order to generate the optimal beam pattern at the telecommunication system that employs the array antenna system.

This can be achieved because the beam pattern of the array antenna system can be controlled by properly appending the complex-valued gain at the signal induced at each antenna element.

FIG. 1 is a block diagram of the signal processing apparatus according to an embodiment of the present invention.

The signal processing apparatus according to the first embodiment of the present invention comprises a residue vector synthesizing part 91, a scalar value synthesizing part 92, a search direction vector synthesizing part 93, an adaptive gain synthesizing part 94, and a gain vector updating part 95.

The residue vector synthesizing part 91 computes a residue vector (r) by using a signal vector (x(t)) of present snapshot provided from the signal telecommunication system with the array antenna, a final array output signal (y) of the telecommunication system at the last previous snapshot, and a value of gain vector (w) of the present snapshot, and the part 91 outputs the residue vector to the scalar value synthesizing part 92 and the search direction vector synthesizing part 93.

The scalar value synthesizing part 92 produces a scalar value ($\beta$) which is needed to generate a search direction vector ($\upsilon$), from the residue vector (r).

The search direction vector synthesizing part 93 produces the search direction vector ($\upsilon$) from the residue vector (r) and scalar value ($\beta$), The adaptive gain synthesizing part 94 produces an adaptive gain ($\rho$) at every snapshot from the signal vector(x(t)), the search direction vector ($\upsilon$), the final array output signal (y) of the telecommunication system at the last previous snapshot, and the value of gain vector (w) of the present snapshot.

The gain vector updating part 95 updates the gain vector (w) by using the search direction vector ($\upsilon$) and the adaptive gain ($\rho$) during the present snapshot.

The ultimate goal of the signal processing apparatus is to generate the the gain vector (w) providing the optimal beam pattern for the telecommunication system that employs the array antenna to produce the final array output signal y(t) by computing the inner product between the signal vector received at the present snapshot and the gain vector (w).

Figure 2:
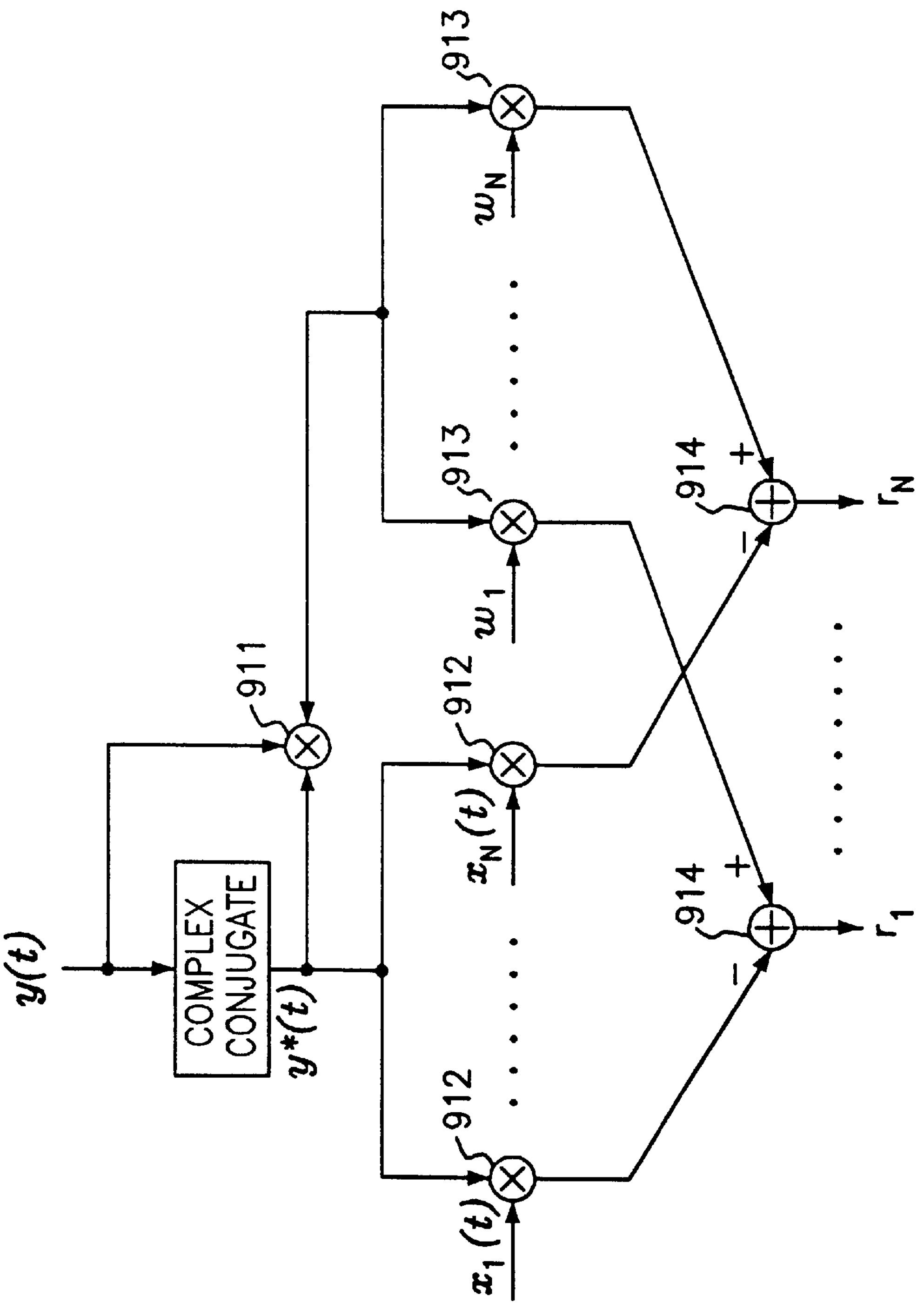
FIG. 2 is an example of the specified structure of the residue vector synthesizing part shown in FIG. 1.

FIG. 2 illustrates an example of the specified structure of the residue vector synthesizing part 91 shown in FIG. 1.

As shown in FIG. 2, the residue vector synthesizing part 91 comprises the following parts: a multiplying part 911 which computes the squared value of the final array output (y(t)) at the previous snapshot; plural multiplying parts 912 which multiply the complex conjugate of the final array output (y(t)) to each element of the signal vector coming from the array antenna of the telecommunication system; plural multiplying parts 913 which multiply the output of the multiplying part 911 to each element of the gain vector; and plural subtracting parts 914 which subtract each of outputs of the multiplying parts 912 from the corresponding output of the multiplying parts 913.

$$r=|y(t)|^2w-x(t)y^*(t) \tag{26}$$

where x(t), y(t), and w denote the received signal vector, the final array output and the gain vector, respectively, and the superscript (*) is the complex conjugate operator.

The procedure for obtaining the residue vector, as shown in FIG. 2 and equation (26), is the result of approximating the autocorrelation matrix with the instantaneous signal vector as $R=x(t)\cdot x^H(t)$.

Figure 3:
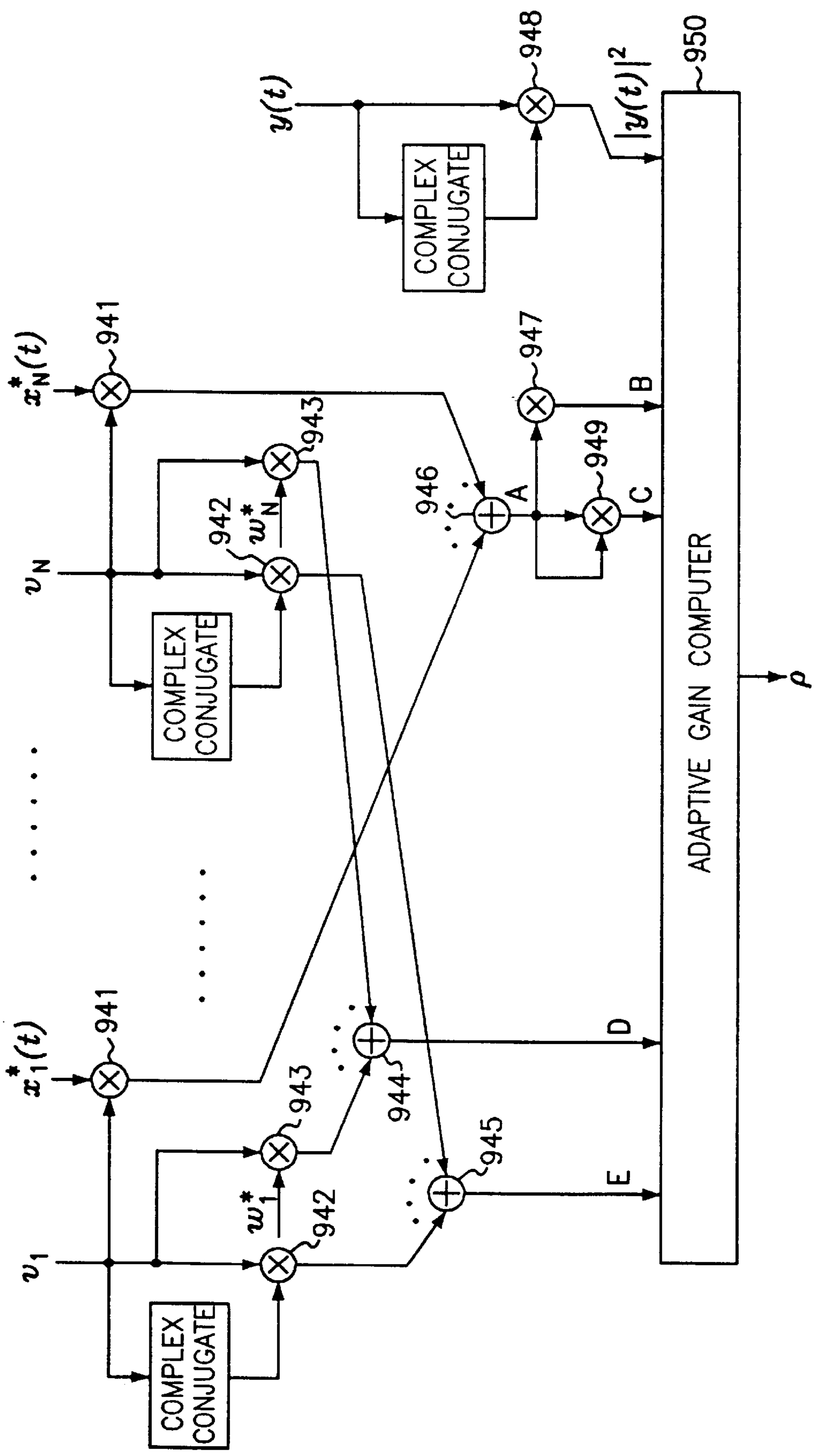
FIG. 3 is an example of the specified structure of the adaptive gain synthesizing part shown in FIG. 1.

FIG. 3 illustrates an example of the specified structure of the adaptive gain synthesizing part 94 shown in FIG. 1.

As shown in FIG. 3, the adaptive gain synthesizing part 94 comprises the following parts: plural multiplying parts 941 which multiply each element of the search direction vector (υ) to the complex conjugate of each element of the signal vector (x(t)); an adding part 946 which adds the outputs of the the plural multiplying parts (941); plural multiplying parts 942 which compute the squares of the absolute values of all the elements of the search direction vector (υ); an adding part which adds the outputs of the multiplying parts 942; plural multiplying parts 943 which multiply the complex conjugate of every element of the gain vector to each element of the search direction vector in the corresponding order; an adding part 944 which adds the outputs of the multiplying parts 943; a multiplying part 949 which computes the square of the output of the adding part 946; a multiplying part 947 which multiplies the final array output (y(t)) to the output of the adding part 946; a multiplying part 948 which computes the square of the absolute value of the final array output (y(t)); and an adaptive gain computer 950 that is connected to the adding parts 944 and 945 and the multiplying parts 947, 948, and 949.

As for the adaptive gain, letting A denote the output of the adding part 946, which is the result of the inner product of the signal vector and the search direction vector, letting B denote the output of the multiplying part 947, which is the result of the multiplication of the A and the final array output, letting C denote the output of the multiplying part 949, which is the square of the A, letting D denote the output of the adding part 944, which is the result of the inner product of the gain vector and the search direction vector, and letting E denote the output of the adding part 945, which is the result of the inner product of the search direction vector and itself, the adaptive gain (ρ) is computed in accordance with the equation given below:

$$\rho=\frac{-G-\sqrt{G^2-4FH}}{2F}$$

where $F=C\cdot Re[D]-B\cdot Re[E]$, $G=C-|y(t)|^2E$, $H=Re[B]-|y(t)|^2\cdot Re[D]$, and Re[·] denotes the real part of the complex-valued number "·"

Also, the respective value of A, B, C, D, and E is defined, as follows:

$B=y^*\cdot x^H\cdot v$, $C=v^H\cdot x\cdot x^H\cdot v$, $D=w^H\cdot v$, $E=|v|^2$.

Figure 4:
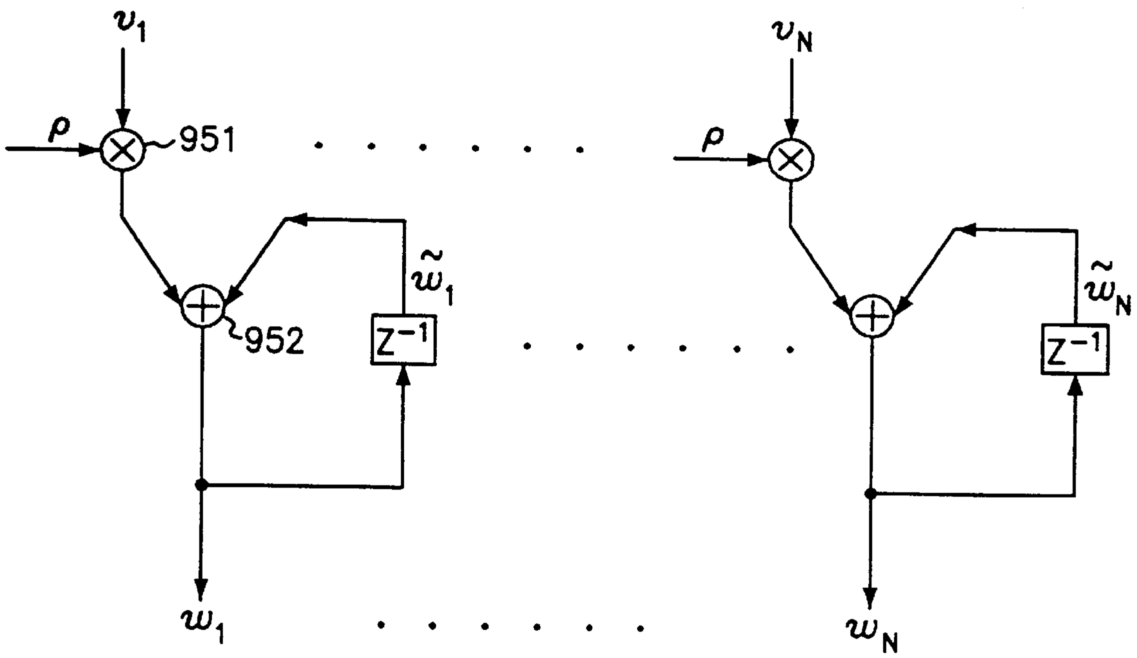
FIG. 4 is an example of the specified structure of the gain vector updating part shown in FIG. 1.

FIG. 4 illustrates an example of the specified structure of the gain vector updating part 95 shown in FIG. 1. The gain vector updating part 95 comprises the following parts: plural multiplying parts 951 which multiply the adaptive gain to each element of the search direction vector; and plural adding parts that add the gain vector obtained during the the last previous snapshot to each output of the multiplying parts 951.

Therefore, the gain vector is updated at each J_th snapshot in the gain vector updating part 95 according to the following equation:

$$w(J+1)=w(J)+\rho(J)\upsilon(J).$$

This means that the value of the gain vector at the next snapshot is determined by updating the current value by the amount specified by the adaptive gain in the direction specified by the search direction vector.

Figure 5:
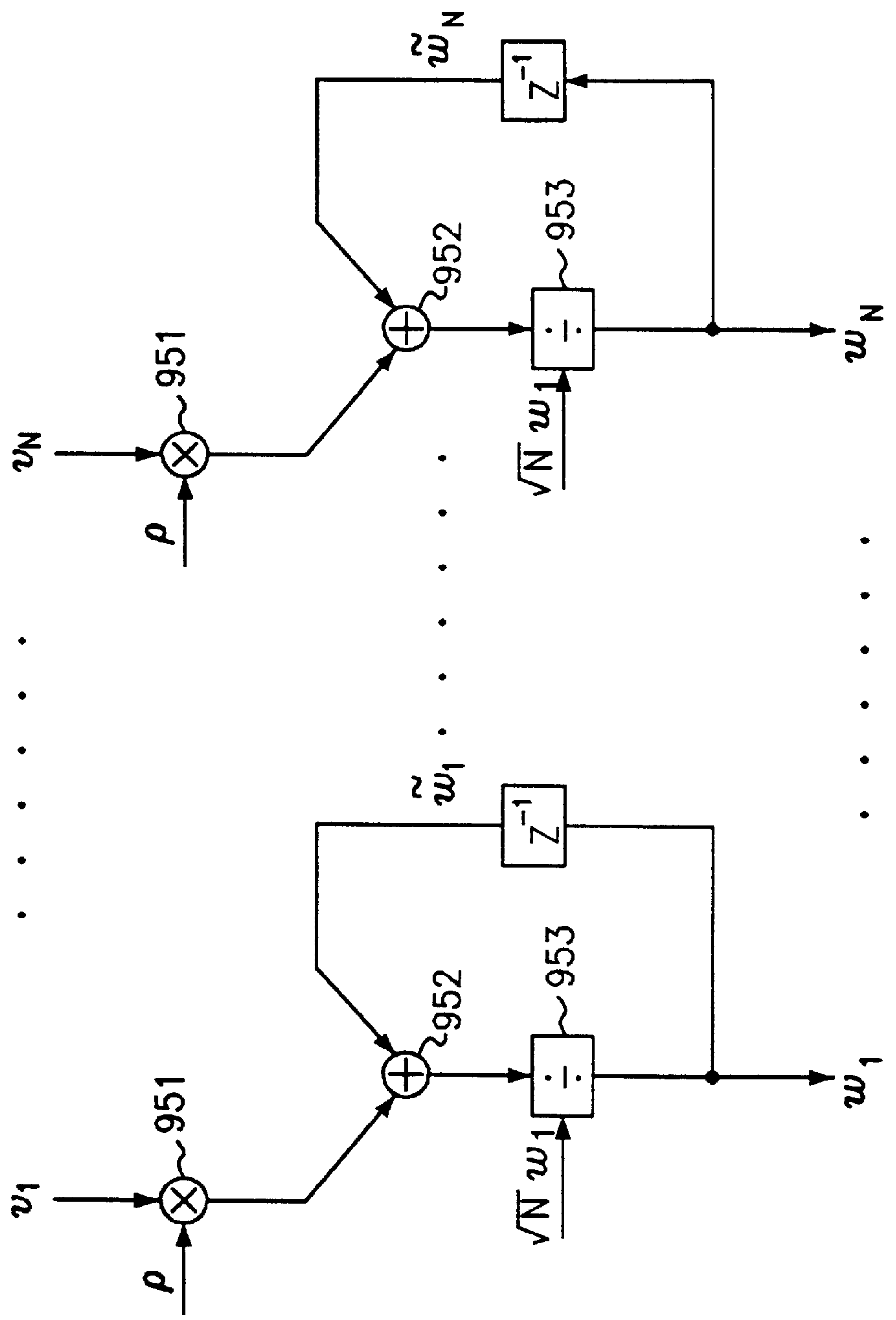
FIG. 5 is an another example of the specified structure of the gain vector updating part shown in FIG. 1.

FIG. 5 illustrates another example of the specified structure of the gain vector updating part 95.

The gain vector updating part 95 shown in FIG. 5 includes plural dividing parts 953 in addition to the structure of the gain vector updating part 95 shown in FIG. 4, in order to divide each of the outputs of adding parts 952 with the square root of N multiplied with the value of one of the outputs of adding parts 952 that is connected to the reference antenna element, where N denotes the number of antenna elements in the array antenna system.

Comparing to the gain vector updating part shown in FIG. 4, the gain vector updating part illustrated in FIG. 5 has the following characteristics:

First, no phase delay is appended to the signal induced at the reference antenna element by having the element of the gain vector associated with the reference antenna element be always a real valued quantity. This particularly means that the received signal is synchronized with the signal induced at the reference antenna element.

Second, the magnitude of resultant gain vector becomes 1.

And lastly, the gain vector updating part 95, shown in FIG. 5, computes the gain vector in accordance with the following equation:

$$\underline{w}(J+1)=\frac{\underline{w}(J)+\rho(J)\underline{\upsilon}(J)}{\sqrt{N}\,w_1(J+1)}$$

where $w_1(J+1)$ denotes the first element of the updated gain vector, i.e., $(w(J)+\rho(J)\upsilon(J))$.

Figure 6:
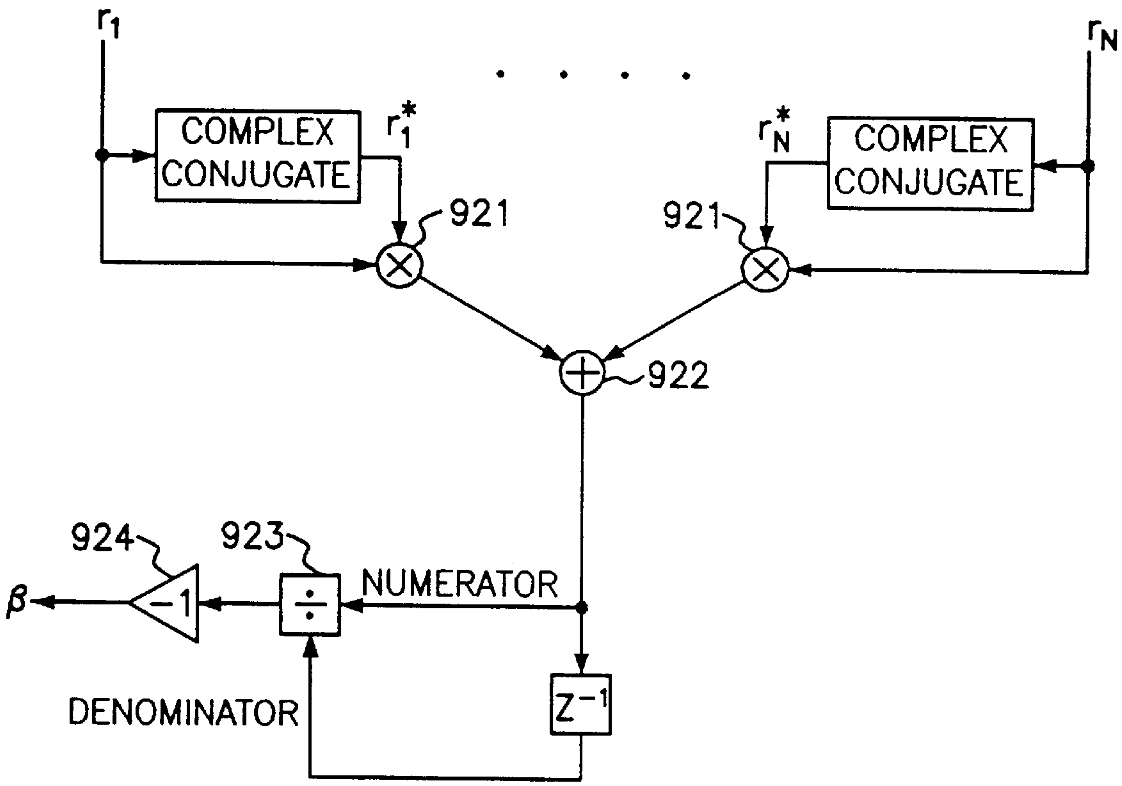
FIG. 6 is an example of the specified structure of the scalar synthesizing part shown in FIG. 1.

FIG. 6 illustrates an example of the specified structure of the scalar synthesizing part 92 shown in FIG. 1.

As illustrated in FIG. 6, the scalar synthesizing part 92 comprises the following parts: plural multiplying parts 921 which compute the square of the absolute value of each element of the residue vector; an adding part 922 that adds the outputs of the multiplying parts 921; a dividing part 923 that divides the output of the adding part 922 at the present snapshot with the output of the adding part 922 at the previous snapshot; and a sign exchanging part 924 which multiplies '−1' to the output of the dividing part 923.

Finally, the scalar synthesizing part 92 produces the value of the scalar (β) in accordance with the following equation:

$$\beta = -\frac{|r(J+1)|^2}{|r(J)|^2}.$$

The scalar value computed in FIG. 6 is used to obtain the search direction vector at the present snapshot by multiplying it to each element of the search direction vector of the last previous snapshot and adding each result of the multiplications to each corresponding element of the residue vector. The ultimate goal of computing the scalar value is to make all the search direction vectors at every snapshot be mutually orthogonal with respect to the autocorrelation matrix.

Figure 7:
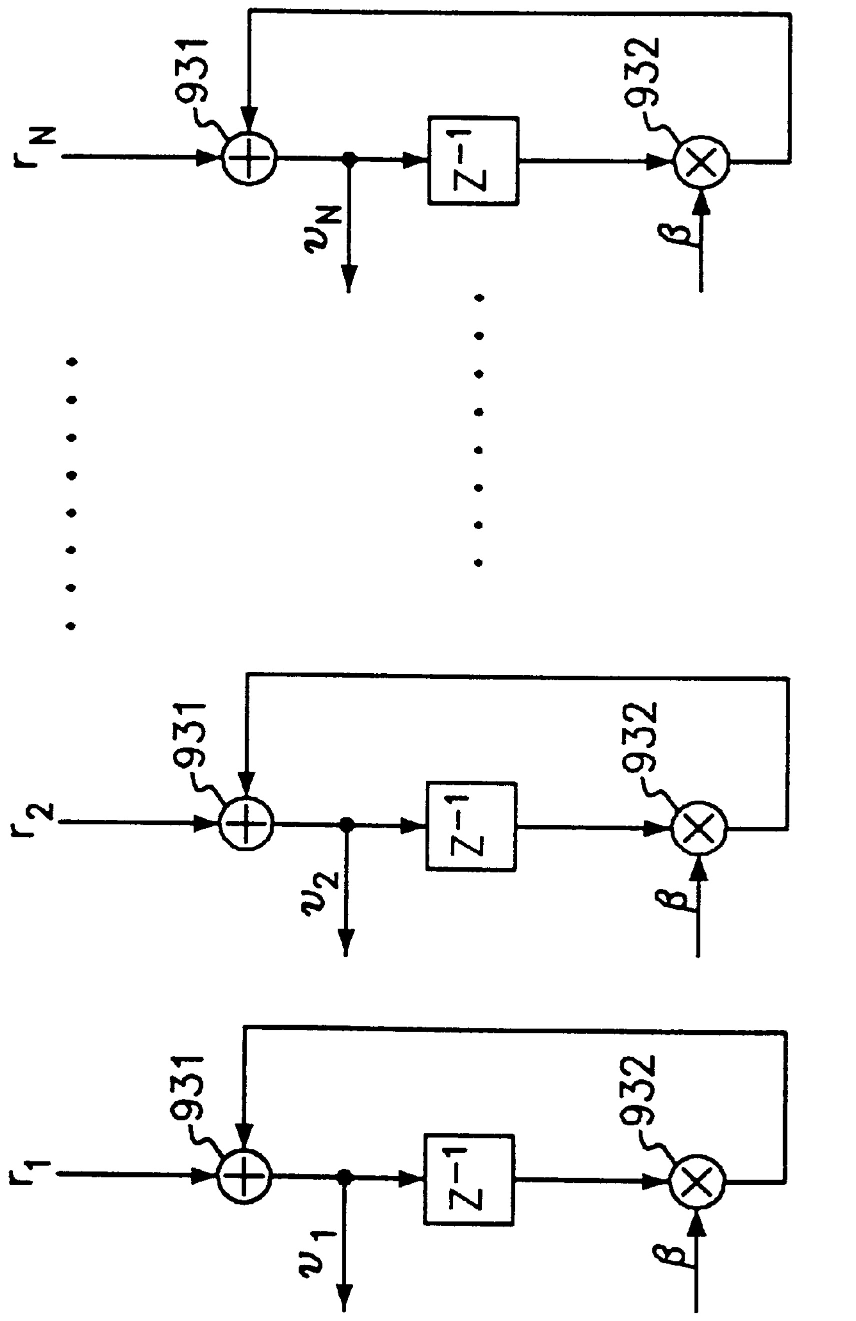
FIG. 7 is an example of the specified structure of the search direction vector synthesizing part shown in FIG. 1.

FIG. 7 illustrates an example of the specified structure of the search direction vector synthesizing part 93 shown in FIG. 1.

As illustrated in FIG. 7, the search direction vector synthesizing part 93 comprises the following parts: plural multiplying parts 932 for multiplying the scalar quantity (β) to each element of the search direction vector (υ) of the last previous snapshot; and plural adding parts 931 for producing the search direction vector (υ) of the present snapshot, by adding the corresponding element of the residue vector (r) and the output of the corresponding multiplying parts 932.

At the very first snapshot the residue vector itself produced from the residue vector synthesizing part 91 becomes the search direction vector. From the second snapshot and on, after computing the multiplication at the plural multipliers 932 between the scalar quantity and each element of the search direction vector obtained at the last previous snapshot, the search direction vector is produced by adding the output of the multipliers 932 to each element of the residue vector. After all, the search direction vector is computed in accordance with the following equation:

$$\upsilon(J+1)=\gamma(J+1)+\beta\upsilon(J)$$

where υ(J+1), γ(J+1), β, and υ(J) denote the search direction vector and residue vector at J+1st snapshot, β is the scalar quantity, and υ(J) is the residue vector obtained at the J_th snapshot.

EMBODIED EXAMPLE 2

Figure 8:
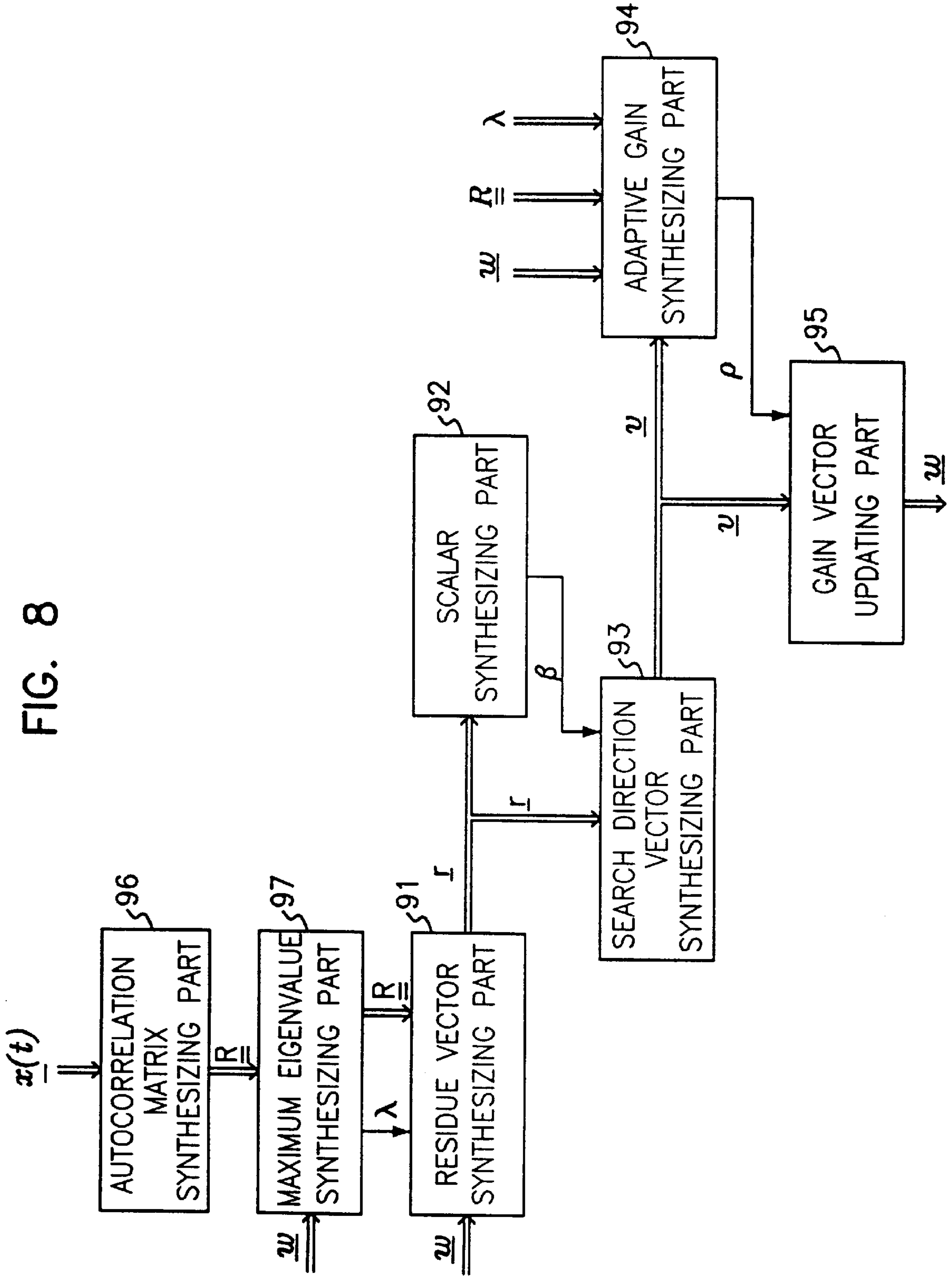
FIG. 8 is a block diagram of a signal processing apparatus according to another embodiment of the present invention.

FIG. 8 is a block diagram of a signal processing apparatus according to the second embodiment of the present invention.

As shown in FIG. 8, the signal processing apparatus according to the present invention further includes an autocorrelation matrix synthesizing part 96 and a maximum eigenvalue synthesizing part 97, in addition to all the parts included in the signal processing apparatus shown in FIG. 1, i.e., the residue vector synthesizing part 91, the scalar synthesizing part 92, the search direction vector synthesizing part 93, the adaptive gain synthesizing part 94, and the gain vector updating part 95.

The autocorrelation matrix synthesizing part 96 produces a autocorrelation matrix at each snapshot, and the maximum eigenvalue synthesizing part 97 produces an estimated value for the maximum eigenvalue of the autocorrelation matrix produced in the autocorrelation matrix synthesizing part 96.

The residue vector synthesizing part 91 produces the residue vector at each snapshot by utilizing the autocorrelation matrix generated from the autocorrelation matrix synthesizing part 96, the maximum eigenvalue generated from the maximum eigen value synthesizing part 97, and the value of the gain vector of the present snapshot.

The scalar synthesizing part 92 produces the scalar value which is needed to compute the search direction vector, by utilizing the residue vector.

The search direction vector synthesizing part 93 produces the search direction vector from the residue vector and the scalar value, of which the detailed structure is the same as shown in FIG. 7.

The adaptive gain synthesizing part 94 produces the adaptive gain at each snapshot by utilizing the autocorrelation matrix, the search direction vector, the maximum eigenvalue, and the gain vector.

Finally, the gain vector updating part 95 produces the gain vector by updating the gain vector at the last previous snapshot by utilizing the search direction vector and adaptive gain.

Figure 9:
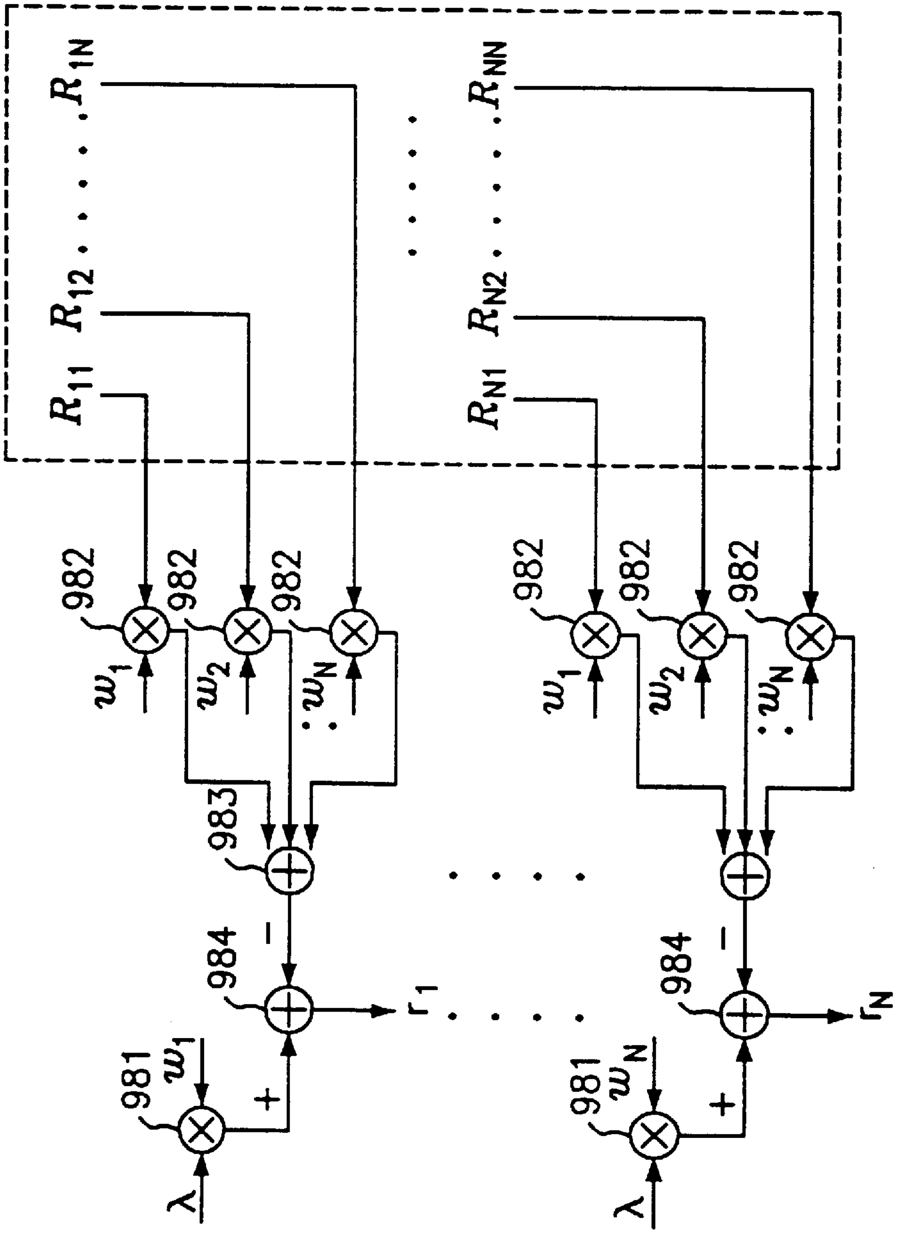
FIG. 9 is an example of the specified structure of the residue vector synthesizing part shown in FIG. 8.

FIG. 9 is an example of the specified structure of the residue vector synthesizing part 91 of the signal processing apparatus shown in FIG. 8.

The residue vector synthesizing part 91 shown in FIG. 9 produces the residue vector utilizing the gain vector (w) and the maximum eigenvalue (λ) estimated at each snapshot from the autocorrelation matrix synthesized at the autocorrelation matrix synthesizing part 96 based on the equation (4).

As illustrated in the figure, the autocorrelation matrix synthesizing part 91 comprises the following parts: plural multiplying parts 982 to multiply, one by one, the element of each row of the autocorrelation matrix (R) by each corresponding element of the gain vector; plural adding parts 983, of which the number is as many as the number of rows of the autocorrelation matrix, for adding the outputs of the multiplying parts 982; plural multiplying parts 981 for multiplying every element of the gain vector by the maximum eigenvalue (λ) that has been estimated presently; and plural adding parts 984 for subtracting, one by one, each output of the adding parts 983 from each corresponding output of the multiplying parts 981.

Therefore, the residue vector (r) is produced at the residue vector synthesizing part (91) based on:

$$r=\lambda w-Rw.$$

Figure 10:
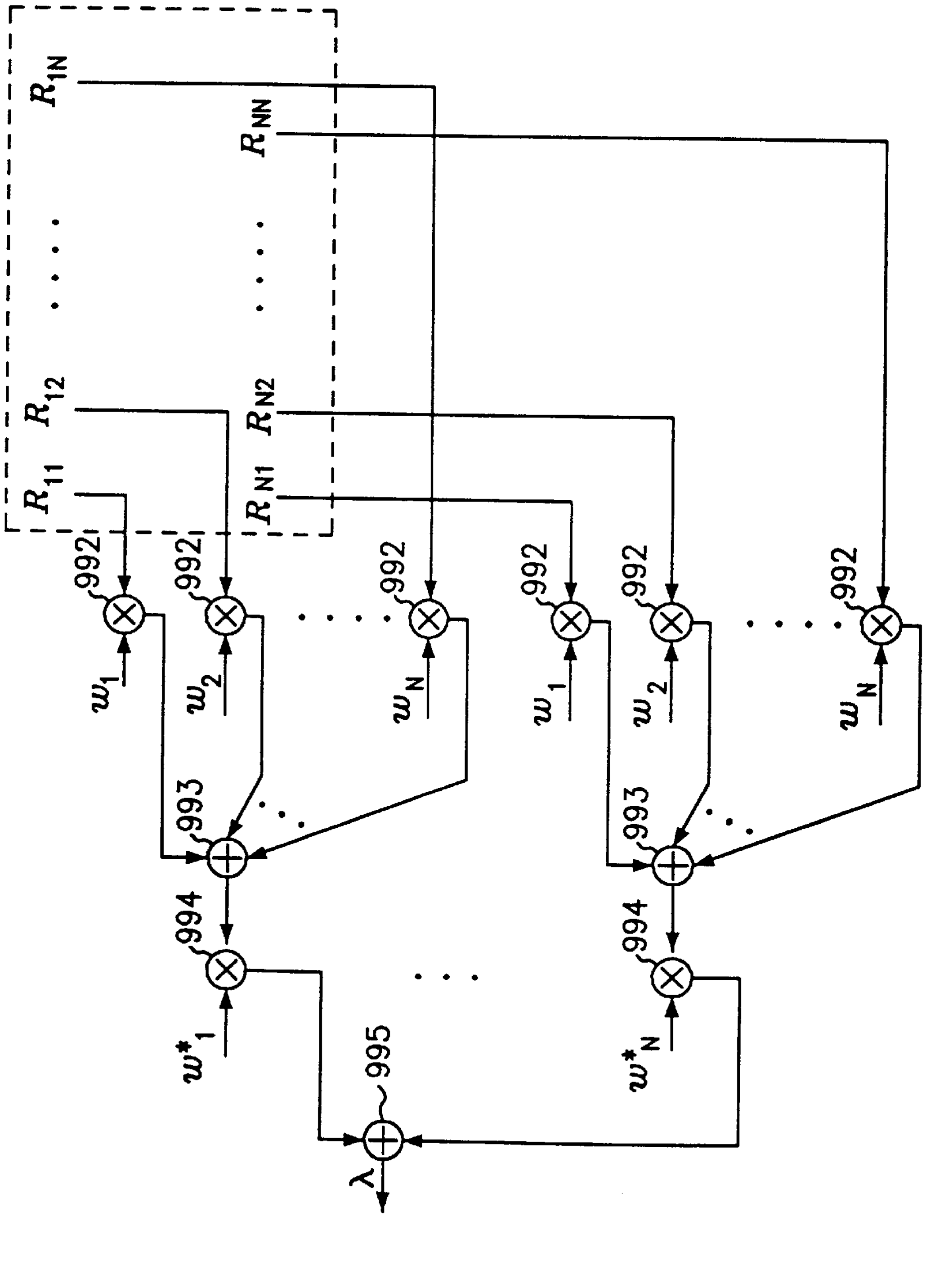
FIG. 10 is an example of the specified structure of the maximum eigenvalue synthesizing part shown in FIG. 8.

FIG. 10 is an example of the specified structure of the maximum eigenvalue synthesizing part 97 of the signal processing apparatus described in FIG. 8.

As illustrated in the figure, the maximum eigenvalue synthesizing part 97 estimates the maximum eigenvalue (λ) from the autocorrelation matrix and the value of the gain vector (w) of the present snapshot.

The maximum eigenvalue synthesizing part 97 comprises the following parts: plural multiplying parts 992 for multiplying, one by one, each element of each row of the autocorrelation matrix by the corresponding element of the gain vector at the present snapshot; plural adding parts 993 for adding the outputs of the multiplying parts 992 each set of which are connected to the corresponding row; plural multiplying parts 994 for multiplying, one by one, each output of the adding parts 993 by the complex conjugate of each corresponding element of the gain vector at the present snapshot; and an adding part 995 for producing the estimated value for the maximum eigenvalue of the autocorrelation matrix of the present snapshot by adding the outputs of the multiplying parts 994 each of which is prepared for each corresponding row.

Finally, the maximum eigenvalue (λ) is produced at each snapshot for the normalized gain vector in accordance with the following equation:

$$\lambda = w^H R w.$$

Figure 11:
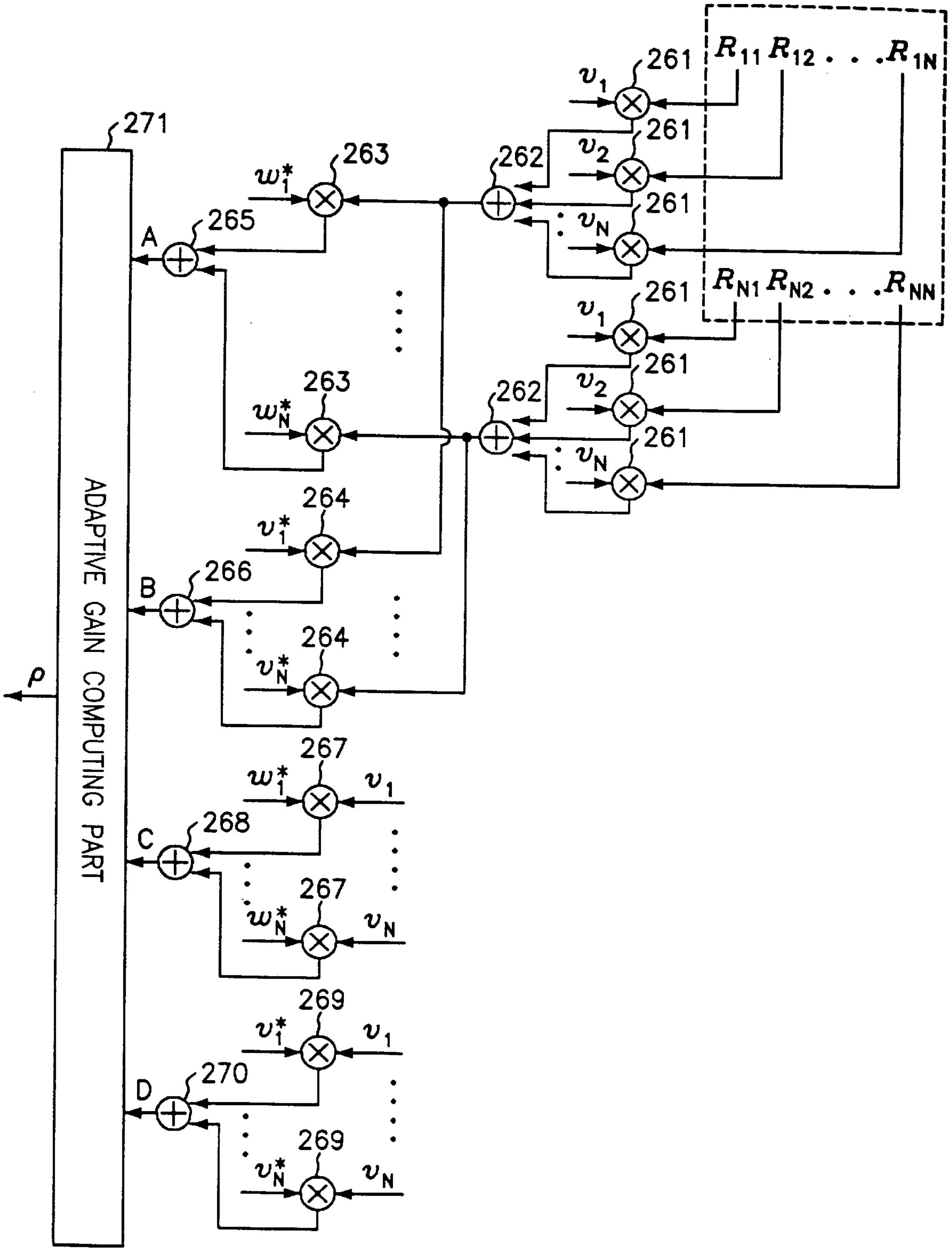
FIG. 11 is an example of the specified structure of the adaptive gain synthesizing part shown in FIG. 8.

FIG. 11 is an example of the specified structure of the adaptive gain synthesizing part 94 of the signal processing apparatus shown in FIG. 8.

The adaptive gain synthesizing part 94 comprises the following parts: plural multiplying parts 261 for multiplying, one by one, each element of each row of the autocorrelation matrix by the corresponding element of the search direction vector; adding parts 262, of which the number is as many as the number of rows of the autocorrelation matrix, for adding the results of the multiplying parts 261 for each row of the autocorrelation matrix; plural multiplying parts 263 for multiplying each output of the adding parts 262 by the complex conjugate of each element of the gain vector; an adding part 265 for adding all the outputs of the multiplying parts 263; plural multiplying parts 264 for multiplying each output of the adding parts 262 by the complex conjugate of each corresponding element of the search direction vector; an adding part 266 for adding all the outputs of the multiplying parts 264; plural multiplying parts 267 for multiplying each element of the search direction vector by the complex conjugate of each corresponding element of the gain vector; an adding part 268 for adding all the outputs of the multiplying parts 267; plural multiplying parts 269 for multiplying each element of the search direction vector by the complex conjugate of the each element, one by one; an adding part 270 for adding all the outputs of the multiplying parts 269; and an adaptive gain computing part 271 for computing the adaptive gain from the outputs of the adding parts 265, 266, 268, and 270.

The adaptive gain computing part 271 generates the adaptive gain (ρ) at each snapshot, in accordance with the equation given below:

$$\rho = \frac{-F - \sqrt{F^2 - 4EG}}{2E}$$

where E, F, and G are defined as:

$E = B \cdot \mathrm{Re}[C] - D \cdot \mathrm{Re}[A]$, $F = B - \lambda \cdot D$, $G = \mathrm{Re}[D] - \lambda \cdot \mathrm{Re}[C]$, with A, B, C, and D being the output of the adding part 265, the output of the adding part 266, the output of the adding part 268, and the output of the adding part 270 respectively, and λ is the maximum eigenvalue, and Re[·] denotes the real part of the complex quantity "·".

Computing A, B, C, and D as explained above, the values are obtained by:

$A = w^H R \upsilon$, $B = \upsilon^H R \upsilon$, $C = w^H \upsilon$, $D = |\upsilon|^2$.

EMBODIED EXAMPLE 3

In this embodied example, the procedure of designing the signal processing apparatus by computing the weight vector is introduced. This procedure is a compromised version of the Embodied Examples 1 and 2, i.e., the procedure proposed in this embodied example is a little inferior to that of Embodied Example 1 but a lot better than that of Embodied Example 2 in the complexity of the entire procedure, and, in terms of performances, the procedure proposed in this embodied example is almost comparable to that of Embodied Example 2 but much better than that of Embodied Example 1.

Figure 12:
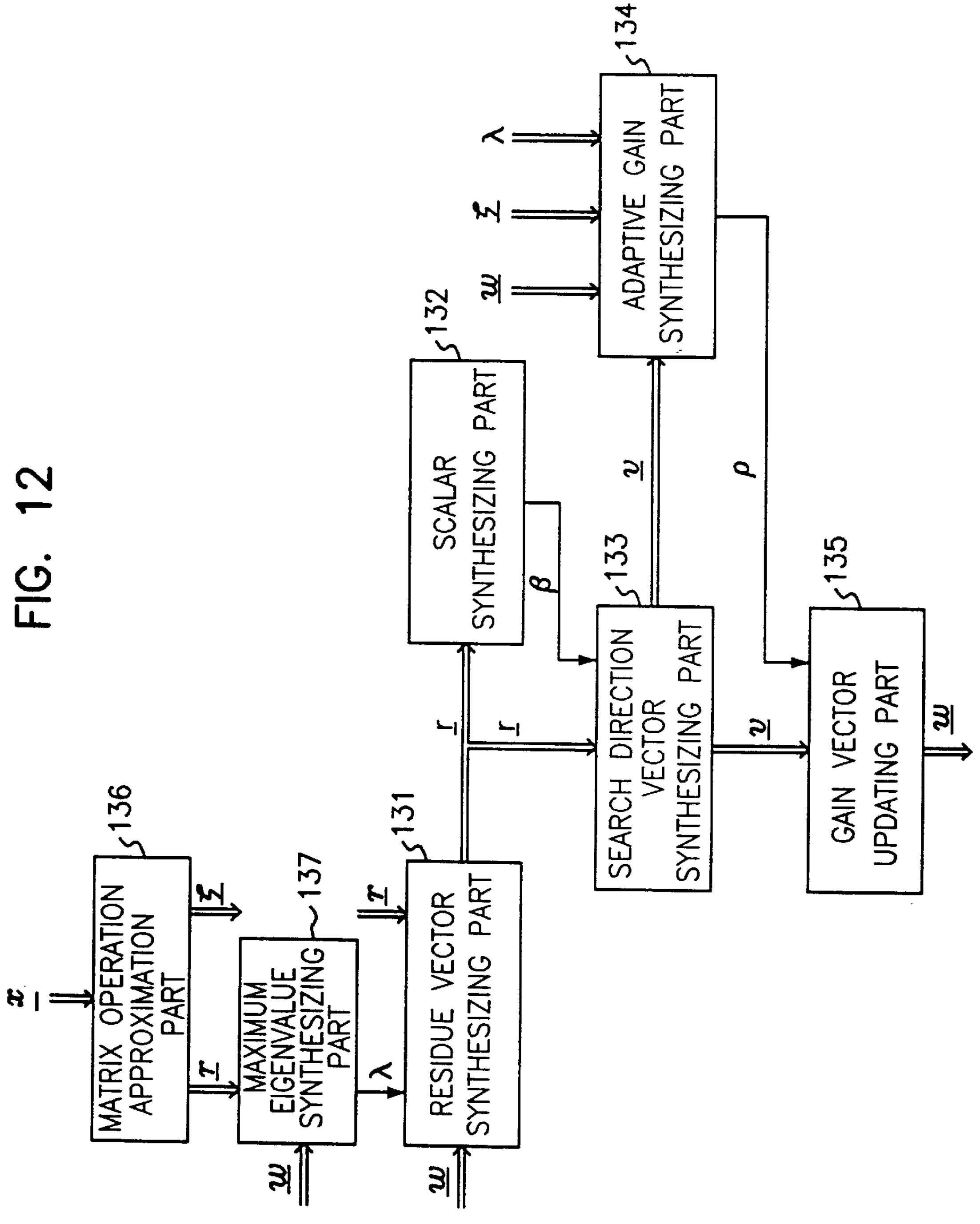
FIG. 12 is a block diagram of a signal processing apparatus according to another embodiment of the present invention.

FIG. 12 is a block diagram of a signal processing apparatus according to another embodiment of the present invention.

As shown in FIG. 12, the signal processing apparatus according to the third embodied example has exactly the same structure as that in FIG. 8 except that the autocorrelation matrix synthesizing part 96 has been substituted by the matrix operation approximation part 136.

In the matrix operation approximation part 136 for approximating the matrix operations, instead of directly performing the matrix operations pertaining to the autocorrelation matrix, the two matrix-oriented operations are approximated with the proper vector operations and the results, which are gamma vector and zeta vector, are fed to the maximum eigenvalue synthesizing part 137, the residue vector synthesizing part 131, and the adaptive gain synthesizing part 134.

Therefore, the signal processing apparatus shown in FIG. 12 has exactly the same structure as that shown in FIG. 8 except that the input of the maximum eigenvalue synthesizing part 137, the residue vector synthesizing part 131, and the adaptive gain synthesizing part 134 is the gamma and zeta vector, which are the results of approximating the matrix operations with the proper vector operations, instead of the autocorrelation matrix itself.

Figure 13:
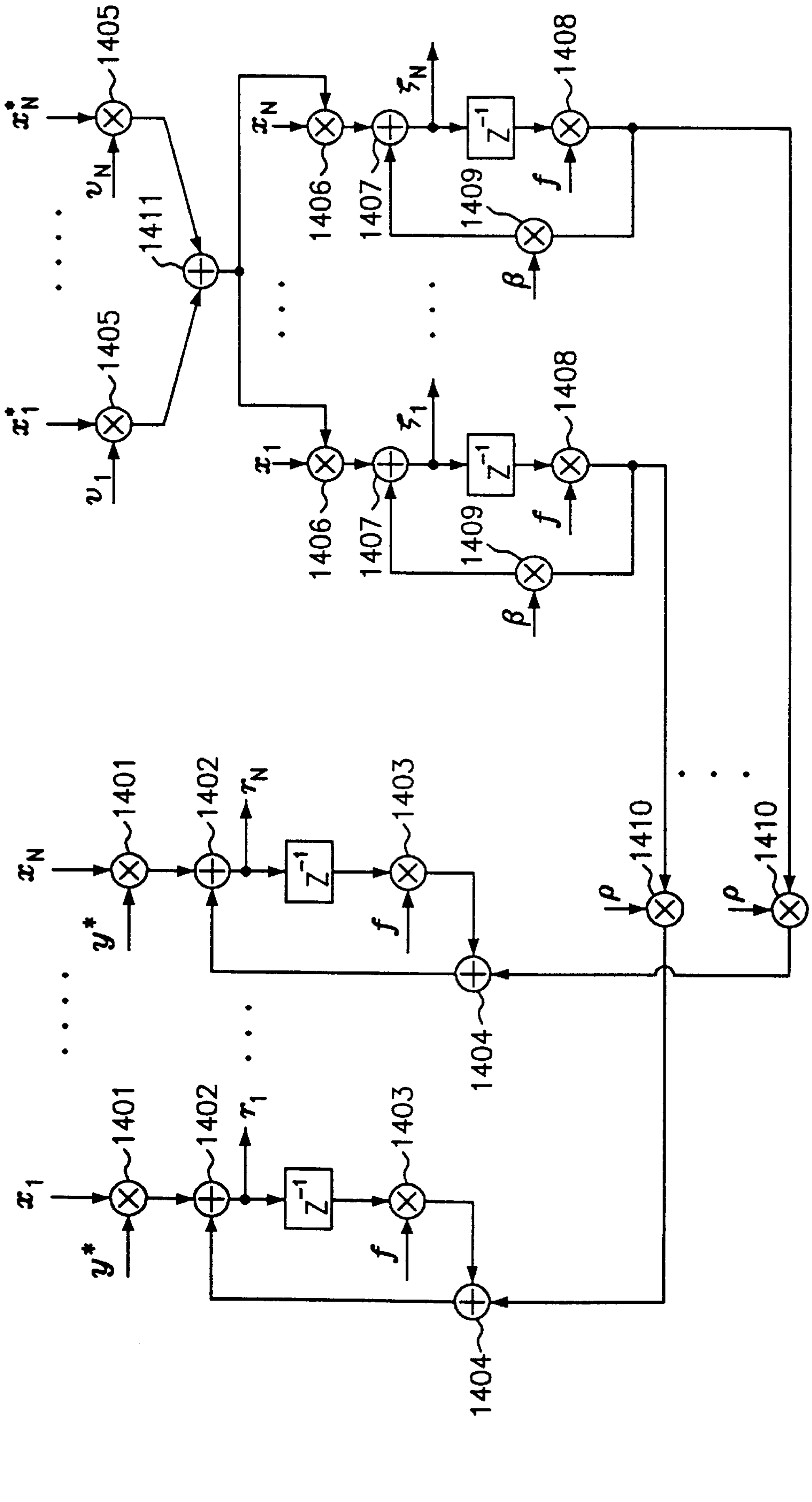
FIG. 13 is an example of the specified structure of the matrix operation approximation part shown in FIG. 12.

FIG. 13 is an example of the specified structure of the matrix operation approximation part 136 shown in FIG. 12.

As shown in the figure, the matrix operation approximation part 136 comprises the following parts: plural multiplying parts 1401 for multiplying each element of the signal vector (x), which is supplied from the outside, by the complex conjugate of the final array output (y(t)) of the telecommunication system, which is produced at the last previous snapshot; plural multiplying parts 1403 for multiplying each element of the gamma vector computed at the last previous snapshot by the forgetting factor (f); plural multiplying parts 1408 for multiplying each element of the zeta vector computed at the last previous snapshot by the forgetting factor (f); plural multiplying parts 1410 for multiplying the outputs of the multiplying parts 1408 by the adaptive gain (ρ) generated from the adaptive gain synthesizing part 134; plural adding parts 1404 for adding the outputs of the multiplying parts 1410 to the outputs of other multiplying parts 1403; plural adding parts 1402 for adding the outputs of the adding parts 1404 to the outputs of the multiplying parts 1401; plural multiplying parts 1405 for multiplying the complex conjugate of each element of the signal vector (x), by each corresponding element of the search direction vector (v), which is generated from the search direction vector synthesizing part 133; an adding part 1411 for adding up all the outputs of the multiplying parts 1405; plural multiplying parts 1406 for multiplying the outputs of the adding parts to each element of the signal vector (x); plural multiplying parts 1409 for multiplying the outputs of the multiplying parts 1408 by the scalar quantity (β); and plural adding parts 1407 for adding the outputs of the multiplying parts 1409 to each corresponding output of the multiplying parts 1406.

The matrix operation approximation part 136 for approximating the matrix operations generates the gamma vector (γ) and the zeta vector (ζ) at the two sets of adding parts, i.e., 1402 and 1407, respectively. The gamma vector (γ) is fed to the maximum eigenvalue synthesizing part 137 and the residue vector synthesizing part 131. The zeta vector (ζ) is fed to the adaptive gain synthesizing part 134.

Figure 14:
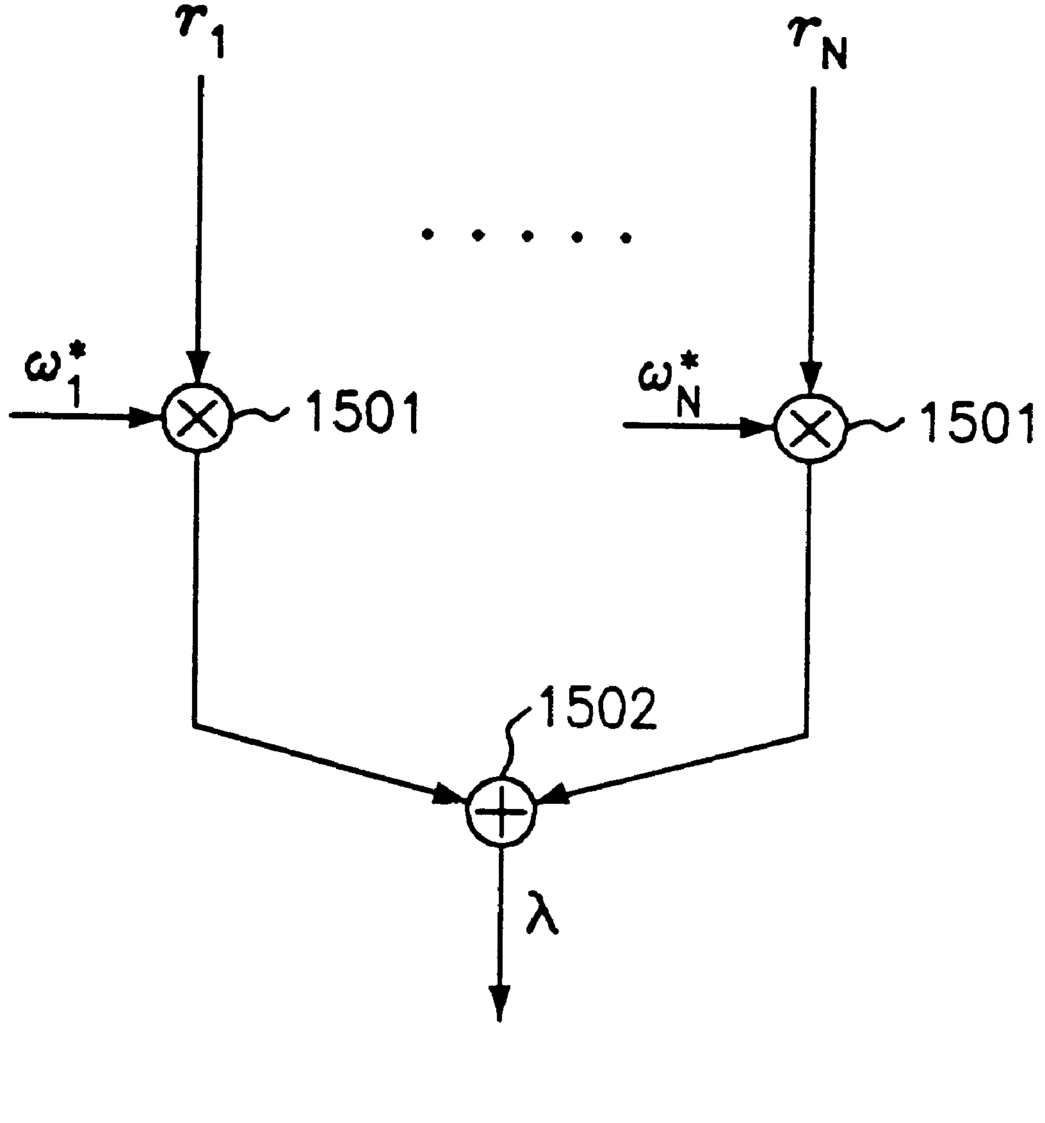
FIG. 14 is an example of the specified structure of the maximum eigenvalue synthesizing part shown in FIG. 12.

FIG. 14 is an example of the specified structure of the maximum eigenvalue synthesizing part 137 shown in FIG. 12.

As illustrated in FIG. 14, the maximum eigenvalue synthesizing part 137 comprises the following parts: plural multiplying parts 1501 for multiplying each element of the gamma vector (γ), which is supplied from the part 136 of approximating the matrix operations, by the complex conjugate of each corresponding element of gain vector (w); and an adding part 1502 for adding up all the outputs of the multiplying parts 1501.

The output of the adding part 1502 is provided as the output (λ) of the maximum eigenvalue synthesizing part 137.

Figure 15:
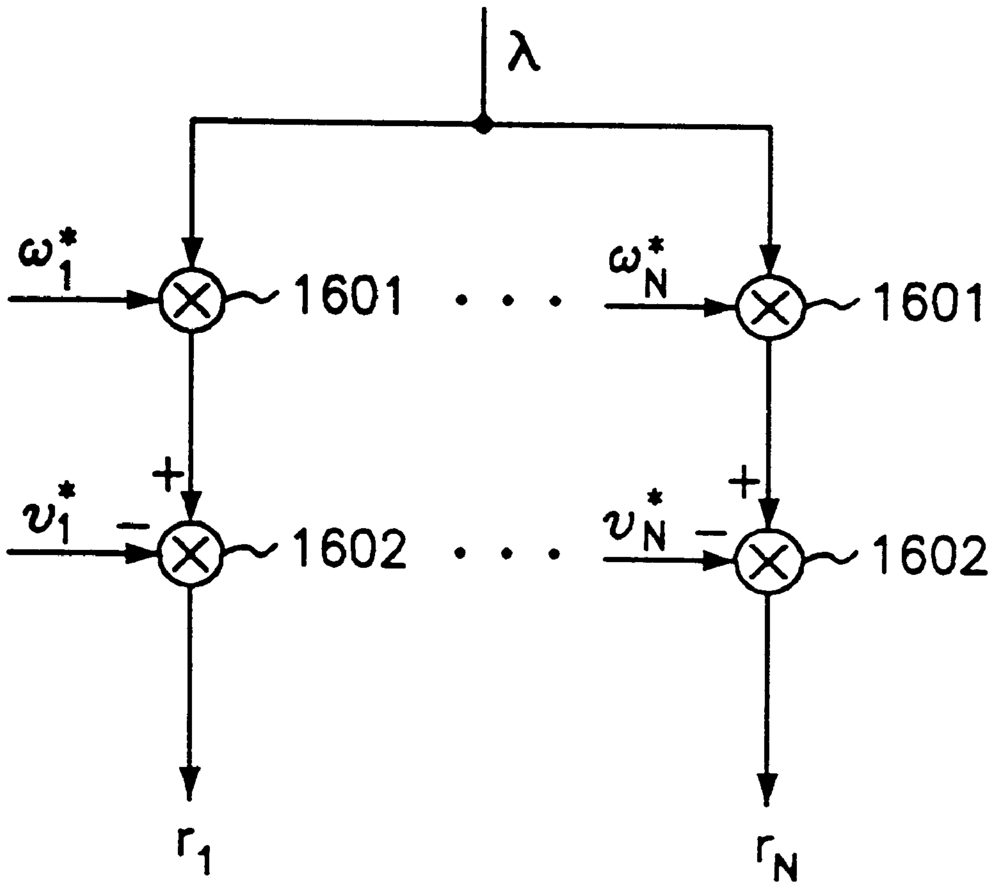
FIG. 15 is an example of the specified structure of the residue vector synthesizing part shown in FIG. 12.

FIG. 15 is an example of the specified structure of the residue vector synthesizing part 131 shown in FIG. 12.

As illustrated in FIG. 15, the residue vector synthesizing part 131 comprises the following parts: plural multiplying parts 1601 for multiplying the value of each element of the gain vector (w) at the present snapshot by the maximum eigenvalue (λ) obtained from the maximum eigenvalue synthesizing part 137; and plural adding parts 1602 for subtracting each element of the search direction vector (v) from the corresponding output of the multiplying part 1601.

Ultimately, what is produced in the signal processing apparatus shown in FIG. 12 is the residue vector (γ) satisfying the following equation:

$$r=\lambda w-\gamma$$

where λ, w, and γ denote the output of the maximum eigenvalue synthesizing part 137, the gain vector of the present snapshot and the gamma vector, which is one of the two outputs of the part 136 of approximating the matrix operations, respectively.

Figure 16:
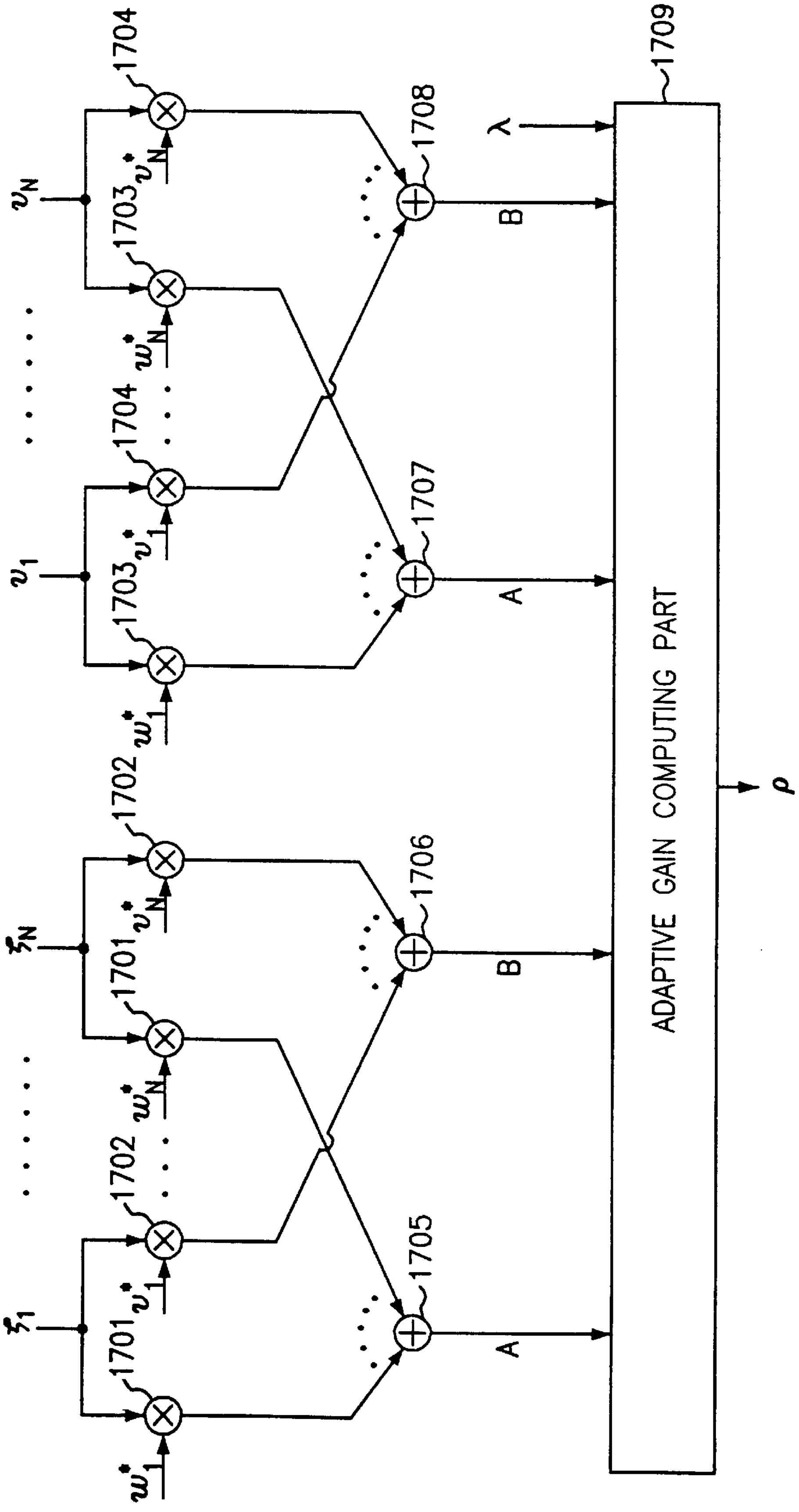
FIG. 16 is an example of the specified structure of the adaptive gain synthesizing part shown in FIG. 12.

FIG. 16 is an example of the specified structure of the adaptive gain synthesizing part 134 of the signal processing apparatus shown in FIG. 12.

As illustrated in FIG. 16, the adaptive gain synthesizing part 134 comprises the following parts: plural multiplying parts 1704 for multiplying each element of the search direction vector (v) by the corresponding complex conjugate of the same element; an adding part 1708 for adding up all the outputs of the multiplying parts 1704; plural multiplying parts 1703 for multiplying each element of the search direction vector (v) by the complex conjugate of each corresponding element of the gain vector (w); an adding part 1707 for adding up all the outputs of the multiplying parts 1703; plural multiplying parts 1701 for multiplying, one by one, each element of the zeta vector (ζ) by the complex conjugate of each corresponding element of the gain vector (w); an adding part 1705 for adding up all the outputs of the multiplying parts 1701; plural multiplying parts 1702 for multiplying, one by one, each element of the zeta vector (ζ) by the complex conjugate of each corresponding element of the search direction vector (v); an adding part 1706 for adding up all the outputs of the multiplying parts 1702; and an adaptive gain computing part 1709 for computing the adaptive gain (ρ) from the outputs of the adding parts 1705, 1706, 1707, and 1708.

The adaptive gain computing part 1709 described above generates the adaptive gain (ρ) in accordance with the equation given below:

$$\rho=\frac{-F-\sqrt{F^2-4EG}}{2E}$$

where E, F, and G are defined as:

$E=B\cdot Re[C]-D\cdot Re[A]$, $F=B-\lambda\cdot D$, $G=Re[D]-\lambda\cdot Re[C]$, with A, B, C, and D being the output of the adding part 1705, the output of the adding part 1706, the output of the adding part 1707, and the output of the adding part 1708, respectively, i.e.:

$A=w^H\cdot\zeta$, $B=v^H\cdot\zeta$, $C=w^H\cdot v$, $D=v^H\cdot v$, and λ is the maximum eigenvalue and Re[·] denotes the real part of the complex quantity "·".

Figure 17:
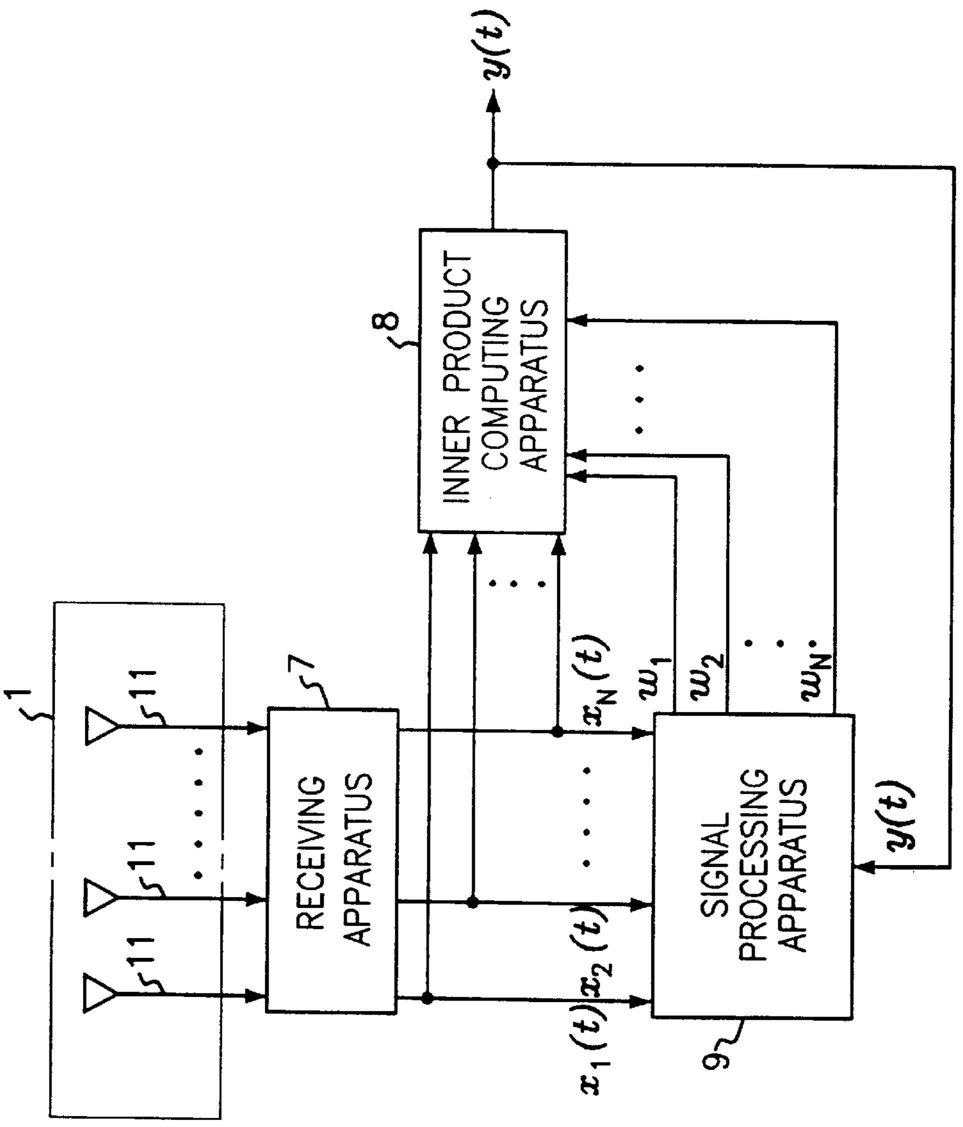
FIG. 17 shows a schematic block diagram of a telecommunication system that utilizes the signal processing apparatus according to the present invention shown in FIG. 1, 8 or 12.

FIG. 17 shows a schematic block diagram of a telecommunication system that utilizes the signal processing apparatus according to the present invention shown in FIG. 1, 8 or 12.

In FIG. 17, the reference numbers 1 denotes an array antenna, 7 a receiving apparatus, 8 an inner product computing apparatus (which is sometimes denoted as the part of generating the final array output), and 9 the signal processing apparatus according to the present invention, respectively.

As illustrated in the figure, the telecommunication system comprises the following parts: the array antenna 1 (or, called simply, "array", "antenna array", or, "array of antenna elements"), composed of the plural antenna elements 11, each of which is arranged by a predetermined geometry, that supplies the signal induced at each antenna element to the corresponding port of the receiving apparatus 7; the signal receiving apparatus 7 that generates the signal vector (x(t)) from the signals induced at each antenna element of the antenna array 1 by utilizing the proper signal-receiving parts, such as filtering, frequency-down-conversion, and demodulation; the inner product computing apparatus 8 for generating the final array output (y(t)) by computing the Euclidean inner product between the two complex-valued vectors, ($y(t)=w^Hx(t)$), i.e., the signal vector (x(t)) produced from the receiving part 7 and the gain vector (w) provided from the signal processing apparatus 9; and the signal processing apparatus 9 that computes the gain vector (w) by processing the signal vector (x(t)) together with the final array output (y(t)) obtained at the last previous snapshot for the inner product computing apparatus 8 to generate the final array output (y(t)) at the present snapshot.

The telecommunication system consists of the receiving apparatus 7, the signal processing apparatus 9, and the inner product computing apparatus 8 for generating the final array output. The receiving apparatus generates the signal vector (x(t)) from the signals induced at the antenna elements 11 through the conventional signal reception part, such as the frequency-down-conversion and demodulation.

When the technique provided in this invention is applied in the CDMA (Code Division Multiple Access) system, the receiving apparatus 7 includes the cross-correlation part for cross-correlating the demodulated received signal with the code sequence assigned to the wanted signal source. The signal vector (x(t)) obtained from the receiving apparatus 7 is sent to the signal processing apparatus 9 and the inner product computing apparatus 8.

The signal processing apparatus 9 produces the optimal gain vector (w), which is sometimes referred to as "weight vector", from the signal vector (x(t)) at the present snapshot and the final array output (y(t)) computed at the last previous snapshot. The optimal weight vector (w) is sent to the inner product computing apparatus for the final array output (y(t)) of the next snapshot to be computed as a result of the inner product of the signal vector (x(t)) and weight vector (w), i.e., $y(t)=w^H x(t)$.

The key part of the telecommunication system shown in FIG. 17 is the signal processing apparatus 9 producing the optimal weight vector (x(t)), which gives the array antenna system the optimal beam pattern having its maximum gain along the direction of the wanted signal source and small gain to the direction of the interfering signal sources.

EMBODIED EXAMPLE 4

In this embodied example, the technique of designing the signal processing apparatus of the telecommunication system with an array antenna will be disclosed. The technique achieves the above-mentioned object, by computing the phase delay vector generating the beam pattern having its maximum gain along the direction of the desired signal source, in the signal environment where the desired signal is much larger than each of interfering signals.

Figure 18:
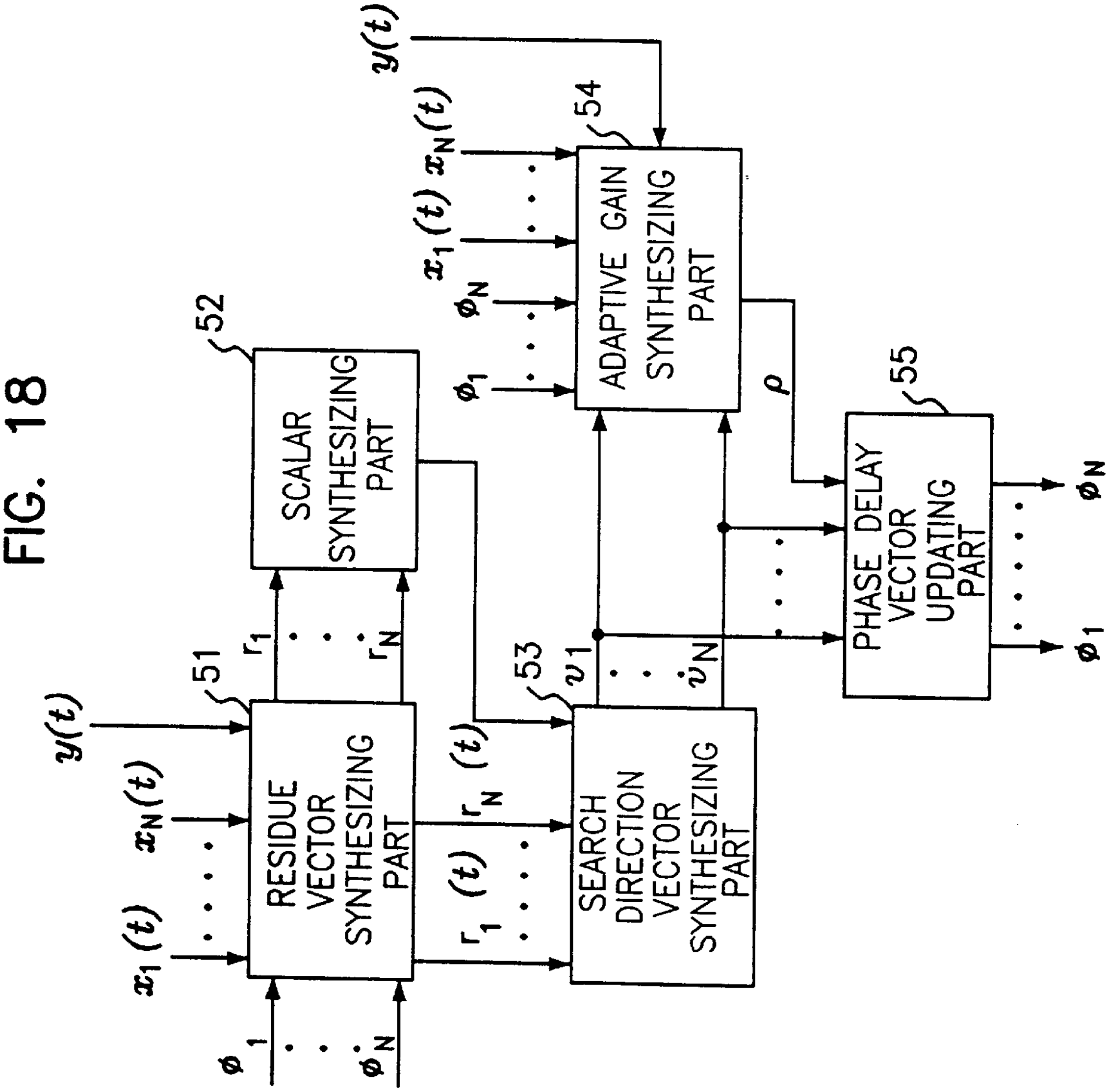
FIG. 18 is a block diagram of a signal processing apparatus according to another embodiment of the present invention.

FIG. 18 is a block diagram of a signal processing apparatus according to another embodiment of the present invention.

In the figure, the reference number 51 denotes a residue vector synthesizing part, 52 a scalar synthesizing part, 53 a search direction vector synthesizing part, 54 an adaptive gain synthesizing part, and 55 a phase delay vector synthesizing part, respectively.

As illustrated in the figure, the signal processing apparatus according to the forth embodied example comprises the following parts: the residue vector synthesizing part 51 for generating a residue vector by utilizing a received signals (x(t)) of the present snapshot, provided from antenna elements of the telecommunication system at every snapshot, a final array output signal (y(t)) of the telecommunication system at the last previous snapshot, and a phase delay vector during the last previous snapshot, and for outputting the residue vector; the scalar synthesizing part 52 connected to an output of the residue vector synthesizing part 51, for synthesizing a scalar value from the residue vector; the search direction vector synthesizing part 53 respectively connected to another output of the residue vector synthesizing part 51 and an output of the scalar synthesizing part 52, for producing a search direction vector from the residue vector and the scalar value; the adaptive gain synthesizing part 54 for generating a value of adaptive gain by utilizing the received signals of present snapshot provided from the array antenna elements, the final array output signal of the telecommunication system at last previous snapshot, the search direction vector of the present snapshot provided from the search direction vector synthesizing part 53, and the phase delay vector during the last previous snapshot, and for outputting the value of the adaptive gain; and the phase delay vector updating part 55, which is connected to the outputs of the search direction vector synthesizing part 53 and the adaptive gain synthesizing part 54, for updating the phase delay vector by utilizing the search direction vector and the adaptive gain of the present snapshot.

Figure 19:
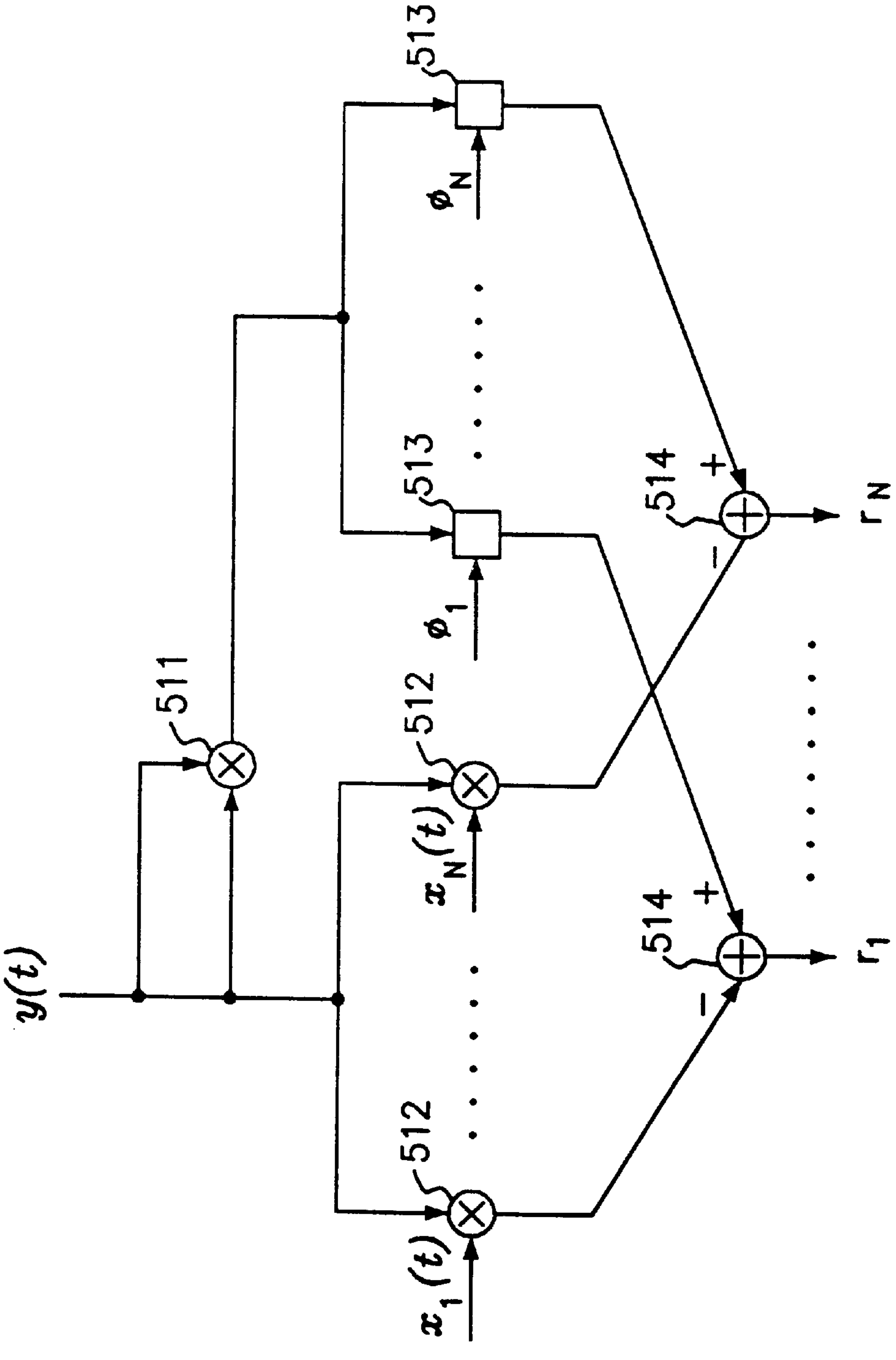
FIG. 19 is an example of the specified structure of the residue vector synthesizing part shown in FIG. 18.

FIG. 19 is an example of the specified structure of the residue vector synthesizing part 51 of the signal processing apparatus shown in FIG. 18.

As illustrated in the figure, the residue vector synthesizing part 51 comprises the following parts: a multiplying part 511 for computing the square of the current value of the final array output (y(t)); plural multiplying parts 512 for multiplying each element of the signal vector (x(t)), obtained from the received signals induced at each antenna element, by the final array output (y(t)); plural phase delaying parts 513 which cause the phase to be delayed at the output of the multiplying part 511 by the amount of each element of the phase delay vector; and plural adding parts 514 for subtracting each element of the vector computed from the multiplying parts 512 from each corresponding element of the vector obtained from the outputs of the phase delaying parts 513.

The outputs of the adding parts 514 form the residue vector.

The residue vector synthesizing part 51 shown in FIG. 19 computes the residue vector without down-converting the frequency of the received signals.

What is ultimately done in the residue vector synthesizing part 51 shown in FIG. 19 is to produce the residue vector r(J) satisfying $r(J)=\lambda(J)w(J)-R(J)w(J)$.

Since the autocorrelation matrix R(J) is computed from the instantaneous signal vector only, as described previously, the residue vector synthesizing part 51 can be simply realized, as shown in FIG. 19.

Figure 20:
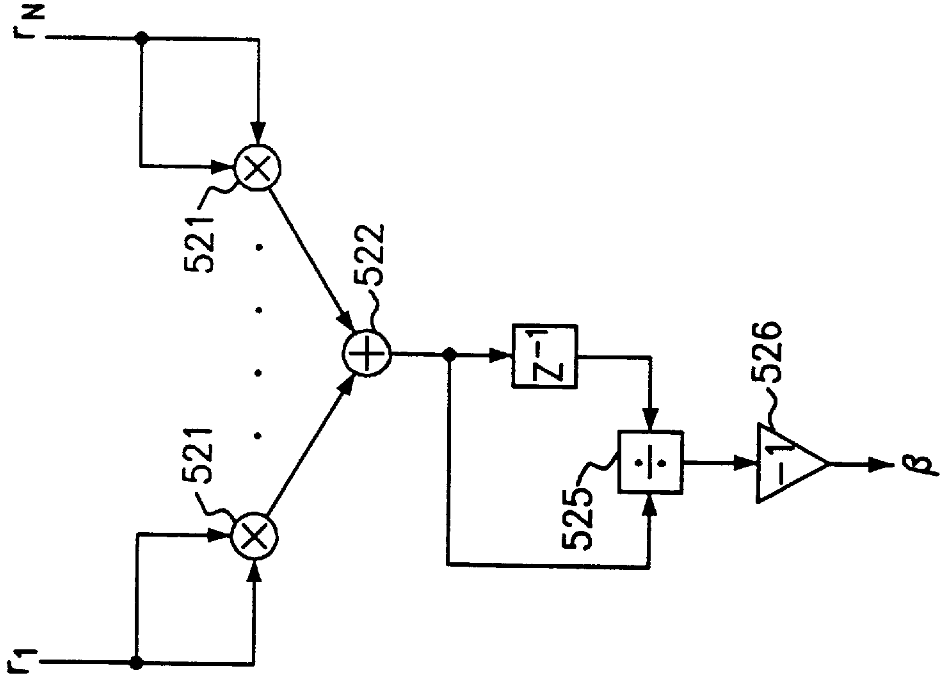
FIG. 20 is an example of the specified structure of the scalar synthesizing part shown in FIG. 18.

FIG. 20 is an example of the specified structure of the scalar synthesizing part of the signal processing apparatus shown in FIG. 18.

The scalar synthesizing part 52 comprises the following parts: plural multiplying parts 521 for computing the square of the magnitude of each element of the residue vector at the present snapshot; an adding part 522 for adding up all the outputs of the multiplying parts 521; a dividing part 525 that divides the output of the adding part 522 at the present snapshot with the output of the adding part 522 at the previous snapshot; and a sign exchanging part 526 which multiplies '−1' to the output of the dividing part 525.

The scalar quantity obtained in the scalar synthesizing part shown in FIG. 20 is used to compute the search direction vector (υ) by first multiplying each element of the search direction vector (υ) of the last previous snapshot by the scalar quantity (β), and then, adding the results of the additions to each corresponding element of the residue vector (r).

The scalar quantity (β) computed, as shown in FIG. 20, makes the search direction vector (υ) be orthogonal with respect to the autocorrelation matrix at every snapshot. Therefore, when the scalar value is computed accurately, the optimal value for the phase delay vector can be obtained with minimum amount of computation.

Figure 21:
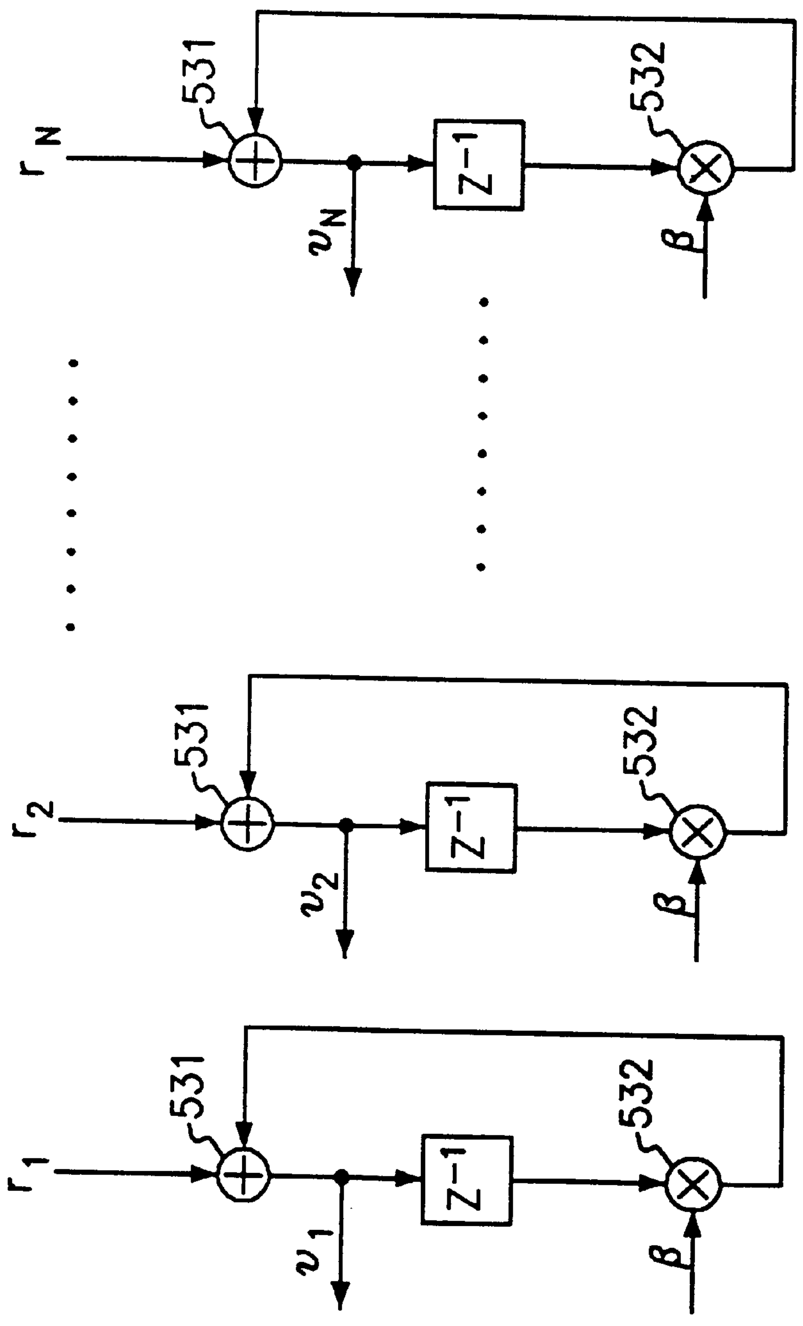
FIG. 21 is an example of the specified structure of the search direction vector synthesizing part shown in FIG. 18.

FIG. 21 is an example of the specified structure of the search direction vector synthesizing part of the signal processing apparatus shown in FIG. 18.

As illustrated in the figure, the search direction vector synthesizing part consists of the following parts: plural adding parts 531 that receive the outputs ($r_1 \ldots r_N$) of the residue vector synthesizing parts 51, respectively, for producing the search direction vector ($v_1 \ldots v_N$); and plural multiplying parts 532 for producing the inputs of the adding parts 531, respectively, by multiplying each element of the search direction vector at the last previous snapshot by the scalar quantity (β).

At the initial snapshot, the value of the residue vector is the search direction vector. From the second snapshot and on, the search direction vector takes the value of the output of the adding parts 531 of which the inputs are connected to the residue vector and the outputs of the multiplying parts 532, which multiply every element of the search direction vector of the last previous snapshot by the scalar quantity (β).

Figure 22:
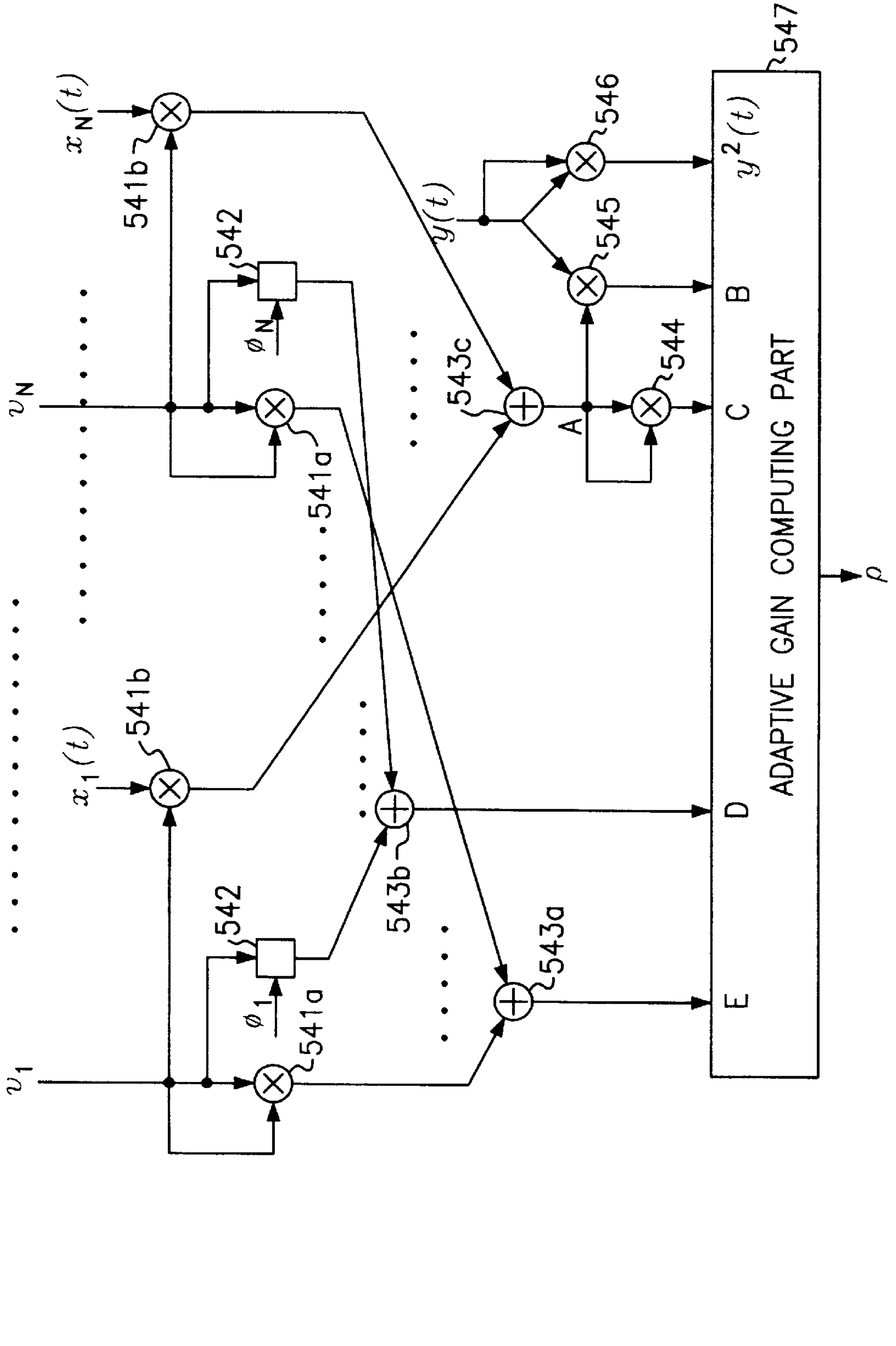
FIG. 22 is an example of the specified structure of the adaptive gain synthesizing part shown in FIG. 18.

FIG. 22 is an example of the specified structure of the adaptive gain synthesizing part 54 of the signal processing apparatus shown in FIG. 18.

As illustrated in the figure, the adaptive gain synthesizing part 54 comprises the following parts: plural multiplying parts 541*b* for multiplying, one by one, each element of the signal vector (x(t)) by the corresponding element of the search direction vector; plural multiplying parts 541*a* which compute the square of each element of the search direction vector (υ); an adding part 543*a* which adds up all the squares of the elements of the search direction vector; plural phase delaying parts 542 for delaying the phase of every element of the search direction vector by the amount determined by the corresponding element of the phase delay vector at the present snapshot, respectively; an adding part 543*b* which adds the outputs of the phase delaying parts 542; an adding part 543*c* which adds the outputs of the plural multiplying parts 541*b;* a multiplying part 544 which computes the square of the output of the adding part 543*c*; a multiplying part 545 which multiplies the output of the adding part 543*c* by the output (y(t)) of the array antenna system; a multiplying part 546 which computes the square of the output (y(t)) of the array antenna system at the present snapshot; and an adaptive gain computing part 547 that is connected to the adding parts 543*a* and 543*b*, and the multiplying parts 544, 545 and 546.

The adaptive gain computing part 547 generates the adaptive gain (ρ) in accordance with the equation given below:

$$\rho = \frac{-G - \sqrt{G^2 - 4FH}}{2F}$$

where $F=C\cdot D-B\cdot E$, $G=C-y(t)^2E$, $H=B-y(t)^2\cdot D$, with A being the output of the adding part 543*c,* B being the output of the multiplying part 545, which is the result of the multiplication of A and the final array output, C being the output of the multiplying part 544, which is the square of A, D being the output of the adding part 543*b,* and E being the output of the adding part 543*a.*

Figure 23:
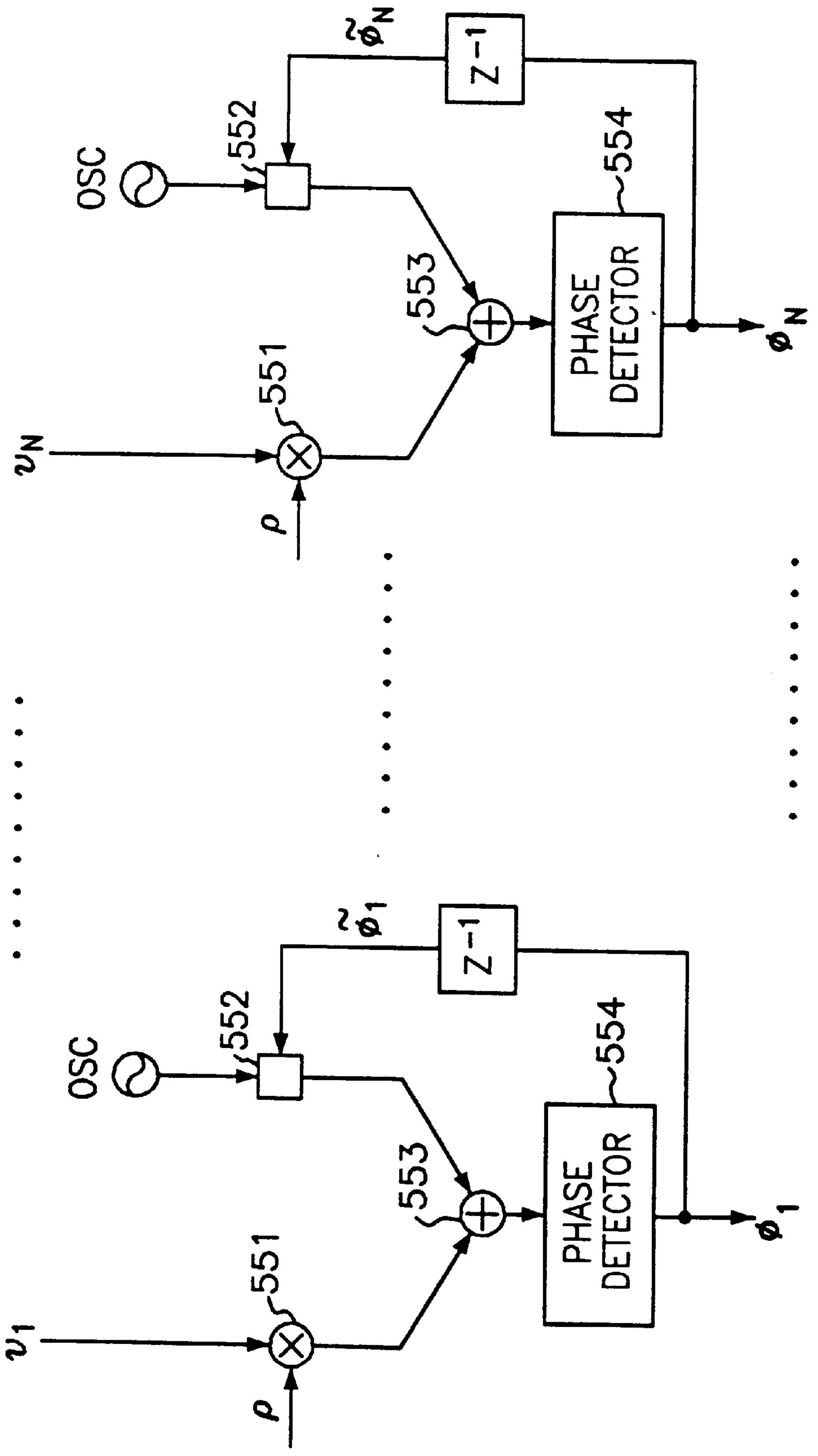
FIG. 23 is an example of the specified structure of the phase delay vector updating part shown in FIG. 18.

FIG. 23 is an example of the specified structure of the phase delay vector updating part 55 of the signal processing apparatus shown in FIG. 18.

As illustrated in the figure, the phase delay vector updating part 55 comprises the following parts: a multiplying part 551 for multiplying each element ($v_1 \ldots v_N$) of the search direction vector by the adaptive gain (ρ), which is generated from the adaptive gain synthesizing part 54; plural phase delaying parts 552 for delaying the phase of the oscillator output of which the frequency is the same as the carrier frequency of the received signal at each antenna element by the amount determined by each corresponding element of the phase delay vector at the last previous snapshot; plural adding parts 553 for adding the outputs of the multiplying parts 551 and the outputs of the phase delaying parts 552, respectively; and phase detecting parts 554 for generating the value of the phase delay vector at the present snapshot from the phase of each output of the adding part 553.

The objective of the phase delay vector updating part 55 is to generate the phase delay vector such that the phase of each element of the signal vector (x(t)) received at each snapshot is delayed by the amount of each corresponding element of the phase delay vector which is updated at each snapshot. Every element of the signal vector (x(t)), which has been delayed by the amount of the phase delay vector, is summed up to form the output of the array antenna system.

Figure 24:
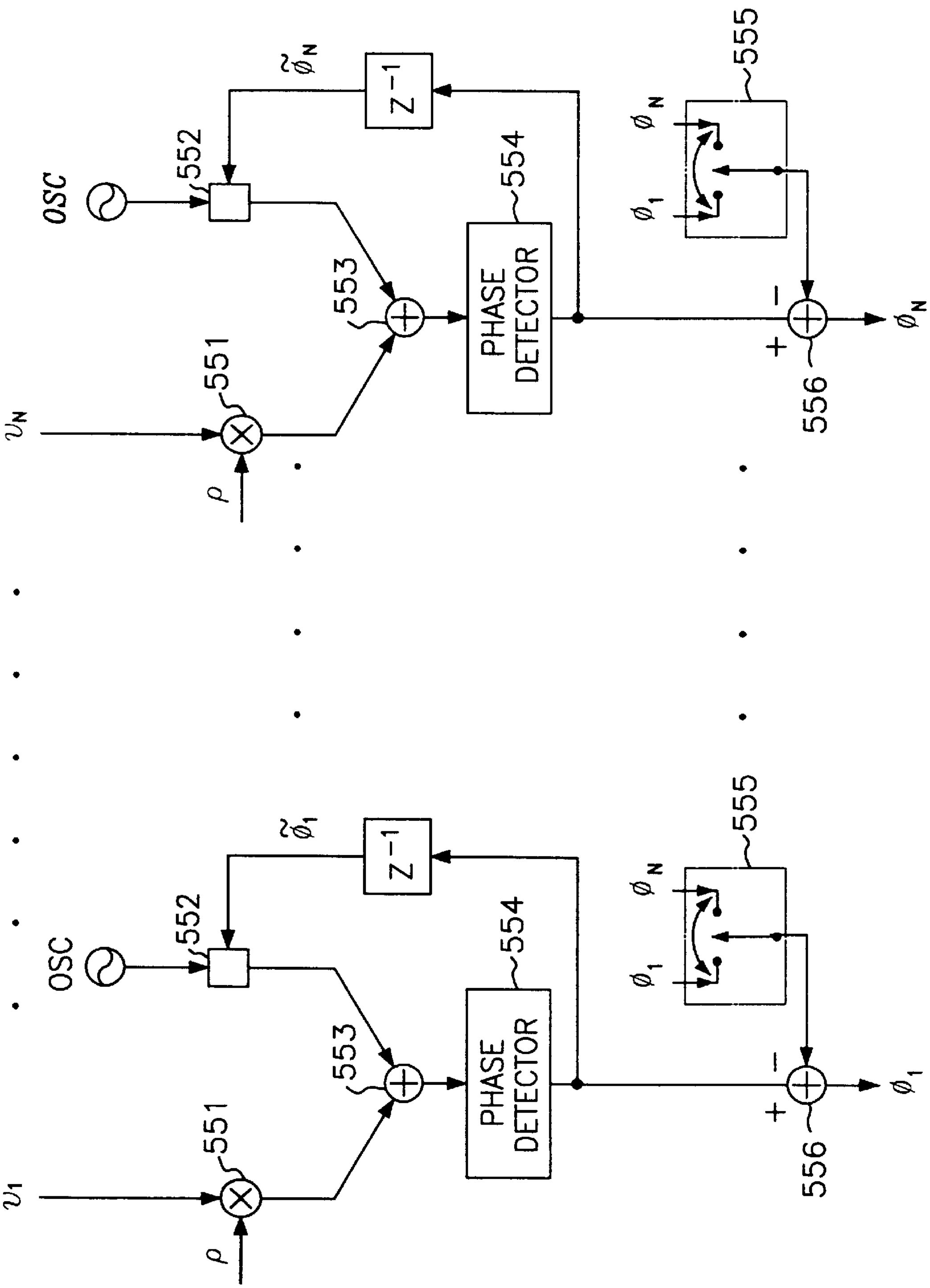
FIG. 24 is another example of the specified structure of the phase delay vector updating part shown in FIG. 18.
Figure 25:
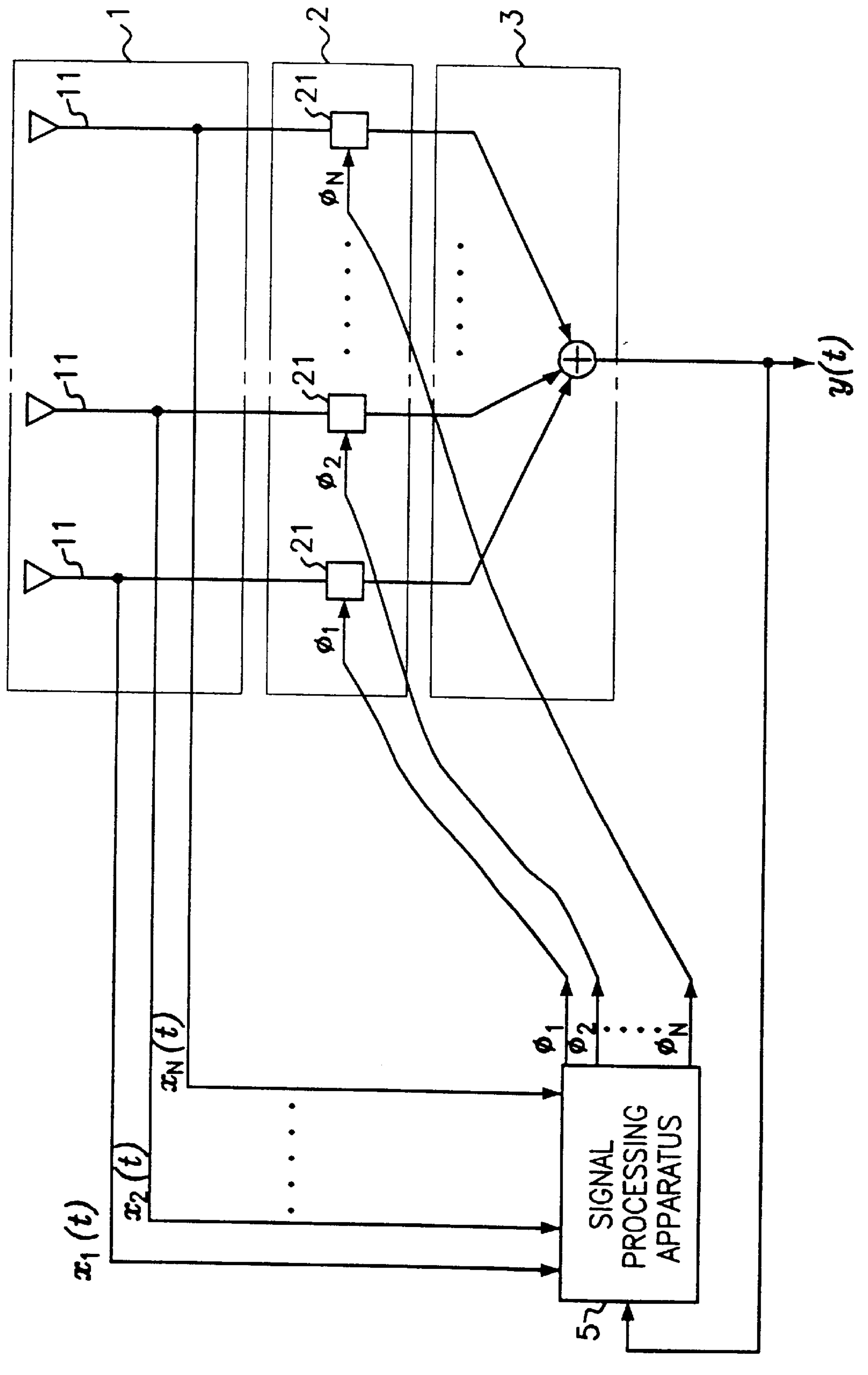
FIG. 25 shows a schematic block diagram of a telecommunication system that utilizes the signal processing apparatus according to the present invention.

FIG. 24 is another example of the specified structure of the phase delay vector updating part 55 of the signal processing apparatus shown in FIG. 18.

It includes the adding parts and the switching parts in addition to the structure of the phase delay vector updating part, as shown in FIG. 23, in order to synchronize the received signals to the signal induced at the reference antenna element.

As illustrated in FIG. 24, the phase delay vector updating part 55 includes all the parts that were included in the previous structure shown in FIG. 23, i.e., the multiplying parts 551, the phase delaying parts 552, the adding parts 553 and the phase detecting parts 554.

In addition to those parts, it includes the following: plural switching parts 555 each of which selects the smaller element after comparing the magnitude of the first element and the last element of the phase delay vector, which is generated from the phase detecting parts 554 at each snapshot; and plural adding parts 556 for subtracting each output of the switching parts 555 from the corresponding output of the phase detecting parts, respectively.

In order to produce the phase delay vector, which appends no phase delay at the signal of the reference antenna element and positive amount of phase delay at the other signals, each element of the phase delay vector obtained at the output of the phase detecting parts 554 is subtracted by the output of the switching parts each of which selects the smaller value of either the first element ($\phi_1$) or the last element ($\phi_N$) of the phase delay vector obtained from the outputs of the phase detecting parts.

As mentioned previously, the reference antenna element is defined to be the antenna element at which the induced signal has the latest phase in the receiving array. In the transmitting array system, therefore, the antenna element at which the induced signal has the earliest phase is the reference antenna element. It means that the reference antenna element to communicate with is physically located farthest from the signal source.

As mentioned earlier, the signal processing apparatus or signal processing technique provided in this invention gives the following advantages: first, the communication capacity is increased as much as the signal-to-interference ratio is increased, and second, the communication quality is enhanced as much as the signal-to-noise ratio and the signal-to-interference ratio is increased. The best feature of the proposed technique in this invention is that the required amount of computation to achieve all the merits is extremely small so that the proposed technique can be easily implemented with the normal digital signal processor in real-time processing.

Although the specific embodiments of the present invention have been disclosed and described, it is apparent that those who skilled in the art will appreciate that various modifications, additions and substitutions are possible, without departing from the scope and the spirit of the present invention as disclosed in the accompanying claims. Therefore, it should be understood that the present invention is not limited to the particular embodiment disclosed herein as the best mode contemplated for carrying out the present invention.

What is claimed is:

1. A signal processing apparatus for minimizing interference and for reducing effects of noise by controlling beam patterns of a telecommunication system having an array antenna, comprising:

a means for computing a residue vector (r), by using a signal vector (x(t)) provided from said array antenna at each snapshot, a final array output signal (y) of said telecommunication system at the last previous snapshot and a value of a gain vector (w) of the present snapshot, and for outputting said residue vector (r);

a means for synthesizing a scalar value (β), which is needed to generate a search direction vector (υ), from said residue vector (r);

a means for producing said search direction vector (υ), by using said residue vector (r) and said scalar value (β);

a means for producing an adaptive gain (ρ), by using said signal vector (x(t)), said search direction vector (υ), said final array output signal (y) of said telecommunication system at the last previous snapshot and the value of said gain vector (w) of the present snapshot; and a means for updating said gain vector (w), by using said search direction vector (υ) and said adaptive gain (ρ) at the present snapshot.

2. The signal processing apparatus according to claim 1, wherein said gain vector (w) is determined by a value of an eigenvector corresponding to the maximum eigenvalue of an autocorrelation matrix of the signals induced at each antenna element of said array antenna.

3. The signal processing apparatus according to claim 2, wherein said gain vector (w) is determined by multiplying a predetermined constant on each element of said eigenvector, corresponding to said maximum eigenvalue of said autocorrelation matrix, in order to modify said gain vector without changing beam-pattern characteristics of said eigenvector of said maximum eigenvalue.

4. The signal processing apparatus, according to claim 2, wherein said gain vector (w) is determined by normalizing said eigenvector, corresponding to said maximum eigenvalue of said autocorrelation matrix, such that a magnitude of the normalized eigenvector becomes 1 and a beam-pattern characteristics of said eigenvector of said maximum eigenvalue remains unchanged.

5. The signal processing apparatus according to claim 2, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at the present snapshot)

$$R_x(J+1)=f \cdot R_x(J)+x((J+1)T_S)x^H((J+1)T_S)$$

where $R_x(J+1)$ and $R_x(J)$ denote said autocorrelation matrix at the J+1_st and J_th snapshots, respectively, f is said forgetting factor of which the magnitude lies between 0 and 1, $T_S$ is a snapshot period, and superscript H denotes a Hermitian operator.

6. The signal processing apparatus according to claim 2, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to said signal induced at said reference antenna element at each snapshot is maintained to be a real quantity, during the second snapshot and on.

7. The signal processing apparatus according to claim 6, wherein said reference antenna element is determined by an antenna element of which the phase of said signal is the latest of all said antenna elements in said array antenna at the present snapshot.

8. The signal processing apparatus according to claim 6, wherein said reference antenna element is determined by said antenna element of which the physical distance from a signal source to be communicated with at the present snapshot is farthest compared to the other antenna elements in said array antenna.

9. The signal processing apparatus according to claim 1, wherein said means for computing said residue vector comprises:

a first multiplying means which computes the squared value of said final array output (y(t)) at the last previous snapshot;

a plurality of second multiplying means which compute the inner product of said final array output (y(t)) at the last previous snapshot to said signal vector coming from said receiving means;

a plurality of third multiplying means which multiply the output of said first multiplying means by each corresponding element of said gain vector; and a plurality of subtracting means which subtract each output of said second multiplying means from each corresponding output of said second multiplying means.

10. The signal processing apparatus according to claim 1, wherein said adaptive gain synthesizing means comprises:

a plurality of first multiplying means which multiply each element of said search direction vector (υ) by the complex conjugate of each corresponding element of said signal vector (x(t));

a first adding means which adds the outputs of all said first multiplying means;

a plurality of second multiplying means which compute the square of absolute values of all the elements of said search direction vector (υ);

a second adding means which adds the outputs of all said second multiplying means;

a plurality of third multiplying means which multiply the complex conjugate of each element of said gain vector by each corresponding element of said search direction vector, in a order;

a third adding means which adds the outputs of all said third multiplying means;

a fourth multiplying means which computes the square of an output of said first adding means;

a fifth multiplying means which multiplies said final array output (y(t)) of the last previous snapshot by said output of said first adding means;

a sixth multiplying means which computes the square of the absolute value of said final array output (y(t)) of the last previous snapshot; and an adaptive gain computing means that is connected to said first adding means, said second adding means, said fourth multiplying means, said fifth multiplying means and said sixth multiplying means.

11. The signal processing apparatus according to claim 10, wherein said adaptive gain computing means generates said adaptive gain (ρ) in accordance with the equation given below:

$$\rho = \frac{-G - \sqrt{G^2 - 4FH}}{2F}$$

where

F=C·Re[D]−B·Re[E],

G=C−|y(t)|$^2$E,

H=Re[B]−|y(t)|$^2$·Re[D], and

Re[·] denotes the real part of the complex valued number "·"

with B being the output of said fourth multiplying means, which is the result of the multiplication of A (Said A being the output of said first adding means, which is the result of the inner product of said signal vector and said search direction vector) and said final array output, C being the output of said sixth multiplying means, which is the square of said A, D being the output of said second adding means, which is the result of the inner product of said gain vector and said search direction vector, and E being the output of said third adding means, which is the result of the inner product of said search direction vector and itself.

12. The signal processing apparatus according to claim 1, wherein said gain vector updating means comprises:

a plurality of multiplying means which multiply said adaptive gain by each element of said search direction vector at the present snapshot; and a plurality of adding means that add said gain vector obtained during the last previous snapshot to each output of said plurality of said multiplying means.

13. The signal processing apparatus according to claim 12, wherein said gain vector updating means further comprises a plurality of dividing means for dividing each output of said plurality of said adding means with the square root of N multiplied with the value of the output of said adding means connected to said reference antenna element, where N denotes the number of antenna elements in said array antenna.

14. The signal processing apparatus according to claim 1, wherein said scalar synthesizing means comprises:

a plurality of multiplying means which compute the square of the absolute value of each element of said residue vector;

an adding means that adds the outputs of all said multiplying means;

a dividing means that divides the output of said adding means at the present snapshot with another output of said adding means at the last previous snapshot; and a sign exchanging means which multiplies −1 by an output of said dividing means.

15. The signal processing apparatus according to claim 1, wherein said search direction vector synthesizing means comprises:

a plurality of multiplying means for multiplying said scalar quantity by each element of said search direction vector of the last previous snapshot; and a plurality of adding means for producing said search direction vector of the present snapshot, by adding each element of said residue vector and the output of said corresponding multiplying means.

16. A signal processing apparatus for minimizing interference and for reducing effects of noise by controlling beam patterns of a telecommunication system having an array antenna, comprising:

an autocorrelation generating means that produces an autocorrelation matrix from a signal vector (x(t)) provided from said array antenna at each snapshot;

a maximum eigenvalue synthesizing means that estimates the maximum eigenvalue of said autocorrelation matrix at each snapshot;

a residue vector synthesizing means that produces a residue vector, by using said autocorrelation matrix generated at each snapshot, said maximum eigenvalue and a value of a gain vector of the present snapshot;

a scalar synthesizing means that produces a scalar value, which is needed to generate a search direction vector, from said residue vector;

a search direction vector synthesizing means that produces said search direction vector, by using said residue vector and said scalar value;

an adaptive gain synthesizing means that produces an adaptive gain, by using said autocorrelation matrix, said search direction vector (υ), said maximum eigenvalue at the present snapshot, and the value of said gain vector (w) at the present snapshot; and a gain vector updating means that updates said gain vector by using said search direction vector and said adaptive gain at each present snapshot.

17. The signal processing apparatus according to claim 16, wherein said gain vector (w) is determined by the value of an eigenvector corresponding to the maximum eigenvalue of said autocorrelation matrix of the signals induced at each antenna element of said array antenna.

18. The signal processing apparatus according to claim 17, wherein said gain vector (w) is determined by multiplying a predetermined constant on each element of said eigenvector, corresponding to said maximum eigenvalue of said autocorrelation matrix, in order to modify said gain vector without changing the beam-pattern characteristics of said eigenvector of said maximum eigenvalue.

19. The signal processing apparatus, according to claim 17, wherein said gain vector (w) is determined by normalizing said eigenvector, corresponding to said maximum eigenvalue of said autocorrelation matrix, such that the magnitude of the normalized eigenvector becomes 1 and the beam-pattern characteristics of said eigenvector of said maximum eigenvalue remains unchanged.

20. The signal processing apparatus according to claim 17, wherein said autocorrelation matrix is computed by adding a first term and a second term as shown in the equation given below:

$$R_x(J+1)=f\cdot R_x(J)+x((J+1)T_S)x^H((J+1)T_S)$$

where $R_x(J+1)$ and $R_x(J)$ denote the autocorrelation matrix at J+1_st and J_th snapshots, respectively;

f is the forgetting factor of which the magnitude lies in between 0 and 1;

$T_S$ is a snapshot period;

superscript H denotes a Hermitian operator;

the first term in the equation is the autocorrelation matrix, at the last previous snapshot, multiplied by the forgetting factor of which the magnitude is between 0 and 1; and the second term is the signal matrix computed with said signal vector (x(t)) obtained from each antenna element of said array antenna at the present snapshot.

21. The signal processing apparatus according to claim 17, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to said signal induced at said reference antenna element at each snapshot is maintained to be a real quantity, during the second snapshot and on.

22. The signal processing apparatus according to claim 21, wherein said reference antenna element is determined by an antenna element of which the phase of said signal is the latest of all said antenna elements in said array antenna at the present snapshot.

23. The signal processing apparatus according to claim 21, wherein said reference antenna element is determined by the antenna element of which the physical distance from a signal source to be communicated with at the present snapshot is farthest compared to the other antenna elements in said array antenna.

24. The signal processing apparatus, according to claim 16, wherein said residue vector synthesizing means comprises:

a plurality of first multiplying means for multiplying, one by one, each element of each row of said autocorrelation matrix (R) by each corresponding element of said gain vector;

a plurality of first adding means, of which the number is as many as the number of rows of said autocorrelation matrix, for adding the outputs of all said first multiplying means;

a plurality of second multiplying means for multiplying every element of said gain vector by said maximum eigenvalue (λ) that has been estimated presently; and, a plurality of second adding means for subtracting, one by one, each output of said first adding means from each corresponding output of said second multiplying means.

25. The signal processing apparatus, according to claim 16, wherein said maximum eigenvalue synthesizing means for producing said maximum eigenvalue, by utilizing said autocorrelation matrix generated from said autocorrelation matrix generating means at each snapshot and said gain vector at the present snapshot, comprises:

a plurality of first multiplying means for multiplying, one by one, each element of each row of said autocorrelation matrix by the corresponding element of said gain vector at the present snapshot;

a plurality of first adding means for adding the outputs of said first multiplying means of which each corresponding set is connected to a corresponding row of said autocorrelation matrix;

a plurality of second multiplying means for multiplying, one by one, each output of said first adding means by the complex conjugate of each corresponding element of said gain vector at the present snapshot; and a second adding means for producing an estimated value for said maximum eigenvalue of said autocorrelation matrix of said present snapshot, by adding the outputs of all said second multiplying means respectively connected to each said corresponding row.

26. The signal processing apparatus according to claim 16, wherein said adaptive gain synthesizing means comprises:

a plurality of first multiplying means for multiplying, one by one, each element of each row of said autocorrelation matrix by the corresponding element of said search direction vector;

a plurality of first adding means, of which the number is as many as the number of rows of said autocorrelation matrix, for adding the results of said first multiplying means for each row;

a plurality of first multiplying means for multiplying each output of said first adding means by the complex conjugate of each corresponding element of said gain vector;

a second adding means for adding the outputs of all said second multiplying means;

a plurality of third multiplying means for multiplying each output of said first adding means by the complex conjugate of said corresponding element of said search direction vector;

a third adding means for adding the outputs of all said third multiplying means;

a plurality of fourth multiplying means for multiplying each element of said search direction vector by the complex conjugate of said corresponding element of said gain vector;

a fourth adding means for adding the outputs of all said fourth multiplying means;

a plurality of fifth multiplying means for multiplying each element of said search direction vector by the complex conjugate of each said element, one by one;

a fifth adding means for adding all the outputs of said fifth multiplying means; and, an adaptive gain computing means for computing an adaptive gain from the outputs of said second, third, fourth and fifth adding means.

27. The signal processing apparatus, according to claim 26, wherein said adaptive gain computing means generates said adaptive gain (ρ) in accordance with the equation given below:

$$\rho = \frac{-F - \sqrt{F^2 - 4EG}}{2E}$$

where E, F, and G are defined as $E = B \cdot Re[C] - D \cdot Re[A]$, $F = B - \lambda \cdot D$, $G = Re[D] - \lambda \cdot Re[C]$, with A, B, C, and D being the output of said second adding means, said third adding means, said fourth adding means and said fifth adding means, respectively, and $\lambda$ is said maximum eigenvalue, and Re[·] denotes the real part of the complex quantity "·".

28. A signal processing apparatus for minimizing interference and reducing effects of noises by controlling beam patterns of a telecommunication system having an array antenna, comprising:

a matrix operation approximation means for receiving a signal vector (x(t)) provided from said array antenna at each snapshot, and for generating a gamma vector ($\gamma$) and a zeta vector ($\zeta$) by approximating, at each snapshot, a first and a second matrix-oriented operations including autocorrelation matrix operations with the corresponding vector operations;

a means for estimating the maximum eigenvalue of said autocorrelation matrix supplied from said matrix operation approximation means;

a means for generating a residue vector, by utilizing said gamma vector ($\gamma$), said maximum eigenvalue and said gain vector of the present snapshot;

a means for generating a scalar quantity by utilizing said residue vector;

a means for generating a search direction vector, by utilizing said residue vector and said scalar quantity;

a means for generating an adaptive gain ($\rho$) at each snapshot, by utilizing said zeta vector ($\zeta$), said search direction vector, said maximum eigenvalue and said gain vector at the present snapshot; and a means for updating said gain vector by utilizing said search direction vector and said adaptive gain at each snapshot.

29. The signal processing apparatus according to claim 28, wherein said gain vector is determined by the eigenvector corresponding to the maximum eigenvalue of said autocorrelation matrix that is obtained from the signals induced at each antenna element of said array antenna.

30. The signal processing apparatus according to claim 29, wherein said gain vector is determined by multiplying a predetermined constant on each element of said eigenvector, corresponding to the maximum eigenvalue of said autocorrelation matrix, in order to modify said gain vector without changing the beam-pattern characteristics of said eigenvector of said maximum eigenvalue.

31. The signal processing apparatus according to claim 29, wherein said gain vector is determined by normalizing said eigenvector, corresponding to the maximum eigenvalue of said autocorrelation matrix, such that the magnitude of the normalized eigenvector becomes 1 and the beam-pattern characteristics of said eigenvector of the maximum eigenvalue remains unchanged.

32. The signal processing apparatus according to claim 29, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at the present snapshot)

$$R_x(J+1)=fR_x(J)+x((J+1)T_S)x^H((J+1)T_S)$$

where $R_x(J+1)$ and $R_x(J)$ denote said autocorrelation matrix at the J+1__st and J__th snapshots, respectively, f is said forgetting factor of which the magnitude lies between 0 and 1, $T_S$ is a snapshot period, and superscript H denotes a Hermitian operator.

33. The signal processing apparatus according to claim 29, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to said signal induced at said reference antenna element at each snapshot is maintained to be a real quantity, during the second snapshot and on.

34. The signal processing apparatus according to claim 33, said reference antenna element is determined by an antenna element of which the phase of said signal is the latest of all said antenna elements in said array antenna at the present snapshot.

35. The signal processing apparatus according to claim 33, wherein said reference antenna element is determined by an antenna element of which the physical distance from a signal source to be communicated with at the present snapshot is farthest compared to the other antenna elements in said array antenna.

36. The signal processing apparatus according to claim 28, wherein said residue vector synthesizing means comprises:

a plurality of multiplying means for multiplying every element of said gain vector by said maximum eigenvalue ($\lambda$) that has been estimated presently; and a plurality of adding means for subtracting, one by one, each element of said search direction vector from each corresponding output of said multiplying means.

37. The signal processing apparatus according to claim 28, wherein said matrix operation approximation means comprises:

a plurality of first multiplying means for multiplying each element of said signal vector (x), which is supplied from the outside, by the complex conjugate of said final array output (y) of said telecommunication system, which is produced at the last previous snapshot;

a plurality of second multiplying means for multiplying each element of said gamma vector computed at the last previous snapshot by a forgetting factor (f);

a plurality of third multiplying means for multiplying each element of said zeta vector computed at the last previous snapshot by said forgetting factor (f);

a plurality of fourth multiplying means for multiplying the outputs of said third multiplying means by said adaptive gain ($\rho$) generated from said adaptive gain synthesizing means;

a plurality of first adding means for adding the outputs of said fourth multiplying means to the outputs of said second multiplying means;

a plurality of second adding means for adding the outputs of said first adding means to the outputs of said first multiplying means;

a plurality of fifth multiplying means for multiplying the complex conjugate of each element of said signal vector (x), by each corresponding element of said search direction vector (v), which is generated from said search direction vector synthesizing means;

a third adding means for adding up all the outputs of said fifth multiplying means;

a plurality of sixth multiplying means for multiplying the outputs of said third adding means to each element of said signal vector (x);

a plurality of seventh multiplying means for multiplying the outputs of said third multiplying means by said scalar quantity (β); and a plurality of fourth adding means for adding the outputs of said seventh multiplying means to each corresponding output of said sixth multiplying means.

38. The signal processing apparatus according to claim 28, wherein said maximum eigenvalue synthesizing means comprises:

a plurality of multiplying means for multiplying, one by one, each element of said gamma vector by the complex conjugate of each element of said gain vector at the present snapshot; and an adding means for adding up all the outputs of said multiplying means.

39. The signal processing apparatus according to claim 28, wherein said adaptive gain synthesizing means comprises:

a plurality of first multiplying means for multiplying, one by one, each element of said zeta vector, which is an output of said matrix operation approximation means, by the complex conjugate of each corresponding element of said gain vector;

a first adding means for adding up all the outputs of said first multiplying means;

a plurality of second multiplying means for multiplying, one by one, each element of said zeta vector by the complex conjugate of each corresponding element of said search direction vector;

a second adding means for adding up all the outputs of said second multiplying means;

a third plurality of multiplying means for multiplying each element of said search direction vector by the complex conjugate of each corresponding element of said gain vector;

a third adding means for adding up all the outputs of said third multiplying means;

a plurality of fourth multiplying means for multiplying each element of said search direction vector by the complex conjugate of each corresponding element of said search direction vector;

a fourth adding means for adding up all the outputs of said multiplying means; and an adaptive gain computing means for said adaptive gain from the outputs of said first, second, third and fourth adding means.

40. The signal processing apparatus, according to claim 39, wherein said adaptive gain synthesizing means generates said adaptive gain (ρ) in accordance with the equation given below:

$$\rho = \frac{-F - \sqrt{F^2 - 4EG}}{2E}$$

where E, F, and G are defined as $E = B\cdot Re[C] - D\cdot Re[A]$, $F = B - \lambda\cdot D$, $G = Re[D] - \lambda\cdot Re[C]$, with A, B, C, and D being the output of said first adding means, said second adding means, said third adding means and said fourth adding means, respectively, and λ is the maximum eigenvalue, and Re[·] denotes the real part of the complex quantity "·".

41. A signal processing apparatus for minimizing interference and reducing effects of noises by controlling beam patterns of a telecommunication system having an array antenna, comprising:

a residue vector synthesizing means for generating a residue vector, by utilizing received signals provided from said array antenna at each snapshot, a final array output signal of said telecommunication system of the last previous snapshot and a phase delay vector during the last previous snapshot, and for outputting said residue vector;

a scalar synthesizing means connected to an output of said residue vector synthesizing means, for synthesizing a scalar value from said residue vector;

a search direction vector synthesizing means respectively connected to another output of said residue vector synthesizing means and an output of said scalar synthesizing means, for producing a search direction vector by using said residue vector and said scalar value;

an adaptive gain synthesizing means for generating a value of adaptive gain, by utilizing said received signals provided from said antenna elements at the present snapshot, a final array output signal of said telecommunication system at the last previous snapshot, said search direction vector provided from said search direction vector synthesizing means at the present snapshot and said phase delay vector during the last previous snapshot, and for outputting the value of said adaptive gain; and a means for updating said phase delay vector, by utilizing said search direction vector and said adaptive gain of the present snapshot.

42. The signal processing apparatus according to claim 41, wherein said phase delay vector, each element of which is to be appended to the phase of said signal induced at each corresponding antenna element, is determined by the phase term of each element of said eigenvector corresponding to said maximum eigenvalue of said autocorrelation matrix that is obtained from said signals induced at said each antenna element of said array antenna.

43. The signal processing apparatus according to claim 42, wherein said phase delay vector is determined by the phase term of each element of said vector which is generated by multiplying a predetermined constant by said eigenvector corresponding to said maximum eigenvalue of said autocorrelation matrix, in order to modify said phase delay vector without changing the beam-pattern characteristics of said eigenvector of said maximum eigenvalue.

44. The signal processing apparatus according to claim 42, wherein said phase delay vector is determined by the phase term of each element of the normalized eigenvector corresponding to said maximum eigenvalue of said autocorrelation matrix, such that the magnitude of the normalized eigenvector becomes 1 and the beam-pattern characteristics of said eigenvector of said maximum eigenvalue remains unchanged.

45. The signal processing apparatus according to claim 42, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at said present snapshot)

$$R_x(J+1)=fR_x(J)+x((J+1)T_S)x^H((J+1)T_S)$$

where $R_x(J+1)$ and $R_x(J)$ denote said autocorrelation matrix at the J+1__st and J__th snapshots, respectively, f is said forgetting factor of which the magnitude lies between 0 and 1, $T_S$ is a snapshot period, and superscript H denotes a Hermitian operator.

46. The signal processing apparatus according to claim 42, wherein said eigenvector corresponding to said maximum eigenvalue is computed by the procedures of:

(a) determining said phase delay vector to synchronize the phase of each signal induced at every antenna element to the phase of said signal induced at said reference antenna element, during the first snapshot; and (b) updating said phase delay vector of the last previous snapshot, in such a way that a Rayleigh quotient defined by said autocorrelation matrix is maximized at each snapshot, and a phase delay to be appended to said signal induced at said reference antenna element at each snapshot is maintained to be a real quantity, during a second snapshot and on.

47. The signal processing apparatus, according to claim 46, said reference antenna element is determined by an antenna element of which the phase of said signal is the latest of all said antenna elements in said array antenna at the present snapshot.

48. The signal processing apparatus according to claim 46, wherein said reference antenna element is determined by an antenna element of which the physical distance from a signal source to be communicated with at the present snapshot is farthest compared to the other antenna elements in said array antenna.

49. The signal processing apparatus according to claim 41, wherein said residue vector synthesizing means comprises:

a first multiplying means which computes the squared value of said final array output signal (y(t)) at the last previous snapshot, which is obtained by adding the results of delaying the phase of said signal induced at each antenna element by the amount of the value of each corresponding element of said phase delay vector at each snapshot;

a plurality of second multiplying means for multiplying each element of said signal vector (x(t)) obtained from the signal induced at each antenna element by said final array output signal (y(t)) at the last previous snapshot;

a plurality of phase delaying means for delaying the phase of the squared result of said first multiplying means by the amount of the value of each corresponding element of said phase delay vector; and a plurality of adding means for subtracting each of outputs of said second multiplying means from the corresponding output of said phase delaying means.

50. The signal processing apparatus according to claim 41, wherein said scalar synthesizing means comprises:

a plurality of multiplying means for computing the square of the magnitude of each element of said residue vector at the present snapshot;

an adding means for adding up all the outputs of said multiplying means;

a dividing means that divides the output of said adding means at the present snapshot with the output of said adding means at the previous snapshot; and a sign exchanging means which multiplies −1 to the output of said dividing means.

51. The signal processing apparatus according to claim 41, wherein said search direction vector synthesizing means comprises:

a plurality of adding means that receive the outputs of said residue vector synthesizing means, respectively, for producing said search direction vector; and a plurality of multiplying means for producing the inputs of said adding means, respectively, by multiplying each said element of said search direction vector at the previous snapshot by said scalar quantity (β).

52. The signal processing apparatus according to claim 41, wherein said adaptive gain synthesizing means comprises:

a plurality of first multiplying means for multiplying, one by one, each element of said signal vector (x(t)) by each corresponding element of said search direction vector;

a plurality of second multiplying means which compute the square of each element of said search direction vector (υ);

a first adding means which adds up all the squares of the elements of said search direction vector;

a plurality of phase delaying means for delaying the phase of every element of said search direction vector by the amount determined by each corresponding element of said phase delay vector at the present snapshot, respectively;

a second adding means which adds the outputs of said phase delaying means;

a third adding means which adds the outputs of said first multiplying means;

a third multiplying means which computes the square of the output of said third adding means;

a fourth multiplying means which multiplies the output of said third adding means by the output (y(t)) of said telecommunication system;

a fifth multiplying means which computes the square of said output (y(t)) of said telecommunication system at the present snapshot; and an adaptive gain computing means that is connected to said first and second adding means and said third, fourth and fifth multiplying means.

53. The signal processing apparatus according to claim 52, wherein said adaptive gain computing means generates said adaptive gain (ρ) in accordance with the equation given below:

$$\rho = \frac{-G - \sqrt{G^2 - 4FH}}{2F}$$

where $F=C\cdot D-B\cdot E$, $G=C-y(t)^2E$, $H=B-y(t)^2\cdot D$, with B being the output of said fourth multiplying means, which is the result of the multiplication of A (Said A being the output of said third adding means) and said array output, C being the output of said third multiplying means, which is the square of said A, D being the output of said second adding means, and E being the output of said first adding means.

54. The signal processing apparatus according to claim 41, wherein said phase delay vector updating means comprises:

a multiplying means for multiplying each element of said search direction vector by said adaptive gain (ρ), which is generated from said adaptive gain synthesizing means;

a plurality of phase delaying means for delaying the phase of an oscillator output of which the frequency is the same as the carrier frequency of said received signal at each said antenna element by the amount determined by each corresponding element of the phase delay vector at the last previous snapshot;

a plurality of adding means for adding the outputs of said multiplying means and the outputs of said phase delaying means, respectively; and a phase detecting means for generating the value of said phase delay vector at the present snapshot from the phase of each output of said adding means.

55. The signal processing apparatus according to claim 41, wherein said phase delaying means comprises:

a plurality of switching means each of which selects the smaller element after comparing the magnitude of the first element and the last element of said phase delay vector, which is generated from said phase detecting means at each snapshot; and a plurality of adding means for subtracting each output of said switching means from each corresponding output of said phase detecting means, respectively.

56. A signal processing method for minimizing interference and reducing effects of noises by controlling beam patterns of a telecommunication system having an array antenna, comprising the steps of:

(a) synthesizing a residue vector by using a signal vector (x(t)) provided from said array antenna at each snapshot, a final array output signal (y) of said telecommunication system at the last previous snapshot and a value of a gain vector (w) of the present snapshot;

(b) synthesizing a scalar value, which is needed to generate a search direction vector, from said residue vector;

(c) producing a search direction vector by using said residue vector and said scalar value;

(d) producing an adaptive gain by using said signal vector (x(t)), said search direction vector (υ), said final array output signal (y) of said telecommunication system at the last previous snapshot and the value of gain vector (w) of the present snapshot; and (e) updating said gain vector by using said search direction vector and said adaptive gain at the present snapshot.

57. The signal processing method according to claim 56, wherein said gain vector (w) is determined by a value of an eigenvector corresponding to said maximum eigenvalue of a autocorrelation matrix of signals induced at each antenna element of said array antenna.

58. The signal processing method according to claim 57, wherein said gain vector (w) is determined by multiplying a predetermined constant on each element of said eigenvector, corresponding to said maximum eigenvalue of said autocorrelation matrix, in order to modify said gain vector without changing the beam-pattern characteristics of said eigenvector of said maximum eigenvalue.

59. The signal processing method according to claim 57, wherein said gain vector (w) is determined by normalizing said eigenvector, corresponding to said maximum eigenvalue of said autocorrelation matrix, such that a magnitude of the normalized eigenvector becomes 1 and the beam-pattern characteristics of said eigenvector of said maximum eigenvalue remains unchanged.

60. The signal processing method according to claim 57, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at the present snapshot)

$$R_x(J+1)=f\cdot R_x(J)+x((J+1)T_S)x^H((J+1)T_S)$$

where $R_x(J+1)$ and $R_x(J)$ denote said autocorrelation matrix at the J+1_st and J_th snapshots, respectively, f is said forgetting factor of which the magnitude lies between 0 and 1, $T_S$ is a snapshot period, and superscript H denotes a Hermitian operator.

61. The signal processing method according to claim 57, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to said signal induced at said reference antenna element at each snapshot is maintained to be a real quantity, during a second snapshot and on.

62. The signal processing method according to claim 56, wherein said step of synthesizing said residue vector includes:

a first substep for computing the square of said final array output signal (y(t)) of said telecommunication system at the last previous snapshot;

a second substep for computing the inner product of said final array output signal (y(t)) at the last previous snapshot to each element of said signal vector provided by said array antenna;

a third substep for multiplying the squared output obtained in said first substep by each element of said gain vector; and a fourth substep for subtracting the results of said third substep from the results of said second substep, respectively.

63. The signal processing method according to claim 56, wherein said step of synthesizing said adaptive gain comprises:

a first substep for multiplying the complex conjugate of each element of said signal vector (x(t)) by the corresponding element of said search direction vector (υ), respectively;

a second substep for adding up the results of said first substep;

a third substep for computing the square of the magnitude of each element of said search direction vector (υ);

a fourth substep of adding the results of said third substep;

a fifth substep for multiplying the complex conjugate of each element of said gain vector by the corresponding element of said search direction vector;

a sixth substep for adding up the results of said fifth substep;

a seventh substep for computing the square of the result of said sixth substep;

an eighth substep for multiplying the result of said sixth substep by said final array output (y(t)) of said telecommunication system at the last previous snapshot;

a ninth substep for computing the square of the magnitude of said final array output (y(t)); and a tenth substep for computing said adaptive gain by utilizing the results of said fourth, sixth, seventh, eighth and ninth substeps.

64. The signal processing method according to claim 63, wherein said tenth substep generates said adaptive gain in accordance with the equation given below:

$$\rho = \frac{-G - \sqrt{G^2 - 4FH}}{2F}$$

where

F=C·Re[D]−B·Re[E],

G=C−|y(t)|$^2$E, H=Re[B]−|y(t)|$^2$·Re[D], and

Re[·] denotes the real part of the complex-valued quantity "·"

with B being the result of the multiplication of A (Said A being the result of the inner product of said signal vector and said search direction vector) and said final array output, C being the square of said A, D being the result of the inner product of said gain vector and said search direction vector, and E being the result of the inner product of said search direction vector and itself.

65. The signal processing method according to claim 56, wherein said step of updating said gain vector includes:

a first substep for multiplying each element of said search direction vector at the present snapshot by said adaptive gain; and a second substep for adding each element of gain vector at the last previous snapshot to the corresponding element of the results of said first substep.

66. The signal processing method according to claim 65, wherein said step of updating said gain vector further includes:

a third substep for dividing all the elements of the results of said second substep by the value of the first element of the results of said second substep multiplied by $\sqrt{N}$, where N denotes the number of antenna elements of said array antenna system.

67. The signal processing method according to claim 56, wherein said step of synthesizing said scalar value includes:

a first substep for computing the square of the magnitude of each element of said residue vector;

a second substep for adding up all the results of said first substep;

a third substep for dividing the result of said second substep at the present snapshot with the result of said second substep at the last previous snapshot; and a fourth substep for changing the sign of the result of said third substep.

68. The signal processing method according to claim 56, wherein said step of producing said search direction vector comprises:

a first substep of multiplying said scalar quantity by each element of said search direction vector of the last previous snapshot; and a second substep of producing said search direction vector of the present snapshot, by adding each element of said residue vector and the output of said first substep.

69. A signal processing method for minimizing interference and reducing effects of noises by controlling beam patterns of a telecommunication system having an array antenna, comprising the steps of:

(a) generating an autocorrelation matrix from a signal vector (x(t)) provided from said array antenna at each snapshot;

(b) synthesizing a maximum eigenvalue of the autocorrelation matrix at each snapshot;

(c) synthesizing a residue vector from the autocorrelation matrix generated at each snapshot, the maximum eigenvalue, and a present value of a gain vector;

(d) synthesizing a scalar value, which is needed to generate a search direction vector, from said residue vector;

(e) synthesizing a search direction vector from said residue vector and said scalar value;

(f) synthesizing an adaptive gain from said autocorrelation matrix, said search direction vector (υ), said maximum eigenvalue, and the present value of said gain vector (w); and (g) updating said gain vector from said search direction vector and adaptive gain at each present snapshot.

70. The signal processing method according to claim 69, wherein said gain vector is determined by the eigenvector corresponding to the maximum eigenvalue of said autocorrelation matrix that is obtained from the signals induced at each antenna element of said array antenna.

71. The signal processing method according to claim 70, wherein said gain vector is determined by multiplying a predetermined constant on each element of said eigenvector, corresponding to said maximum eigenvalue of said autocorrelation matrix, in order to modify said gain vector without changing the beam-pattern characteristics of said eigenvector of said maximum eigenvalue.

72. The signal processing method according to claim 70, wherein said gain vector is determined by normalizing said eigenvector, corresponding to the maximum eigenvalue of said autocorrelation matrix, such that the magnitude of the normalized eigenvector becomes 1 and the beam-pattern characteristics of said eigenvector of said maximum eigenvalue remains unchanged.

73. The signal processing method according to claim 70, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at the present snapshot)

$$R_x(J+1)=f{\cdot}R_x(J)+x((J+1)T_S)x^H((J+1)T_S)$$

where $R_x$(J+1) and $R_x$(J) denote said autocorrelation matrix at the J+1_st and J_th snapshots, respectively, f is said forgetting factor of which the magnitude lies between 0 and 1, $T_S$ is a snapshot period, and superscript H denotes a Hermitian operator.

74. The signal processing method according to claim 70, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to said signal induced at said reference antenna element at each snapshot is maintained to be a real quantity, during a second snapshot and on.

75. The signal processing method according to claim 69, wherein said step of generating said residue vector includes:

a first substep for multiplying each element of each row of said autocorrelation matrix (R) by the corresponding element of said gain vector;

a second substep for adding up all the results of said first substep;

a third substep for multiplying each element of said gain vector by the maximum eigenvalue estimated presently; and a fourth substep for subtracting, one by one, the result of said second substep from each element of the results of said third substep.

76. The signal processing method according to claim 69, wherein said step of estimating the maximum eigenvalue, by utilizing said autocorrelation matrix generated from said step of generating the autocorrelation matrix at each snapshot and said gain vector at the present snapshot, includes:

a first substep for multiplying, one by one, each element of each row of said autocorrelation matrix by each corresponding element of said gain vector at the present snapshot;

a second substep for adding up all the outputs of said first substep each set of which are connected to each corresponding row;

a third substep for multiplying, one by one, each element of the results of said second substep by the complex conjugate of each corresponding element of said gain vector at the present snapshot; and a fourth substep for producing the estimated value for said maximum eigenvalue of said autocorrelation matrix of the present snapshot by adding the results of said third substep.

77. The signal processing method according to claim 69, wherein said step of synthesizing said adaptive gain includes:

a first substep for multiplying each element of each row of said autocorrelation matrix by each corresponding element of said search direction vector;

a second substep for adding up all the results of said first substep;

a third substep for multiplying the complex conjugate of each element of said gain vector by the result of said second substep;

a fourth substep for adding up all the results of said third substep;

a fifth substep for multiplying the complex conjugate of each element of said search direction vector by the result of said second substep;

a sixth substep for adding up all the results of said fifth substep;

a seventh substep for multiplying each element of said search direction vector by the complex conjugate of each corresponding element of said gain vector;

an eighth substep for adding up all the results of said seventh substep;

a ninth substep for multiplying each element of said search direction vector by the complex conjugate of each said element itself;

a tenth substep for adding up all the results of said ninth substep; and an eleventh substep for computing said adaptive gain by utilizing the results of said fourth, sixth, eighth and tenth substeps.

78. The signal processing method according to claim 77, wherein said eleventh substep generates said adaptive gain in accordance with the equation given below:

$$\rho = \frac{-F - \sqrt{F^2 - 4EG}}{2E}$$

where $E = B \cdot Re[C] - D \cdot Re[A]$, $F = B - \lambda D$, $G = Re[CD] - \lambda \cdot Re[C]$, $\lambda$ denotes the maximum eigenvalue, and $Re[\cdot]$ denotes the real part of the complex-valued quantity "·"

with A being the result of said fourth substep, B being the result of said sixth substep, C being the result of said eighth substep, and D being the result of said tenth substep.

79. A signal processing method for minimizing interference and reducing effects of noises by controlling beam patterns of a telecommunication system having an array antenna, comprising the steps of:

(a) generating a gamma vector ($\gamma$) and a zeta vector ($\zeta$) by approximating an autocorrelation matrix operations with a corresponding vector operations by utilizing a signal vector provided from said array antenna at each snapshot;

(b) estimating a maximum eigenvalue of autocorrelation matrix by utilizing a gain vector at present snapshot and said gamma vector ($\gamma$);

(c) generating a residue vector by utilizing said gamma vector ($\gamma$), said maximum eigenvalue of autocorrelation matrix, and said gain vector of the present snapshot;

(d) generating a scalar quantity by utilizing said residue vector;

(e) generating a search direction vector by utilizing said residue vector and said scalar quantity;

(f) generating an adaptive gain at each snapshot by utilizing said zeta vector ($\zeta$), said search direction vector, said maximum eigenvalue of autocorrelation matrix, and said gain vector at the present snapshot; and (g) updating said gain vector by utilizing said search direction vector and said adaptive gain at each snapshot.

80. The signal processing method, according to claim 79, wherein said gain vector is determined by the eigenvector corresponding to the maximum eigenvalue of said autocorrelation matrix that is obtained from the signals induced at each antenna element of said array antenna.

81. The signal processing method according to claim 80, wherein said gain vector is determined by multiplying a predetermined constant on each element of said eigenvector, corresponding to said maximum eigenvalue of said autocorrelation matrix, in order to modify said gain vector without changing the beam-pattern characteristics of said eigenvector of said maximum eigenvalue.

82. The signal processing method according to claim 80, wherein said gain vector is determined by normalizing said eigenvector, corresponding to the maximum eigenvalue of said autocorrelation matrix, such that the magnitude of the normalized eigenvector becomes 1 and the beam-pattern characteristics of said eigenvector of said maximum eigenvalue remains unchanged.

83. The signal processing method according to claim 80, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at the present snapshot)

$$R_x(J+1)=f\cdot R_x(J)+x((J+1)T_S)x^H((J+1)T_S)$$

where $R_x(J+1)$ and $R_x(J)$ denote said autocorrelation matrix at the J+1__st and J__th snapshots, respectively, f is said forgetting factor of which the magnitude lies between 0 and 1, $T_S$ is a snapshot period, and superscript H denotes a Hermitian operator.

84. The signal processing method according to claim 80, wherein said eigenvector corresponding to said maximum eigenvalue is computed by the procedures of:

(a) determining said gain vector to synchronize the phase of each signal induced at every antenna element to the phase of said signal induced at said reference antenna element, during the first snapshot; and (b) updating said gain vector of the last previous snapshot, in such a way that a Rayleigh quotient defined by said autocorrelation matrix and said gain vector is maximized at each snapshot, and a gain value to be multiplied to said signal induced at said reference antenna element at each snapshot is maintained to be a real quantity, during a second snapshot and on.

85. The signal processing method according to claim 79, wherein said step of synthesizing said residue vector includes:

a first substep for multiplying every element of said gain vector by said maximum eigenvalue (λ) that has been estimated at the present snapshot; and, a second substep for subtracting, one by one, each element of said search direction vector from each corresponding output of said first substep.

86. The signal processing method according to claim 79, wherein said step of generating said gamma vector (γ) and said zeta vector (ζ) comprises:

a first substep for multiplying each element of said signal vector (x), which is supplied from the outside, by the complex conjugate of said final array output (y(t)) of said telecommunication system, which is produced at the last previous snapshot;

a second substep for multiplying each element of said gamma vector computed at the last previous snapshot by said forgetting factor (f);

a third substep for multiplying each element of said zeta vector computed at the last previous snapshot by said forgetting factor (f);

a fourth substep for multiplying the outputs of said third substep by said adaptive gain (ρ);

a fifth substep for adding the outputs of said fourth substep and said second substep;

a sixth substep for adding the outputs of said first substep and said fifth substep;

a seventh substep for multiplying the complex conjugate of each element of said signal vector (x), by each corresponding element of said search direction vector (v);

an eighth substep for adding up all the outputs of said seventh substep;

a ninth substep for multiplying the output of said eight substep by each element of said signal vector (x);

a tenth substep for multiplying the output of said fourth by said scalar quantity (β); and an eleventh substep for adding the outputs of said ninth substep and said tenth substep.

87. The signal processing method according to claim 79, wherein said step of synthesizing said maximum eigenvalue, by utilizing said gamma vector generated from said step of approximating the matrix operation at each snapshot and said gain vector at the present snapshot, includes:

a first substep for multiplying, one by one, each element of said gamma vector by the complex conjugate of each element of said gain vector at the present snapshot; and a second substep for adding up all the outputs of said first substep.

88. The signal processing method according to claim 79, wherein said step of synthesizing said adaptive gain includes:

a first substep for multiplying, one by one, each element of said zeta vector, which is one output of said step of approximating the matrix operation, by the complex conjugate of each corresponding element of said gain vector;

a second substep for adding up all the outputs of said first substep;

a third substep for multiplying, one by one, each element of said zeta vector by the complex conjugate of each corresponding element of said search direction vector;

a fourth substep for adding up all the outputs of said third substep;

a fifth substep for multiplying each element of said search direction vector by the complex conjugate of each corresponding element of said gain vector;

a sixth substep for adding up all the outputs of said fifth substep;

a seventh substep for multiplying each element of said search direction vector by the complex conjugate of the each element;

an eighth substep for adding up all the outputs of said seventh substep; and a ninth substep of computing said adaptive gain from the outputs of said second, fourth, sixth and eighth substep.

89. The signal processing method, according to claim 88, wherein said ninth substep generates said adaptive gain (ρ) in accordance with the equation given below:

$$\rho=\frac{-F-\sqrt{F^2-4EG}}{2E}$$

where E, F, and G are defined as

E=B·Re[C]−D·Re[A],

F=B−λ·D,

G=Re[A]−λ·Re[C], with A, B, C, and D being the output of said second substep, said fourth substep, said sixth substep and said eighth substep, respectively, and λ is the maximum eigenvalue, and Re[·] denotes the real part of the complex quantity "·".

90. A signal processing method for minimizing interference and reducing effects of noises by controlling beam patterns of a telecommunication system having an array antenna, comprising the steps of:

(a) synthesizing a residue vector, by utilizing received signals provided from said array antenna at each snapshot, a final array output signal of said telecommunication system at the last previous snapshot and a phase delay vector during the last previous snapshot;

(b) synthesizing a scalar value from said residue vector;

(c) synthesizing a search direction vector by using said residue vector and said scalar value;

(d) synthesizing a value of adaptive gain, by utilizing the received signals of present snapshot provided from the antenna elements, said final array output signal of said telecommunication system at the last previous snapshot, said search direction vector of the present snapshot and said phase delay vector during the last previous snapshot; and (e) updating said phase delay vector by utilizing said search direction vector and said adaptive gain of the present snapshot.

91. The signal processing method according to claim 90, wherein said phase delay vector, each element of which is to be appended to the phase of said signal induced at the corresponding antenna element, is determined by the phase term of each element of said eigenvector corresponding to said maximum eigenvalue of said autocorrelation matrix that is obtained from said signals induced at each said antenna element of said array antenna.

92. The signal processing method according to claim 91, wherein said phase delay vector is determined by the phase term of each element of said vector which is generated by multiplying the predetermined constant by said eigenvector corresponding to said maximum eigenvalue of said autocorrelation matrix, in order to modify said phase delay vector without changing the beam-pattern characteristics of said eigenvector of said maximum eigenvalue.

93. The signal processing method according to claim 91, wherein said phase delay vector is determined by the phase term of each element of the normalized eigenvector corresponding to said maximum eigenvalue of said autocorrelation matrix, such that the magnitude of the normalized eigenvector becomes 1 and said beam-pattern characteristics of said eigenvector of said maximum eigenvalue remains unchanged.

94. The signal processing method according to claim 91, wherein said autocorrelation matrix is computed by adding a first term and a second term, as shown in the equation given below: (in the equation, said first term is the autocorrelation matrix, at the last previous snapshot, multiplied by a forgetting factor of which the magnitude is between 0 and 1, and said second term is a signal matrix computed with said signal vector (x(t)) obtained from each antenna element of said array antenna at the present snapshot)

$$R_x(J+1)=f \cdot R_x(J)+x((J+1)T_S)x^H(J+1)T_S)$$

where $R_x(J+1)$ and $R_x(J)$ denote said autocorrelation matrix at the J+1__st and J__th snapshots, respectively, f is said forgetting factor of which the magnitude lies between 0 and 1, $T_S$ is a snapshot period, and superscript H denotes a Hermitian operator.

95. The signal processing method according to claim 91, wherein said eigenvector corresponding to said maximum eigenvalue is computed by the procedures of:

(a) determining said phase delay vector to synchronize the phase of each signal induced at every antenna element to the phase of said signal induced at said reference antenna element, during the first snapshot; and (b) updating said phase delay vector of the last previous snapshot, in such a way that a Rayleigh quotient defined by said autocorrelation matrix is maximized at each snapshot, and a phase delay to be appended to said signal induced at said reference antenna element at each snapshot is maintained to be a real quantity, during a second snapshot and on.

96. The signal processing method according to claim 90, wherein said step of synthesizing said residue vector includes:

a first substep for computing the squared value of said final array output (y(t)) at the previous snapshot, which is obtained by adding the results of delaying the phase of the signal induced at each antenna element by the amount of the value of each corresponding element of said phase delay vector at each snapshot;

a second substep for multiplying each element of said signal vector (x(t)) obtained from the signal induced at said each antenna element by said final array output (y(t));

a third substep for delaying the phase of the squared result of said first substep by the amount of the value of each corresponding element of said phase delay vector; and a fourth substep for subtracting each of outputs of said second substep from each corresponding output of said third substep.

97. The signal processing method according to claim 90, wherein said step of synthesizing said scalar includes:

a first substep for computing the square of the magnitude of each element of said residue vector at the present snapshot;

a second substep for adding up all the outputs of said first substep;

a third substep for dividing the output of said second substep at the present snapshot with the output of said second substep at the last previous snapshot; and a fourth substep for changing the sign of the output of said third substep.

98. The signal processing method according to claim 90, wherein said step of synthesizing said search direction vector includes:

a first substep for producing each element of said search direction vector, by utilizing the the results of said step of synthesizing said residue vector; and a second substep for producing the inputs of said first substep, by multiplying said each element of said search direction vector at the last previous snapshot by said scalar quantity (β).

99. The signal processing method according to claim 90, wherein said step of synthesizing said adaptive gain includes:

a first substep for multiplying, one by one, each element of said signal vector (x(t)) by each corresponding element of said search direction vector;

a second substep for computing the square of each element of said search direction vector (υ);

a third substep for adding the outputs of said second substep;

a fourth substep for delaying the phase of every element of said search direction vector by the amount determined by each corresponding element of said phase delay vector at the present snapshot, respectively;

a fifth substep for adding up all elements of the results of said fourth substep;

a sixth substep for adding up all the results of said first substep;

a seventh substep for computing the square of the result of said sixth substep;

an eighth substep for multiplying the final array output of said telecommunication system by the result of said sixth substep;

a ninth substep for computing the square of said final array output of said telecommunication system; and a tenth substep for computing said adaptive gain by utilizing the results of said third, fifth, seventh, and ninth substeps.

100. The signal processing method according to claim 99, wherein said tenth substep generates said adaptive gain (ρ) in accordance with the equation given below:

$$\rho = \frac{-G - \sqrt{G^2 - 4FH}}{2F}$$

where $F=C\cdot D-B\cdot E$, $G=C-y(t)^2E$, $H=B-y(t)^2\cdot D$, with B being the output of eighth substep, C being the output of said seventh substep, and E being the output of said fifth substep.

101. The signal processing method according to claim 90, wherein said step of updating said phase delay vector includes:

a first substep for multiplying each element of said search direction vector by said adaptive gain (ρ), which is generated from said step of synthesizing the adaptive gain;

a second substep for delaying the phase of oscillator output of which the frequency is the same as the carrier frequency of said received signal at said each antenna element by the amount determined by each corresponding element of said phase delay vector at the last previous snapshot;

a third substep for adding the outputs of said first substep and the outputs of said second substep, respectively; and a fourth substep for generating the value of said phase delay vector at the present snapshot from the phase of each output of said third substep.

102. The signal processing method according to claim 101, wherein said step of updating said phase delay vector further includes:

a fifth substep for selecting the smaller element out of the first element and the last element of said phase delay vector, which is generated from said fourth substep at each snapshot; and a sixth substep for subtracting the each output of said fifth substep from the output of said fourth substep.

103. A computer-readable medium having stored thereon computer-executable instructions for performing the steps comprising:

(a) synthesizing a residue vector by using a signal vector provided from an array antenna at each snapshot, a final array output signal of a telecommunication system at the last previous snapshot and a value of a gain vector of the present snapshot;

(b) synthesizing a scalar value, which is needed to generate a search direction vector, from said residue vector;

(c) producing a search direction vector by using said residue vector and said scalar value;

(d) producing an adaptive gain by using said signal vector, said search direction vector, said final array output signal of the telecommunication system at the last previous snapshot and the value of gain vector of the present snapshot; and (e) updating said gain vector by using said search direction vector and said adaptive gain at the present snapshot.

104. A computer-readable medium having stored thereon computer-executable instructions for performing the steps comprising:

(a) generating an autocorrelation matrix from a signal vector provided from an array antenna at each snapshot;

(b) synthesizing a maximum eigenvalue of the autocorrelation matrix at each snapshot;

(c) synthesizing a residue vector from the autocorrelation matrix generated at each snapshot, the maximum eigenvalue, and a present value of a gain vector; (d) synthesizing a scalar value, which is needed to generate a search direction vector, from said residue vector;

(e) synthesizing a search direction vector from said residue vector and said scalar value;

(f) synthesizing an adaptive gain from said autocorrelation matrix, said search direction vector, said maximum eigenvalue, and the present value of said gain vector; and (g) updating said gain vector from said search direction vector and adaptive gain at each present snapshot.

105. A computer-readable medium having stored thereon computer-executable instructions for performing the steps comprising:

(a) generating a gamma vector and a zeta vector by approximating an autocorrelation matrix operations with a corresponding vector operations by utilizing a signal vector provided from an array antenna at each snapshot;

(b) estimating a maximum eigenvalue of autocorrelation matrix by utilizing a gain vector at present snapshot and said gamma vector;

(c) generating a residue vector by utilizing said gamma vector, said maximum eigenvalue of autocorrelation matrix, and said gain vector of the present snapshot;

(d) generating a scalar quantity by utilizing said residue vector;

(e) generating a search direction vector by utilizing said residue vector and said scalar quantity;

(f) generating an adaptive gain at each snapshot by utilizing said zeta vector, said search direction vector, said maximum eigenvalue of autocorrelation matrix, and said gain vector at the present snapshot; and (g) updating said gain vector by utilizing said search direction vector and said adaptive gain at each snapshot.

106. A computer-readable medium having stored thereon computer-executable instructions for performing the steps comprising:

(a) synthesizing a residue vector, by utilizing received signals provided from an array antenna at each snapshot, a final array output signal of a telecommunication system at the last previous snapshot and a phase delay vector during the last previous snapshot, (b) synthesizing a scalar value from said residue vector, (c) synthesizing a search direction vector by using said residue vector and said scalar value;

(d) synthesizing a value of adaptive gain, by utilizing the received signals of present snapshot provided from the antenna elements, said final array output signal of said telecommunication system at the last previous snapshot, said search direction vector of the present snapshot and said phase delay vector during the last previous snapshot; and (e) updating said phase delay vector by utilizing said search direction vector and said adaptive gain of the present snapshot.

* * * * *